United States Patent
Iyer et al.

(10) Patent No.: US 12,273,917 B2
(45) Date of Patent: Apr. 8, 2025

(54) CHANNEL ACCESS INDICATION FOR SPECTRAL REUSE, POWER SAVINGS AND COEXISTENCE

(71) Applicant: InterDigital Patent Holdings, Inc., Wilmington, DE (US)

(72) Inventors: Lakshmi R. Iyer, King of Prussia, PA (US); Qing Li, Princeton Junction, NJ (US); Joseph M. Murray, Schwenksville, PA (US); Mohamed Awadin, San Diego, CA (US); Guodong Zhang, Woodbury, NY (US); Pascal M. Adjakple, Great Neck, NY (US); Allan Y. Tsai, Boonton, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/189,406

(22) Filed: Mar. 24, 2023

(65) Prior Publication Data
US 2023/0232453 A1    Jul. 20, 2023

Related U.S. Application Data

(63) Continuation of application No. 17/051,245, filed as application No. PCT/US2019/031770 on May 10, 2019, now abandoned.
(Continued)

(51) Int. Cl.
*H04W 74/0808* (2024.01)
*H04W 72/1268* (2023.01)
(Continued)

(52) U.S. Cl.
CPC .... *H04W 74/0808* (2013.01); *H04W 72/1268* (2013.01); *H04W 72/23* (2023.01); *H04W 74/002* (2013.01)

(58) Field of Classification Search
None
See application file for complete search history.

(56) References Cited

U.S. PATENT DOCUMENTS 9,445,420 B2   9/2016  Guo et al.
9,485,075 B2   11/2016 Weimin et al.
(Continued)

FOREIGN PATENT DOCUMENTS

CA    2879901 A1    2/2014
CN    101730257 A   6/2010
(Continued)

OTHER PUBLICATIONS

3rd Generation Partnership Project, Technical Specification Group Radio Access Network, Evolved Universal Terrestrial Radio Access (E-UTRA) and Evolved Universal Terrestrial Radio Access Network (E-UTRAN), Overall description, Stage 2 (Release 15), 3GPP TS 36.300 V15.0.0, Dec. 2017, pp. 1-338.
(Continued)

*Primary Examiner* — Clemence S Han
(74) *Attorney, Agent, or Firm* — Flaster Greenberg, P.C.

(57) ABSTRACT

A Channel Access Indicator (CAI) may be employed in New Radio Unlicensed (NR-U) to indicate channel occupation by a node to nodes outside its cell, indicate channel occupation by a node to nodes within its cell to aid spectral reuse, and to trigger a handshake between nodes within a cell to ensure that receiver has clear channel to transmit and receive.

20 Claims, 70 Drawing Sheets

Related U.S. Application Data

(60) Provisional application No. 62/790,539, filed on Jan. 10, 2019, provisional application No. 62/669,569, filed on May 10, 2018.

(51) Int. Cl.
*H04W 72/23* (2023.01)
*H04W 74/00* (2009.01)

(56) References Cited

U.S. PATENT DOCUMENTS

| | | | |
|---|---|---|---|
| 9,596,667 | B2 | 3/2017 | Awad et al. |
| 9,986,559 | B2 | 5/2018 | Bontu et al. |
| 10,841,914 | B2 | 11/2020 | Liou et al. |
| 11,477,818 | B2 | 10/2022 | Hooli et al. |
| 11,632,795 | B2 | 4/2023 | Kim et al. |
| 2009/0316637 | A1 | 12/2009 | Yi et al. |
| 2012/0176924 | A1 | 7/2012 | Wu et al. |
| 2012/0188886 | A1 | 7/2012 | Chen et al. |
| 2013/0039332 | A1 | 2/2013 | Nazar et al. |
| 2013/0308504 | A1 | 11/2013 | Nimbalker et al. |
| 2014/0050130 | A1 | 2/2014 | Kim et al. |
| 2014/0087748 | A1 | 3/2014 | Hong et al. |
| 2014/0126496 | A1 | 5/2014 | Sayana et al. |
| 2014/0153484 | A1 | 6/2014 | Kim et al. |
| 2014/0254509 | A1 | 9/2014 | Chen et al. |
| 2015/0071099 | A1 | 3/2015 | Yi et al. |
| 2015/0078190 | A1 | 3/2015 | Cheng et al. |
| 2015/0110056 | A1 | 4/2015 | Wang et al. |
| 2015/0146644 | A1 | 5/2015 | Kim et al. |
| 2015/0208444 | A1 | 7/2015 | Park et al. |
| 2015/0223254 | A1 | 8/2015 | Guo et al. |
| 2015/0256307 | A1 | 10/2015 | Nagata et al. |
| 2015/0304995 | A1 | 10/2015 | Yi et al. |
| 2016/0323902 | A1 | 11/2016 | Wu et al. |
| 2017/0142754 | A1 | 5/2017 | Uziel et al. |
| 2017/0332359 | A1 | 11/2017 | Tsai et al. |
| 2018/0152953 | A1 | 5/2018 | Park et al. |
| 2019/0029043 | A1 | 1/2019 | Harada et al. |
| 2019/0053227 | A1* | 2/2019 | Huang ............... H04L 25/03006 |
| 2019/0174466 | A1 | 6/2019 | Zhang et al. |
| 2019/0239223 | A1 | 8/2019 | Yerramalli et al. |
| 2019/0268883 | A1 | 8/2019 | Zhang et al. |
| 2019/0335456 | A1* | 10/2019 | Yerramalli ......... H04W 72/1268 |
| 2019/0342898 | A1* | 11/2019 | Nam ................. H04W 72/0446 |
| 2020/0022144 | A1* | 1/2020 | Papasakellariou .... H04W 72/23 |
| 2020/0045696 | A1* | 2/2020 | Huang ...................... H04L 5/10 |
| 2020/0052865 | A1* | 2/2020 | Liou ................. H04W 74/0808 |
| 2020/0053728 | A1* | 2/2020 | Huang ............. H04L 27/26025 |
| 2020/0053798 | A1 | 2/2020 | Tsai et al. |
| 2020/0092861 | A1* | 3/2020 | Xu ......................... H04W 72/23 |
| 2020/0092913 | A1* | 3/2020 | Xu ...................... H04W 72/0446 |
| 2020/0100286 | A1* | 3/2020 | Xu ............................ H04L 1/187 |
| 2020/0137780 | A1 | 4/2020 | Kim et al. |
| 2020/0137793 | A1* | 4/2020 | Chen ...................... H04W 28/26 |
| 2020/0146058 | A1* | 5/2020 | Xu ................... H04W 72/0453 |
| 2020/0154471 | A1* | 5/2020 | Sun ...................... H04W 72/21 |
| 2020/0154477 | A1* | 5/2020 | Sun ...................... H04W 16/14 |
| 2020/0322932 | A1* | 10/2020 | Kim ...................... H04B 7/0695 |
| 2020/0396686 | A1 | 12/2020 | Tiirola et al. |
| 2021/0058964 | A1 | 2/2021 | Hooli et al. |
| 2021/0058967 | A1 | 2/2021 | Oteri et al. |
| 2021/0092622 | A1 | 3/2021 | Tiirola et al. |
| 2021/0281374 | A1 | 9/2021 | Kim et al. |
| 2021/0289548 | A1 | 9/2021 | Murray et al. |
| 2022/0022248 | A1* | 1/2022 | Kwak ............... H04W 74/0808 |
| 2022/0070918 | A1 | 3/2022 | Fan et al. |
| 2023/0016295 | A1 | 1/2023 | Sadeghi et al. |

FOREIGN PATENT DOCUMENTS

| | | |
|---|---|---|
| CN | 103037431 A | 4/2013 |
| CN | 103392371 A | 11/2013 |
| CN | 103548409 A | 1/2014 |
| CN | 103580840 A | 2/2014 |
| CN | 103580884 A | 2/2014 |
| CN | 103634074 A | 3/2014 |
| CN | 103716893 A | 4/2014 |
| CN | 103931133 A | 7/2014 |
| CN | 103945538 A | 7/2014 |
| CN | 103959826 A | 7/2014 |
| CN | 107889114 A | 4/2018 |
| EP | 4436084 A2 | 9/2024 |
| JP | 2009049869 10 | 3/2009 |
| JP | 2009049869 A | 3/2009 |
| JP | 2017-139665 A | 8/2017 |
| TW | 201804831 A | 2/2018 |
| WO | WO 2013/157872 A1 | 10/2013 |
| WO | WO 2014/069955 A1 | 5/2014 |
| WO | WO 2014/073865 A1 | 5/2014 |
| WO | 2017/126935 A1 | 7/2017 |
| WO | 2017/132844 A1 | 8/2017 |
| WO | 2017/193843 A1 | 11/2017 |
| WO | 2018/031136 A1 | 2/2018 |

OTHER PUBLICATIONS

3rd Generation Partnership Project, Technical Specification Group Radio Access Network, Evolved Universal Terrestrial Radio Access (E-UTRA), Physical layer procedures (Release 15), 3GPP TS 36.213 V15.0.0, Dec. 2017, pp. 1-493.

3rd Generation Partnership Project, Technical Specification Group Radio Access Network, NR, Radio Resource Control (RRC) protocol specification (Release 15), 3GPP TS 38.331 V15.1.0, Mar. 2018, pp. 1-268.

3rd Generation Partnership Project, Technical Specification Group Radio Access Network, Study on Scenarios and Requirements for Next Generation Access Technologies, (Release 14), 3GPP TR 38.913 V14.3.0, Jun. 2017, pp. 1-39.

3rd Generation Partnership Project; Technical Specification Group Radio Access Network; Evolved Universal Terrestrial Radio Access (E-UTRA); Physical channels and modulation (Release 15); 3GPP TS 36.211 V15.3.0, Sep. 2018, pp. 1-237.

Intel Corporation, "Remaining details for Channel Access Mechanism for Autonomous UL Transmission", R1-1802363, 3GPP TSG RAN WG1 Meeting #92, Mar. 2018, pp. 1-6.

Intel corporation: "Summary of email discussion [91-L TE-03] on channel access for AUL", 3GPP Draft; R1-1802362 Email Discussion 91-LTE-03 on Channel Access for Aul, 3rd Generation Partnership Project (3gpp), Mobile Competence Centre; vol. RAN WG1, No. Athens, Greece; Feb. 26 2018-Mar. 2, 2018 Feb. 17, 2018, XP051397887, Retrieved from the Internet: URL:http://www.3gpp.org/ftp/tsg%5Fran/WG1 %5FRL1/ TSGR1%5F92/Docs/, pp. 1-18.

Ling et al., "Practical LTE and Wi-Fi Coexistence Techniques beyond LBT", IEEE Communications Magazine, Oct. 2017, pp. 1-6.

MulteFire Release 1.0.1. https://www.multefire.org/specification, Oct. 2017, pp. 1-13.

Network allocation vector, Retreived on Apr. 4, 2023; https://en.wikipedia.org/wiki/Network_allocation_vector.

Nokia et al., "On channel access for autonomous UL access", 3GPP Draft; R1-1713861 aul channel access, 3rd generation partnership project (3GPP), mobile competence centre; vol. RAN WG1, No. Prague, Czech Republic; Aug. 21, 2017-Aug. 25, 2017 Aug. 20, 2017 (Aug. 20, 2017), XP051316655, Retrieved from the Internet: URL:http://www.3gpp.org/ftp/Meetings_3GPP SYNC/RAN1/Docs/.

Samsung, "Resource allocation for autonomous UL access", R1-1801915, 3GPP TSG RAN WG1 Meeting #92 , Mar. 2018, pp. 1-5.

Third Generation Partnership Project (3GPP), "Remaining Details of Control Signalling for DL CoMP", MediaTek Inc., 3GPP TSG RAN WG1 Meeting #70bis, San Diego, USA, Oct. 8-12, 2012, R1-124277, 6 pages.

3rd Generation Partnership Project (3GPP), "Technical Specification Group Radio Access Network, Evolved Universal Terrestrial Radio Access (E-UTRA), Physical Layer Procedures (Release 11)", Feb. 2013, TS 36.213 V11.2.0, 173 pages.

(56) References Cited

OTHER PUBLICATIONS

3rd Generation Partnership Project (3GPP), "Technical Specification Group Radio Access Network, Evolved Universal Terrestrial Radio Access (E-UTRA), Physical Channels and Modulation (Release 10)", Mar. 2011, TS 36.211 V10.1.0, 103 pages.
CNIPA, "National Intellectual Property Administration, PRC for Reexamination and Invalidation Examination", Examination Decision on Request for Invalidation (54123) of Chinese Patent No. 201580063144.4, Feb. 25, 2022, 23 pages.
3rd Generation Partnership Project (3GPP), "Technical Specification Group Radio Access Network, Evolved Universal Terrestrial Radio Access (E-UTRA), Multiplexing and Channel Coding (Release 11)", Feb. 2013, TS 36.212 V11.2.0, 82 pages.
Third Generation Partnership Project (3GPP), "Downlink Control Signaling for COMP", Renesas Mobile Europe Ltd., 3GPP TSG-RAN WG1 Meeting #68bis, Jeju, Korea, Mar. 26-30, 2012, R1-121395, 4 pages.
3rd Generation Partnership Project (3GPP), "Subframe Structure for LAA Downlink", Huawei, HiSilicon, 3GPP TSG RAN WG1 Meeting #81, Fukuoka, Japan, May 25-29, 2015, R1-153201, 5 pages.
3rd Generation Partnership Project (3GPP), TS 29.163 V10.3.0, Technical Specification Group Core Network and Terminals; Interworking between the IP Multimedia (IM) Core Network (CN) subsystem and Circuit Switched (CS) networks (Release 10), Sep. 29, 2011.

\* cited by examiner (C)

(D)

(A)

(B)

CHANNEL ACCESS INDICATION FOR SPECTRAL REUSE, POWER SAVINGS AND COEXISTENCE

CROSS-REFERENCE TO RELATED APPLICATIONS

This application is a continuation of U.S. patent application Ser. No. 17/051,245 filed Oct. 28, 2020 which is the National Stage of International Patent Application No. PCT/US2019/031770, filed May 10, 2019, which claims the benefit of U.S. Provisional Application No. 62/669,569, filed May 10, 2018 and U.S. Provisional Application No. 62/790,539, filed Jan. 10, 2019, the disclosures of which are incorporated herein by reference in their entireties.

BACKGROUND

LTE Licensed Assisted Access

Carrier aggregation with at least one SCell operating in the unlicensed spectrum is referred to as Licensed-Assisted Access (LAA). In LAA, the configured set of serving cells for a UE therefore always includes at least one SCell operating in the unlicensed spectrum according to frame structure Type 3, also called LAA SCell. Unless otherwise specified, LAA SCells act as regular SCells, see "Practical LTE and Wi-Fi Coexistence Techniques beyond LBT", Jonathan Ling, David Lopez-Perez, Mohammad R. Khawer, IEEE Communications Magazine, October 2017.

LAA eNB and UE apply Listen-Before-Talk (LBT) before performing a transmission on LAA SCell. LBT is a method whereby radio transmitters first sense the medium and transmit only if the medium is sensed to be idle, which is also called clear channel assessment (CCA). When LBT is applied, the transmitter listens to/senses the channel to determine whether the channel is free or busy. If the channel is determined to be free, the transmitter may perform the transmission; otherwise, it does not perform the transmission. If an LAA eNB uses channel access signals of other technologies for the purpose of LAA channel access, it shall continue to meet the LAA maximum energy detection threshold requirement.

Various LBT approaches exist, but the one recommended by 3GPP is called LBT-Load Based Equipment Category 4. This adds a random access protocol similar to WiFi to ensure not only LTE/WiFi coexistence but a standardized way to ensure LTE/LTE coexistence. In Rel-14, several channel access procedures are introduced that may be performed by eNB and UE for both downlink (DL) and uplink (UL) transmissions, respectively. The main channel access procedure is described in Section 15 of 3GPP TS 36.213, Physical layer procedures (Release 15), V15.0.0.

LTE Frame Structure Type 3

Frame structure type 3 is applicable to LAA secondary cell operation with normal cyclic prefix only. Each radio frame is $T_f=307200 \cdot T_s=10$ ms long and consists of 20 slots of length $T_{slot}=15360 \cdot T_s=0.5$ ms, numbered from 0 to 19. A subframe is defined as two consecutive slots where subframe i consists of slots i and 2i+1.

The 10 subframes within a radio frame are available for downlink or uplink transmissions. Downlink transmissions occupy one or more consecutive subframes, starting anywhere within a subframe and ending with the last subframe either fully occupied or following one of the DwPTS durations in as specified in Table 4.2-1 of 3GPP TS 36.213, Physical layer procedures (Release 15), V15.0.0. Uplink transmissions occupy one or more consecutive subframes.

NextGen Network Requirements

3GPP TR 38.913, Study on Scenarios and Requirements for Next Generation Access Technologies (Release 14), V14.3.0 defines scenarios and requirements for next generation access technologies. The Key Performance Indicators (KPIs) for eMBB, URLLC, and mMTC devices are summarized in Table 1.

TABLE 1

KPIs for eMBB, URLLC, and mMTC Devices

| Device | KPI | Description | Requirement |
|---|---|---|---|
| eMBB | Peak data rate | Peak data rate is the highest theoretical data rate which is the received data bits assuming error-free conditions assignable to a single mobile station, when all assignable radio resources for the corresponding link direction are utilized (i.e., excluding radio resources that are used for physical layer synchronization, reference signals, or pilots, guard bands and guard times). | 20 Gbps for downlink and 10 Gbps for uplink |
| | Mobility interruption time | Mobility interruption time means the shortest time duration supported by the system during which a user terminal cannot exchange user plane packets with any base station during transitions. | 0 ms for intra-system mobility |
| | Data Plane Latency | For eMBB value, the evaluation needs to consider all typical delays associated with the transfer of the data packets in an efficient way (e.g. applicable procedural delay when resources are not pre-allocated, averaged HARQ retransmission delay, impacts of network architecture). | 4 ms for UL, and 4 ms for DL |
| URLLC | Control Plane Latency | Control plane latency refers to the time to move from a battery efficient state (e.g., IDLE) to start of continuous data transfer (e.g., ACTIVE). | 10 ms |
| | Data Plane Latency | For URLLC the target for user plane latency for UL and DL. Furthermore, if possible, the latency should also be low enough to support the use of the next generation access technologies as a wireless transport technology that can be used within the next generation access architecture. | 0.5 ms |
| | Reliability | Reliability can be evaluated by the success probability of transmitting X bytes within 1 ms, which is the time | $1-10^{-5}$ within 1 ms |

TABLE 1-continued

KPIs for eMBB, URLLC, and mMTC Devices

| Device | KPI | Description | Requirement |
|---|---|---|---|
| | | it takes to deliver a small data packet from the radio protocol layer 2/3 SDU ingress point to the radio protocol layer 2/3 SDU point of the radio interface, at a certain channel quality (e.g., coverage-edge). | |
| | Coverage | MaxCL in uplink and downlink between device and Base Station site (antenna connector(s)) for a data rate of 160 bps, where the data rate is observed at the egress/ingress point of the radio protocol stack in uplink and downlink. | 164 dB |
| mMTC | UE Battery Life | UE battery life can be evaluated by the battery life of the UE without recharge. For mMTC, UE battery life in extreme coverage shall be based on the activity of mobile originated data transfer consisting of 200 bytes UL per day followed by 20 bytes DL from MaxCL of 164 dB, assuming a stored energy capacity of 5 Wh. | 15 years |
| | Connection Density | Connection density refers to total number of devices fulfilling specific Quality of Service (QoS) per unit area (per km$^2$). QoS definition should take into account the amount of data or access request generated within a time t_gen that can be sent or received within a given time, t_sendrx, with x % probability. | $10^6$ devices/km$^2$ |

Receiver Assisted Unlicensed Operation

To coordinate inter-technology spectrum access in a distributed and simple manner, a transmitter must first detect the energy across the intended transmission band. This energy detection (ED) mechanism informs the transmitter of ongoing transmissions by other nodes, and helps it to decide whether to transmit or not. However, although simple, this scheme, also known as listen-before-talk (LBT), does not work in all circumstances, for example, when information is encoded to be received below background noise level, or when the nodes are distant and the signals are weak at the receiver. Thus, a node wishing to transmit may sense the channel as unoccupied according to the energy received being below a certain ED threshold, but may still interfere with a nearby node that is receiving.

Nonetheless, LBT is the starting point for coexistence, and is mandatory in many countries' unlicensed band regulations. The ED threshold cannot be lowered too much as false detections would occur due to noise. Consequently, there is a need for additional information for effective inter and intra technology wireless media access.

RTS/CTS Mechanism in WiFi

The 802.11 media access control (MAC) protocol augments the ED mechanism with a virtual carrier sense (VCS) mechanism, whereby 802.11 packet headers are received and decoded at the lowest power levels due to using the most robust modulation and coding. The network allocation vector (NAV), i.e. timeline at each station (STA) of when the channel is free or occupied, is updated based on the contents of such header or control packets, which indicate for how long the channel will be used. For example, the request-to-send/clear-to-send (RTS/CTS) mechanism reserves the channel by causing the NAV to be updated by all nodes that receive the RTS around the transmitter and CTS around the receiver. However, even the VCS has problems, as the capture effect, which causes the stronger overlapped packet to be captured over the weaker one, results in unfairness as the stronger node doesn't experience a collision and the weaker node backs off.

The virtual carrier-sensing is a logical abstraction which limits the need for physical carrier-sensing at the air interface in order to save power. The MAC layer frame headers contain a duration field that specifies the transmission time required for the frame, in which time the medium will be busy. The stations listening on the wireless medium read the Duration field and set their NAV, which is an indicator for a station on how long it must defer from accessing the medium. The NAV may be thought of as a counter, which counts down to zero at a uniform rate. When the counter is zero, the virtual CS indication is that the medium is idle; when nonzero, the indication is busy.

Unlicensed in LTE

There are two types of LTE access on unlicensed frequencies: LAA, which acts as a supplemental downlink to a licensed LTE carrier (note: unlicensed uplink eLAA is still attached to licensed carrier), and MulteFire, which is characterized by fully standalone operation in the unlicensed band. In LAA, both the licensed and unlicensed bands are operational at the same time, i.e. data may be received over both bands simultaneously. The PBCH is carried only on the licensed carrier. However Rel-12 discovery reference signals (DRS), which includes the PSS, are transmitted at 40 ms intervals on the unlicensed carrier. Detection of DRS alone does not provide further information, i.e. cell id, and one cannot even determine the operator. MulteFire transmissions do include the PBCH/PDSCH in their downlink transmissions, now called ePBCH, which doubles the energy in the PSS and secondary synchronization signal (SSS) sequences to improve detectability, see MulteFire Release 1.0.1, www-.multefire.org/specification.

SUMMARY

The core of 3GPP NR Rel. 15 PHY is a beam based architecture. It is highly desirable that New Radio (NR) Unlicensed (NR-U) should leverage as many features as possible from NR including the beam based architecture. Unlike eLAA where the sensing is based on wide beams, narrow beam sensing can help with coexistence by allowing the spatial resources to be used efficiently; LBT schemes may be enhanced to support Carrier Sense Multiple Access and Collision Avoidance (CSMA/CA) so a UE can avoid unnecessary carrier busy detection, thereby improving power efficiency. NR-U may consider introducing signaling to indicate channel occupancy for improved spatial reuse and coexistence. This implies new methods and signal design are required in NR-U.

Disclosed herein are methods and apparatus employing a Channel Access Indicator in NR-U to provide functionality, such as: indicating channel occupation by a node to nodes outside its cell; indicating channel occupation by a node to nodes within its cell to aid spectral reuse; and triggering a handshake between nodes within a cell to ensure that receiver has clear channel to transmit and receive.

Also disclosed is the behavior of a node when it receives a CAI, i.e. how it uses a timer to wait to sense the channel. The information carried by CAI for various use cases is also described.

Also described are several procedures to enable the PUSCH to be transmitted at multiple start positions within the UL grant, wherein the starting location is conveyed through a CAI to the gNB. The methods include:

Methods to signal the PUSCH candidate start positions.
Procedures to adjust UL DMRS based on the PUSCH selected start position.
DMRS may be power boosted for the first PUSCH following the UE's COT.
PUSCH REs may be power boosted for the first PUSCH following the UE's COT.
UE may use different DMRS sequences to signal the selected PUSCH starting symbol.
UE may use DMRS with higher resource density for the first PUSCH following the UE's COT.
Puncturing procedures to fit PUSCH within the available resources.
Procedures to adapt MCS based on the PUSCH selected start position and to facilitate detecting the selected MCS at gNB.
Procedures for transmitting piggybacked UCI Also described are PHY layer signaling techniques to enable CAI transmission on DL and UL are described. The PHY layer signaling techniques include:

PDCCH, PSS/SSS like signals on DL;
PRACH, PUCCH on UL; and
Preamble based transmission, including:
  Partial indication of CAI information on the preamble, the remaining through signals such as PDCCH or PRACH;
  Asynchronous to symbol timing; and
  With repetition and OCC to provide some bits of information either about cell ID or channel occupation time or both.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with accompanying drawings.

DETAILED DESCRIPTION OF ILLUSTRATIVE EMBODIMENTS

Figure 1:
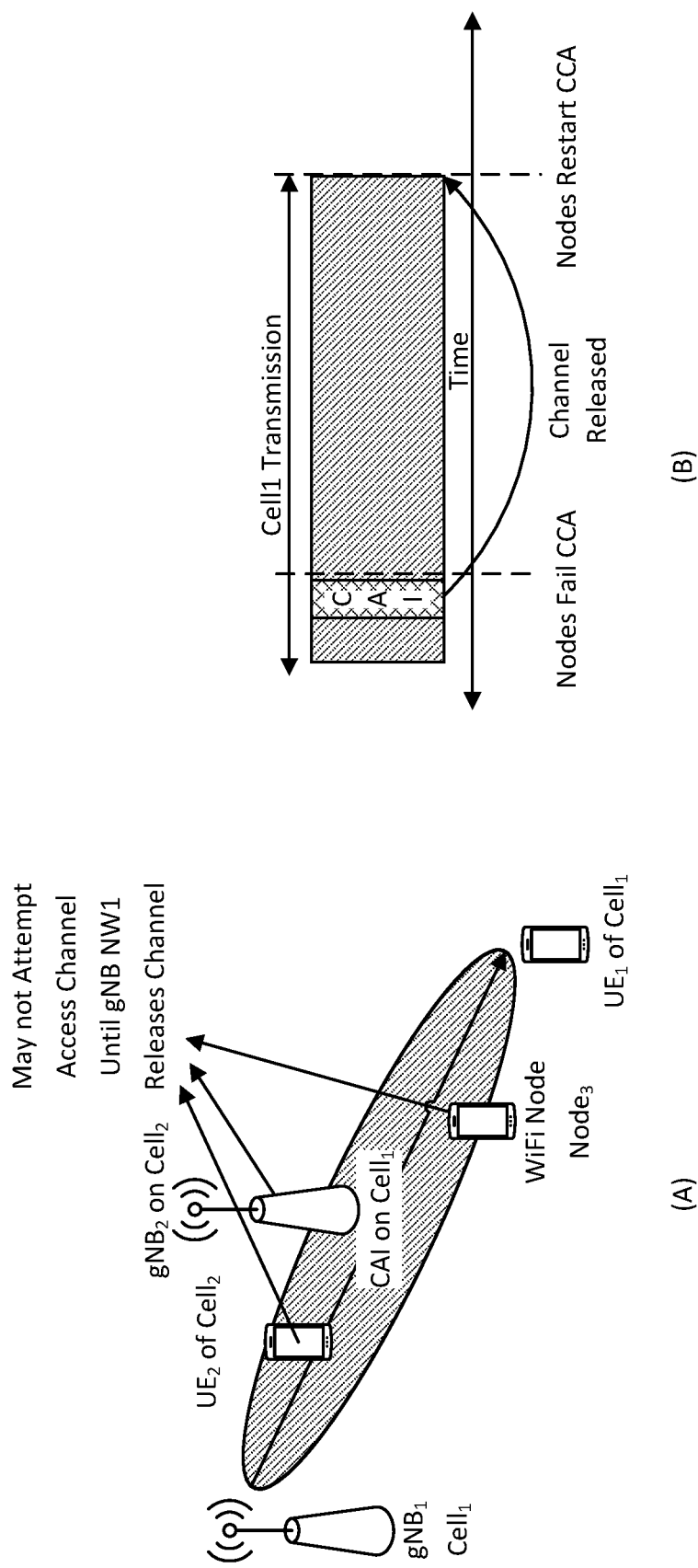
FIG. 1 illustrates CAI transmission including (A) CAI read by general-nodes and (B) indicating time of occupation of channel.

The following is a list of acronyms that may appear in the following description. Unless otherwise specified, the acronyms used herein refer to the corresponding term listed below:

| | |
|---|---|
| BWP | Bandwidth Part |
| CA | Carrier Aggregation |
| CAI | Channel Access Indicator-Initiate |
| CAI-I | Channel Access Indicator-Response |
| CAI-R | Channel Access Indicator |
| CBRA | Contention Based Random Access |
| CCA | Clear Channel Assessment |
| CFRA | Contention Free Random Access |
| C-RNTI | Cell Radio-Network Temporary Identifier |
| CSI-RS | Channel State Information Reference Signal |
| CTS | Clear to send |
| DC | Dual Connectivity |
| DL | Downlink |
| DL-SCH | Downlink Shared Channel |
| DRS | Discovery Reference Signal |
| ED | Energy Detection |
| eLAA | evolved License Assisted Access |
| eMBB | enhanced Mobile Broadband |
| eNB | Evolved Node B |
| FDD | Frequency Division Duplex |
| FR1 | Frequency region 1 (sub 6 GHz) |
| FR2 | Frequency region 2 (mmWave) |
| gNB | NR NodeB |
| HARQ | Hybrid ARQ |
| IE | Information Element |
| KPI | Key Performance Indicators |
| L1 | Layer 1 |
| L2 | Layer 2 |
| L3 | Layer 3 |
| LAA | License Assisted Access |
| LTE | Long Term Evolution |
| MAC | Medium Access Control |
| MIB | Master Information Block |
| MTC | Machine-Type Communications |
| mMTC | Massive Machine Type Communication |
| NR | New Radio |
| NR-U | NR Unlicensed |
| OS | OFDM Symbol |
| OFDM | Orthogonal Frequency Division Multiplexing |
| PCell | Primary Cell |
| PHY | Physical Layer |
| PRACH | Physical Random Access Channel |
| RACH | Random Access Channel |
| RAN | Radio Access Network |
| RAP | Random Access Preamble |
| RAR | Random Access Response |
| RAT | Radio Access Technology |
| RTS | Request to send |
| RRC | Radio Resource Control |
| RRM | Radio Resource Monitoring |
| RSRP | Reference Signal Received Power |
| RSRQ | Reference Signal Received Quality |
| SCell | Secondary Cell |
| SCG | Secondary Cell Group |
| SC-PTM | Single Cell Point to Multipoint |
| SDU | Service Data Unit |
| SI | System Information |
| SIB | System Information Block |
| SR | Scheduling Request |
| SS | Synchronization Signal |
| SSB | SS Block |
| TCI | Transmission Configuration Indicator |

-continued

| | |
|---|---|
| TDD | Time Division Duplex |
| TRP | Transmission and Reception Point |
| TTI | Transmission Time Interval |
| UE | User Equipment |
| UL | Uplink |
| UL-SCH | Uplink Shared Channel |

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that can be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

Figure 21A:
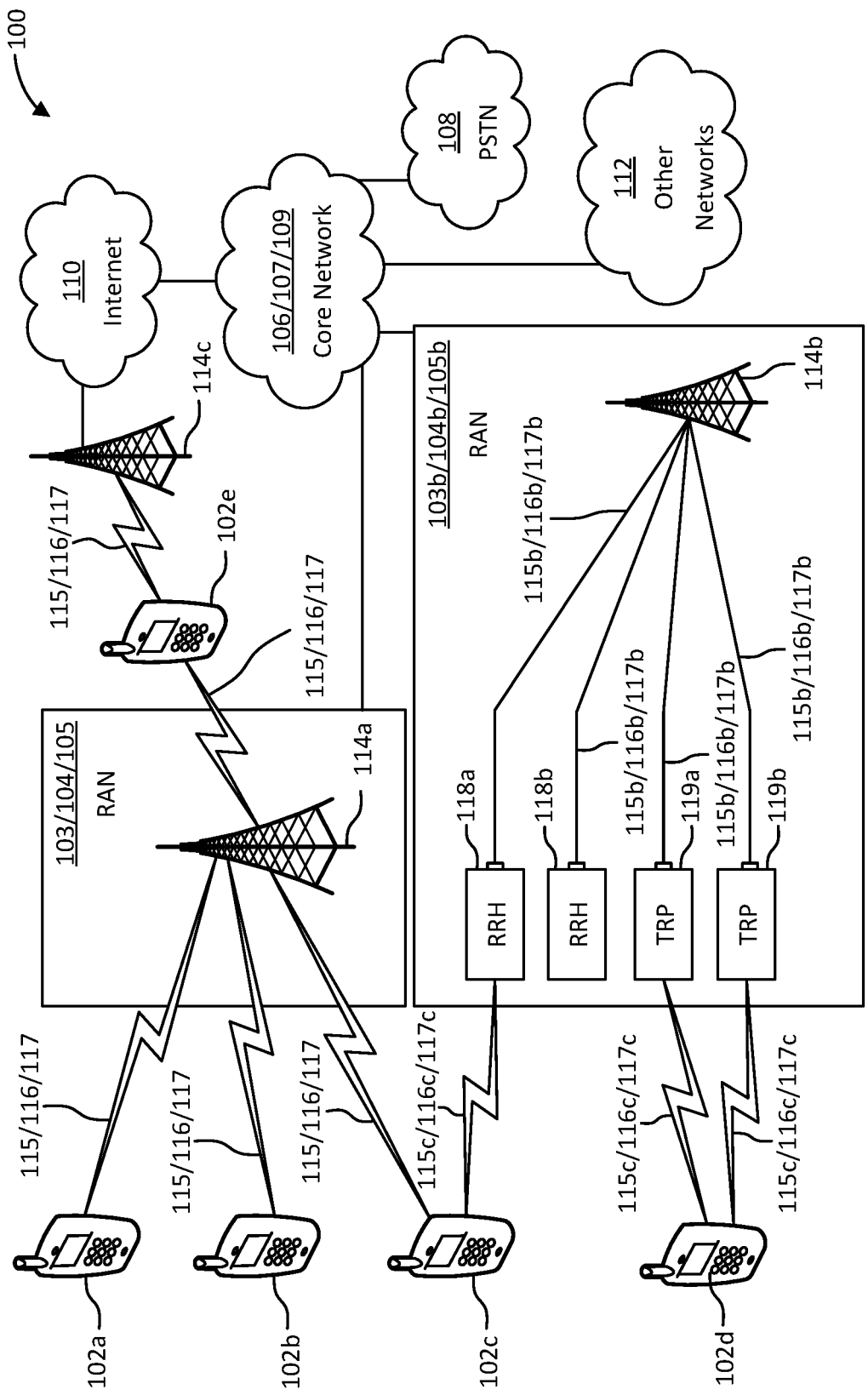
FIG. 21A illustrates one embodiment of an example communications system in which the methods and apparatuses described and claimed herein may be embodied.

FIG. 21A illustrates one embodiment of an example communications system 100 in which the methods and apparatuses described and claimed herein may be embodied. As shown, the example communications system 100 may include wireless transmit/receive units (WTRUs) 102*a*, 102*b*, 102*c*, and/or 102*d* (which generally or collectively may be referred to as WTRU 102), a radio access network (RAN) 103/104/105/103*b*/104*b*/105*b*, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d, 102e may be any type of apparatus or device configured to operate and/or communicate in a wireless environment. Although each WTRU 102a, 102b, 102c, 102d, 102e is depicted in FIGS. 21A-21E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, and 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b and/or TRPs (Transmission and Reception Points) 119a, 119b to facilitate access to one or more communication networks, such as the core network 106/107/109, the Internet 110, and/or the other networks 112. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b and/or TRPs 119a, 119b over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b and/or TRPs 119a, 119b may communicate with one or more of the WTRUs 102c, 102d over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c, or RRHs 118a, 118b and TRPs 119a, 119b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). In the future, the air interface 115/116/117 may implement 3GPP NR technology.

In an embodiment, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 21A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet another embodiment, the base station 114c and the WTRUs 102e, may utilize a cellular-based RAT (e.g., WCDMA, CDMA2000, GSM, LTE, LTE-A, etc.) to establish a picocell or femtocell. As shown in FIG. 21A, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 21A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 21A may be configured to communicate with the base station 114a, which may employ a cellular-based radio technology, and with the base station 114c, which may employ an IEEE 802 radio technology.

Figure 21B:
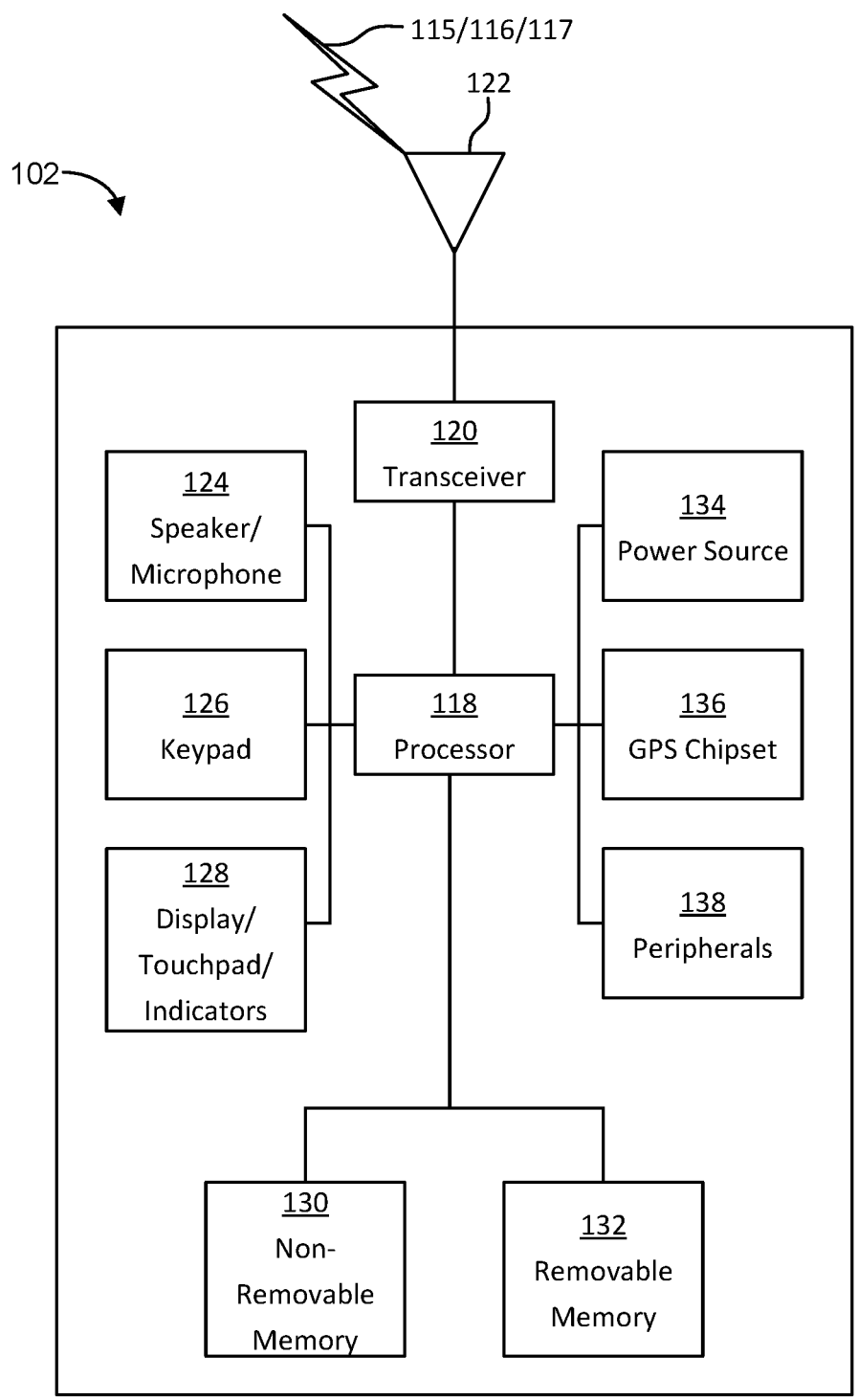
FIG. 21B is a block diagram of an example apparatus or device configured for wireless communications in accordance with the embodiments illustrated herein.

FIG. 1B is a block diagram of an example apparatus or device configured for wireless communications in accordance with the embodiments illustrated herein, such as for example, a WTRU 102. As shown in FIG. 21B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 21B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 21B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 21B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/ indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality, and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 21C:
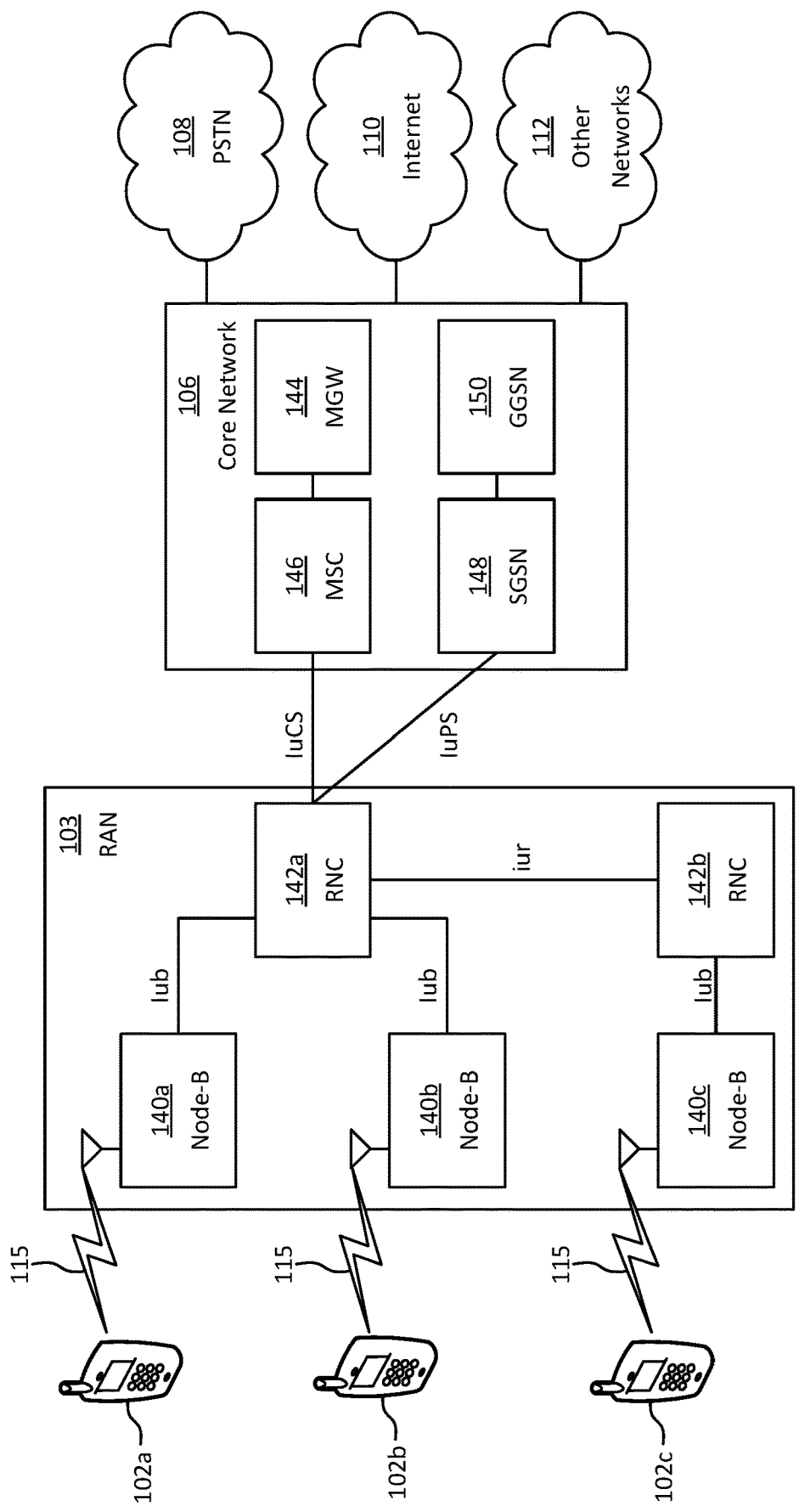
FIG. 21C is a system diagram of the RAN 103 and the core network 106 of FIG. 21A according to an embodiment.

FIG. 21C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 21C, the RAN 103 may include Node-Bs 140a, 140b, 140c, which may each include one or more transceivers for communicating with the WTRUs 102a, 102b, and 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 21C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 21C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, and 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 21D:
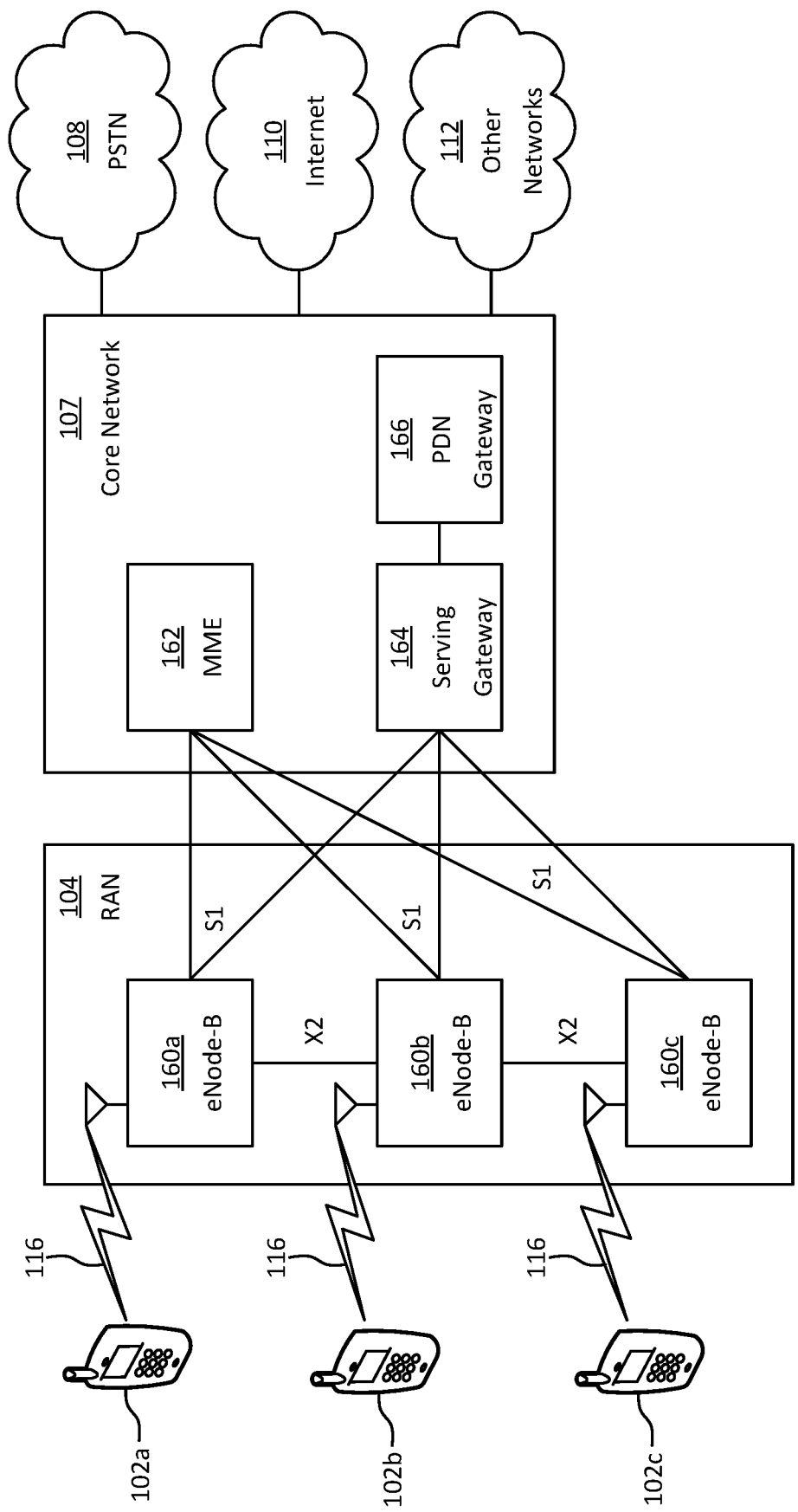
FIG. 21D is a system diagram of the RAN 104 and the core network 107 of FIG. 21A according to an embodiment.

FIG. 21D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 21D, the eNode-Bs 160a, 160b, 160c may communicate with one another over an X2 interface.

The core network 107 shown in FIG. 21D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, and 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 21E:
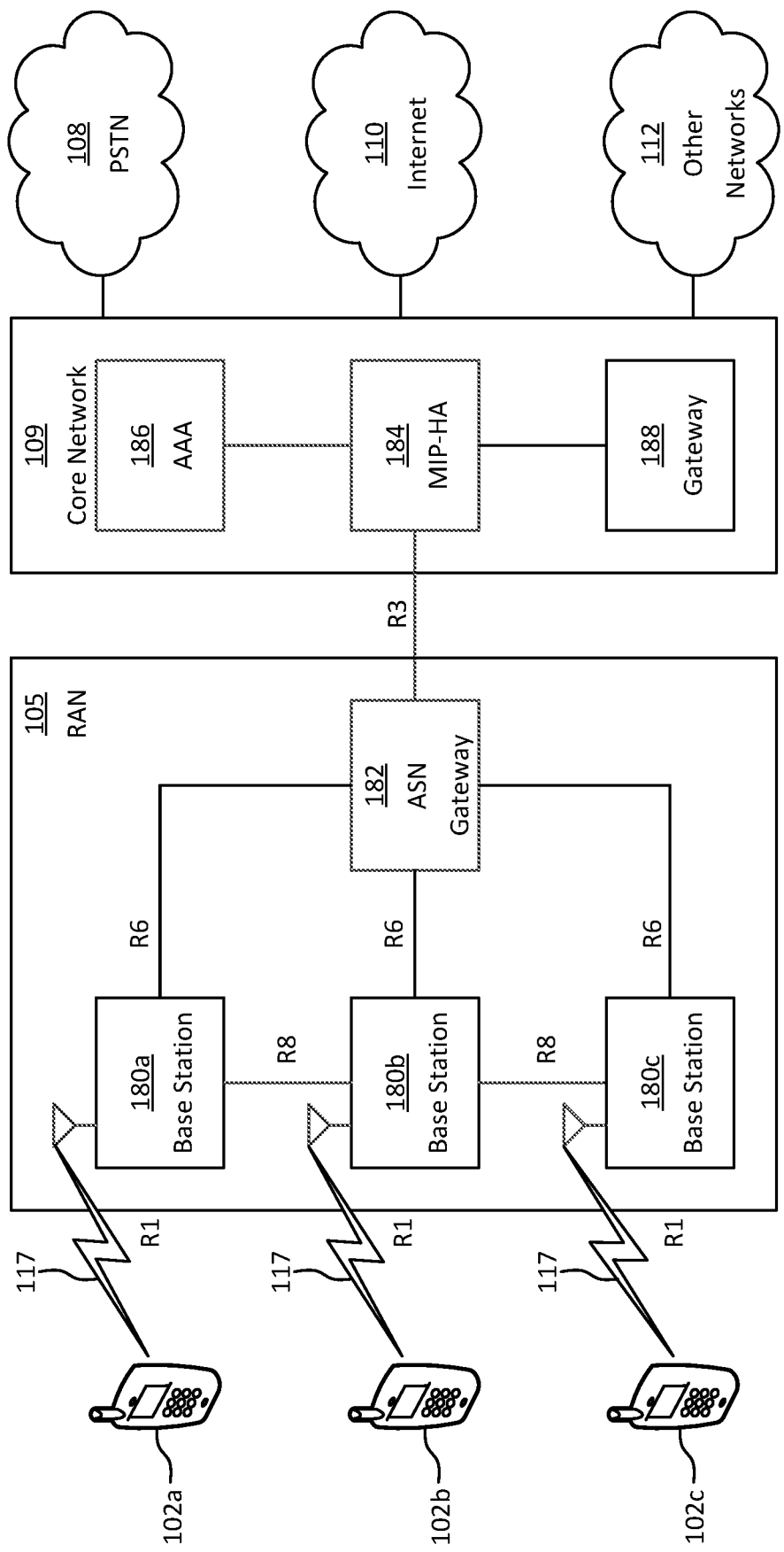
FIG. 21E is a system diagram of the RAN 105 and the core network 109 of FIG. 21A according to an embodiment.

FIG. 21E is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 21E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 21E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, and 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, and 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 21E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 21A, 21C, 21D, and 21E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 21A, 21B, 21C, 21D, and 21E are provided by way of example only, and it is understood that the subject matter disclosed and claimed herein may be embodied or implemented in any similar communication system, whether presently defined or defined in the future.

Figure 21F:
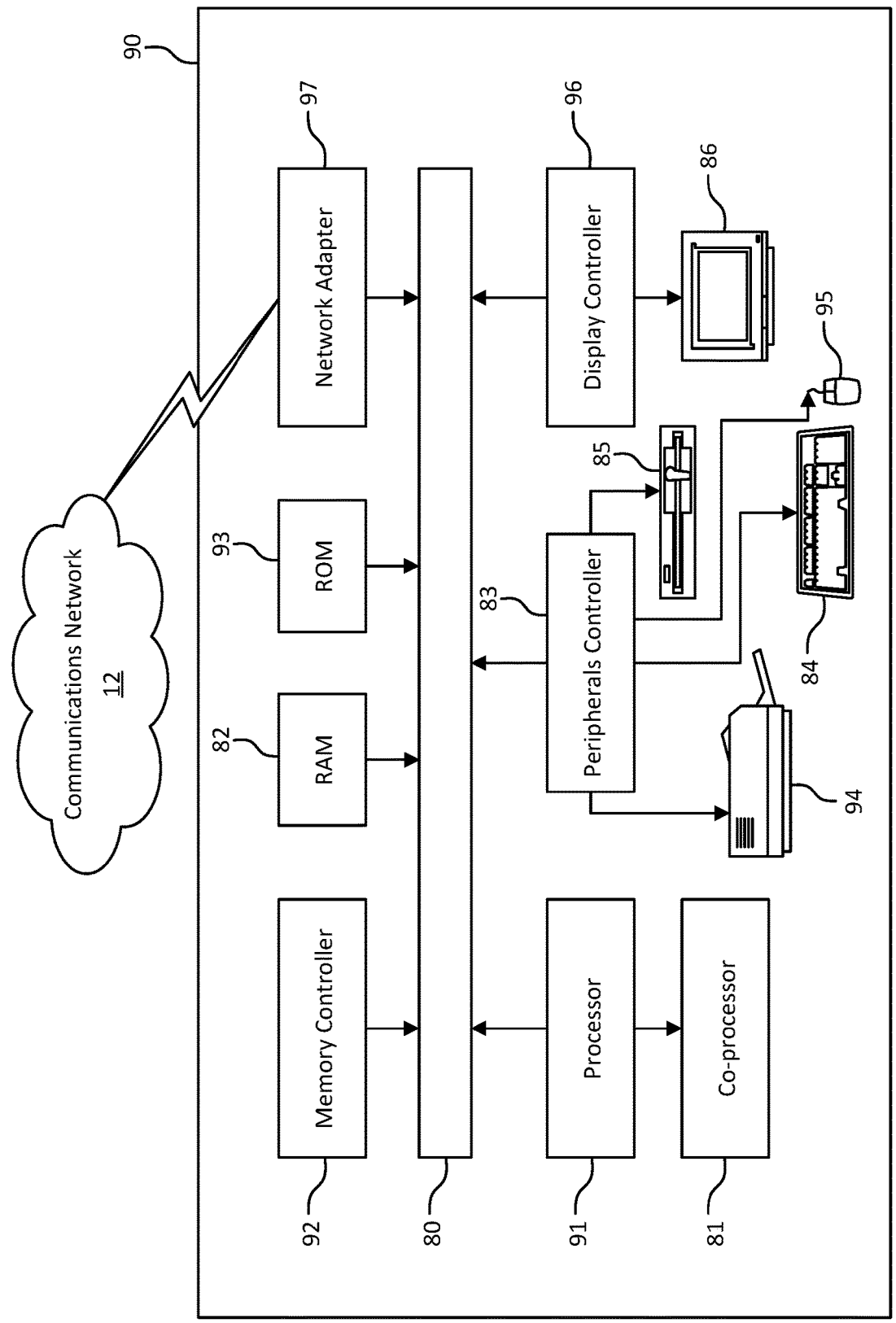
FIG. 21F is a block diagram of an exemplary computing system in which one or more apparatuses of the communications networks illustrated in FIGS. 21A, 21C, 21D and 21E may be embodied.

FIG. 21F is a block diagram of an exemplary computing system 90 in which one or more apparatuses of the communications networks illustrated in FIGS. 21A, 21C, 21D and 21E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 21A, 21B, 21C, 21D, and 21E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

Introduction of Channel Access Indicator (CAI) in NR-U

In accordance with one aspect of the systems and methods disclosed herein, NR-U may support channel access indication using a Channel Access Indicator (CAI) which may be signaled to indicate information on channel occupancy such as the cell occupying it, bandwidth/spatial direction being occupied, time of occupation, etc.

An NR-U node is one that is capable of transmitting and receiving in the NR-U band. The following terms are introduced to distinguish between the types of nodes in an NR-U channel.

Sibling-node—Node that is served by the same serving NR-U cell as the reference node. More specifically, sibling-node of a given node, may be defined as any co-channel node or any co-channel user with the same serving cell as the given node. Note: Co-channel transmission maybe UL transmission by a given UE or DL transmission to a given UE. $Node_s$ is used to denote a generic sibling-node. In other words, nodes that are in the same NR-U serving cell as the reference node are considering to be sibling-nodes. This includes the gNB of the serving cell.

General-node—Node that is not served by the same NR-U cell as the reference node. This could include nodes within another NR-U cell of the same PLMN, or another cell from different PLMN or nodes from other technologies such as WiFi. More specifically, a general node in relation to a given node, may be defined as any co-channel node or any co-channel user with different serving cell or, as any co-channel UE or co-channel user with different serving cellular RAT or non-cellular RAT than that of the given node. Note: Co-channel transmission maybe UL transmission by a given UE or DL transmission to a given UE. Node$_g$ is used to denote a generic general-node.

The CAI may serve one or more of the following purposes:

Use case 1: Indicate network occupancy for co-existence.
Use case 2: Allow nodes to identify intra-cell transmissions and improving spectral reuse.
Use case 3: Trigger a handshake from the receiver to ensure no obstruction due to a hidden node when accessing the channel.
Use case 4: Enable power savings by allowing a receiver to identify when its transmitter is transmitting.

Use Case 1: Using CAI to Indicate Network Occupancy for Co-Existence

When sibling-nodes and general-nodes detect a CAI, they may obtain the time for which the channel is occupied from the CAI; so they need not perform channel sensing during that time of occupation. FIG. 1(A) shows an example where the gNB is transmitting the CAI in Cell$_1$ indicating the source of transmission, i.e. Cell$_1$ is occupying the transmission. It may also indicate its time of occupancy for the channel. Node UE$_1$ from Cell$_1$ identifies this as an intra-cellular transmission. General-nodes such as UE$_2$ from NR-U Cell$_2$, gNB$_2$ on NR-U Cell$_2$ identify it as a transmission from a node outside their cell but may read the time of occupancy. Node$_3$ in a WiFi network may have the capability to detect and read the CAI from the NR-U network. The general-nodes may not perform LBT until the occupancy time of Cell$_1$ elapses. FIG. 1(B) shows this method for response of general nodes upon hearing a CAI from Cell$_1$ where the nodes resume CCA (clear channel assessment) after the time of Cell$_1$'s channel occupation. CCA is the initial channel sensing in which at least energy detection (ED) is performed over certain time duration with a certain threshold.

In general, the CAI may be signaled in both the DL and UL. In autonomous UL (AUL) and semi-persistent scheduling a UE may be semi-statically configured for its resources. It is not assured that the UE's resources are within the MCOT of its gNB. In this case, the UE may perform a method like CAT 4 LBT to determine channel availability and it transmits the CAI in the UL following successful LBT.

Use Case 2: Using CAI to Indicate Spectral Reuse

Figure 4:
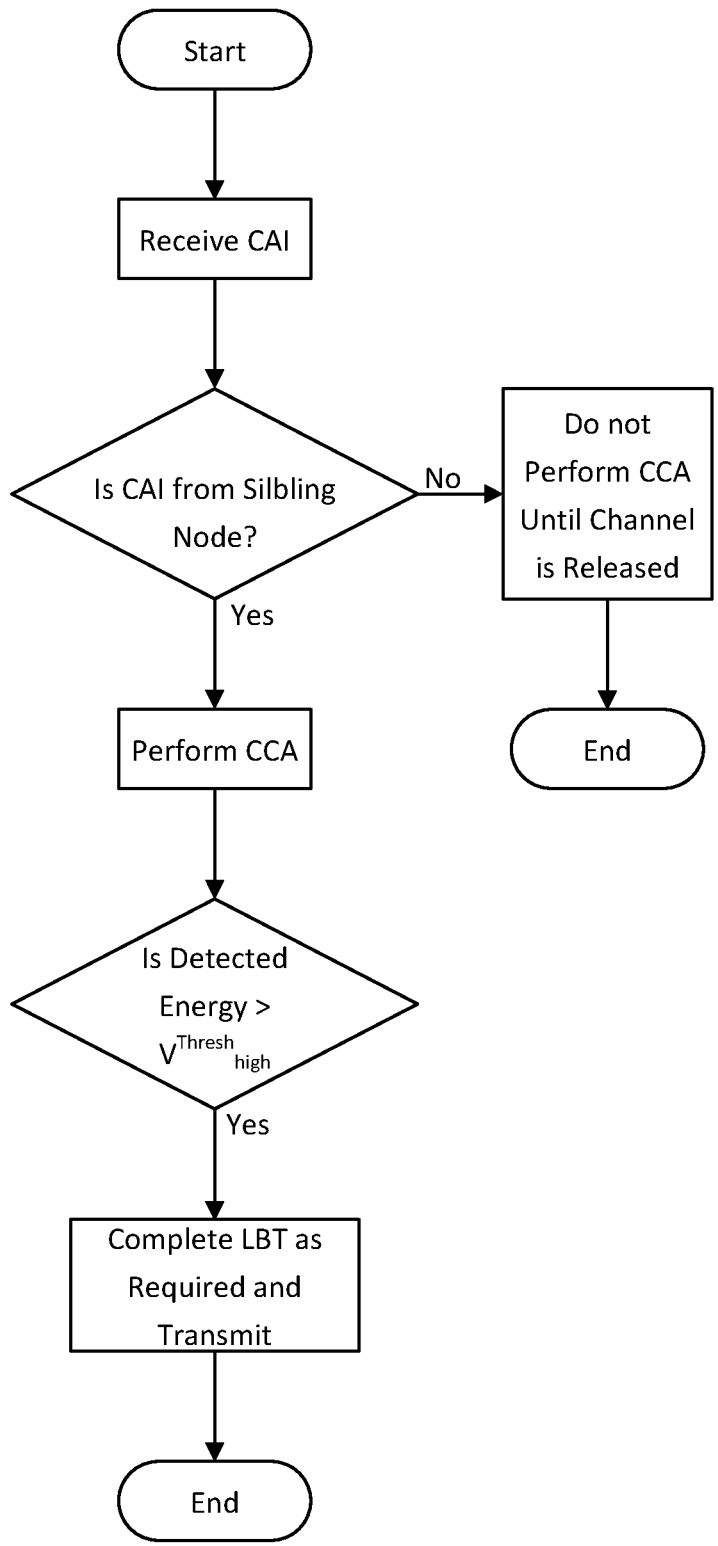
FIG. 4 illustrates a method for performing CCA with higher threshold on detecting a CAI from sibling-node.

When a node recognizes that the channel is occupied by another node which is in its own cell, it can adjust its threshold for energy detection accordingly—it may use a higher threshold $V_{high}^{thresh}$ for energy detection to determine LBT failure if the energy is from a sibling-node compared to a lower threshold $V_{low}^{thresh}$ that would normally be used in CCA in the absence of CAI. The method in FIG. 4 illustrates this concept.

Figure 2:
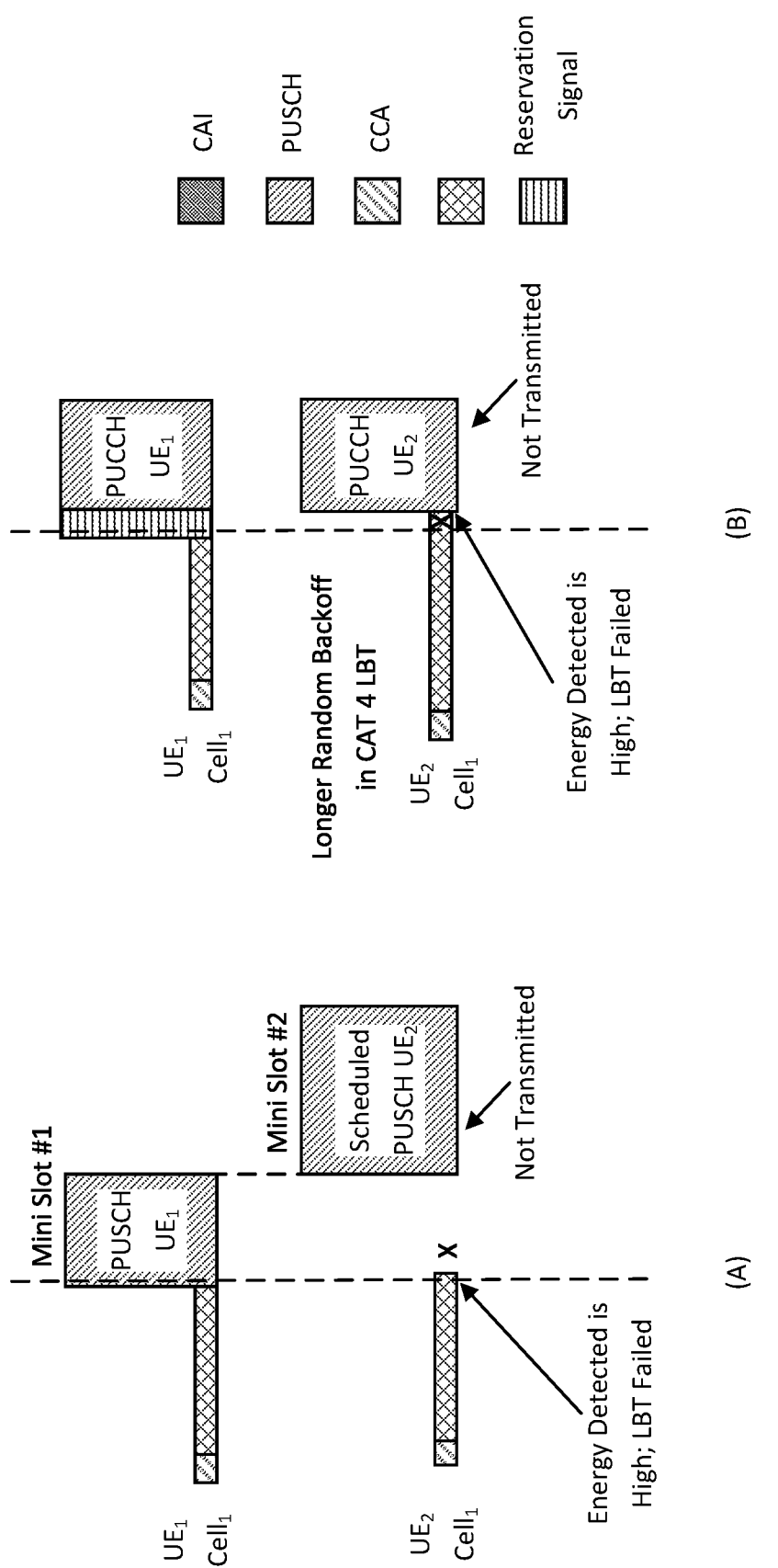
FIG. 2 illustrates sibling-nodes affected by LBT procedure from detection of high energy in channel including (A) TDM UEs of cell—UE transmitting later blocked by UE transmitting first and (B) a UE multiplexed in same time/frequency resources as another is blocked from channel access.

This feature is useful especially in the UL where multiple UEs are multiplexed in frequency or time and allows for better spatial reuse. When a UE detects intra-cell usage and high energy in the channel the CAI will enable it to transmit as the detected energy is from multiplexed intra-cell UEs. Sibling nodes share co-channel resources through multiplexing. They may be multiplexed on to the same time/frequency resources or multiplexed in time only or multiplexed in frequency only or multiplexed in both time and frequency. For example, in NR UL, multiple UEs share PUCCH resources (orthogonally), multiple UEs share resources in NOMA non-orthogonally, or multiple UEs are time/frequency multiplexed for PUSCH. Take the example of two sibling nodes multiplexed in time as UE$_1$ has UL transmission in mini-slot #1 and UE$_2$ has UL transmission in minislot #2 as seen in FIG. 2(A). UE$_2$ gets blocked due to energy levels from UE$_1$. Similarly, if two sibling-nodes are multiplexed in the same frequency and time resources for PUCCH and perform CAT 4 LBT to transmit, UE$_1$ may get access to the channel earlier. UE$_2$'s random backoff may be larger, so it listens to UE$_1$ and assumes the channel cannot be accessed as seen in FIG. 2(B). If a sibling-node UE$_2$ performs energy detection, it detects energy from UE$_1$ and may not transmit in scheduled resources. So within an NR-U cell, although multiplexed nodes should be able to transmit in scheduled resources, they may fail CCA/LBT due to higher energy levels from other sibling-nodes.

Figures 3A, 3B:
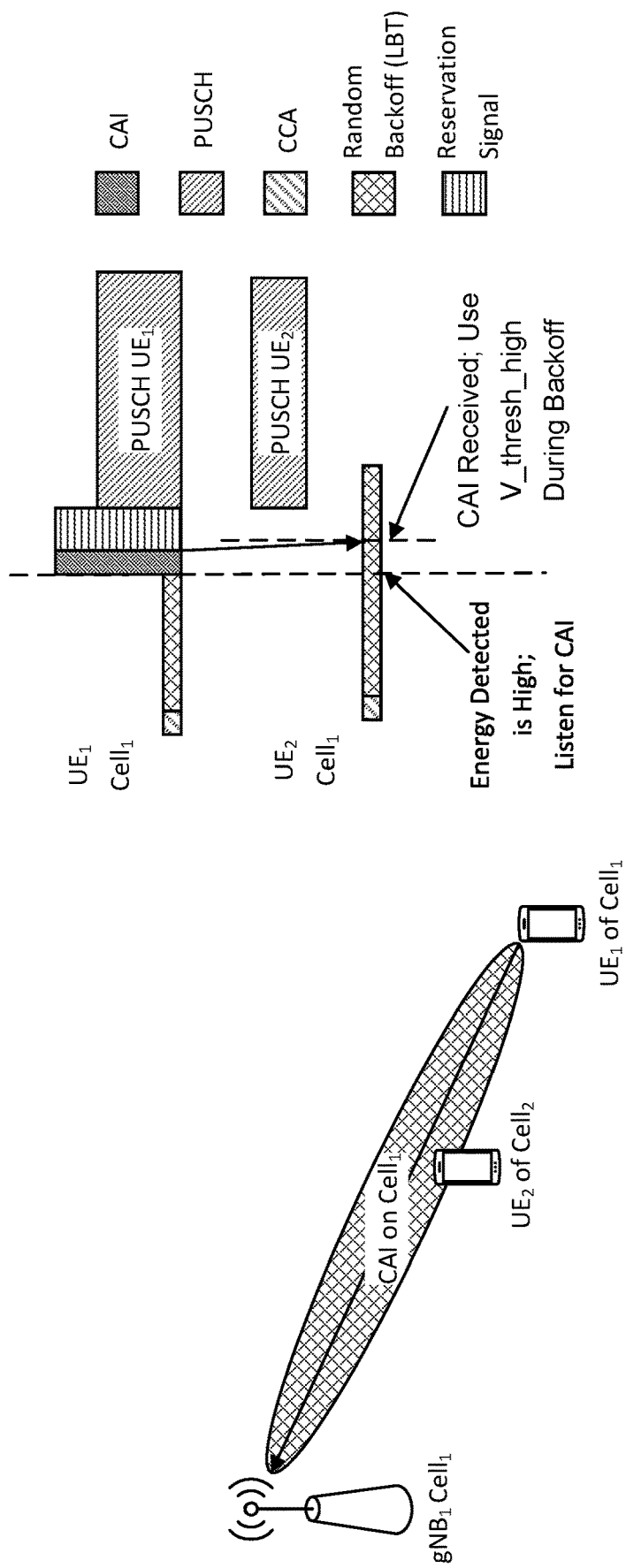
FIG. 3A illustrates CAI transmission for spectral reuse amongst sibling-nodes.
FIG. 3B illustrates changing the energy detection threshold during LBT on detecting CAI from sibling node.

As seen in FIG. 3A, the UE$_1$ transmits the CAI. Upon hearing it, UE$_2$ identifies a sibling-node transmission and transmits it scheduled multiplexed PUSCH.

Figure 3D:
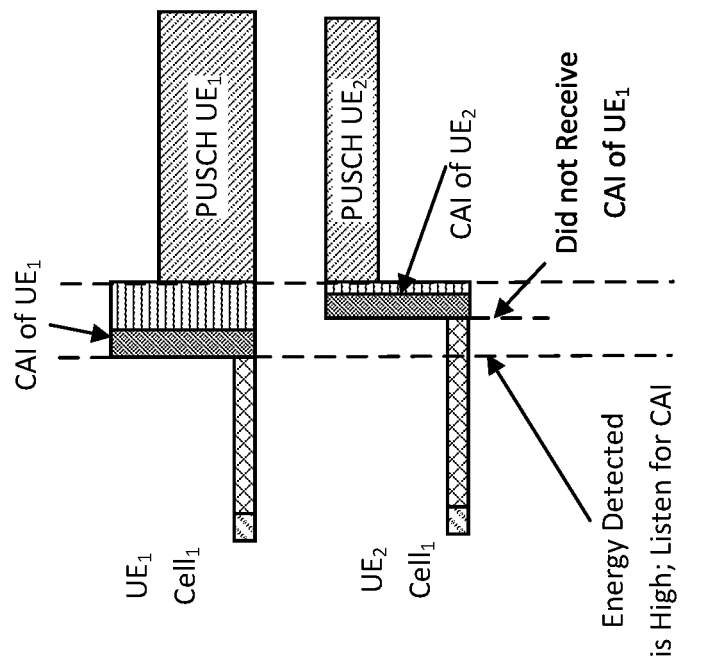
FIG. 3D illustrates transmission of CAI on UL by multiple UEs.
Figure 3C:
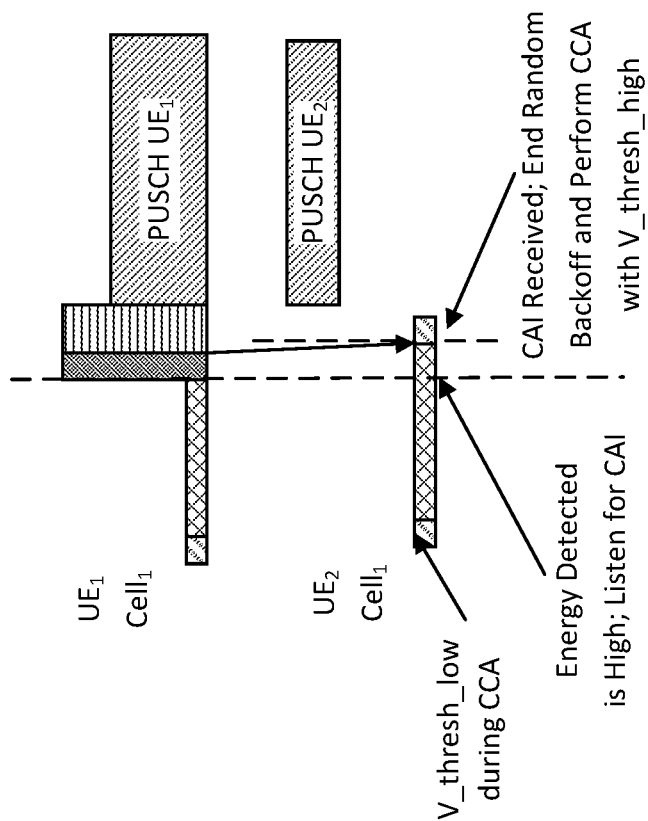
FIG. 3C illustrates terminating the LBT on detecting CAI from sibling-node and performing CCA with higher threshold.
Figure 5A:
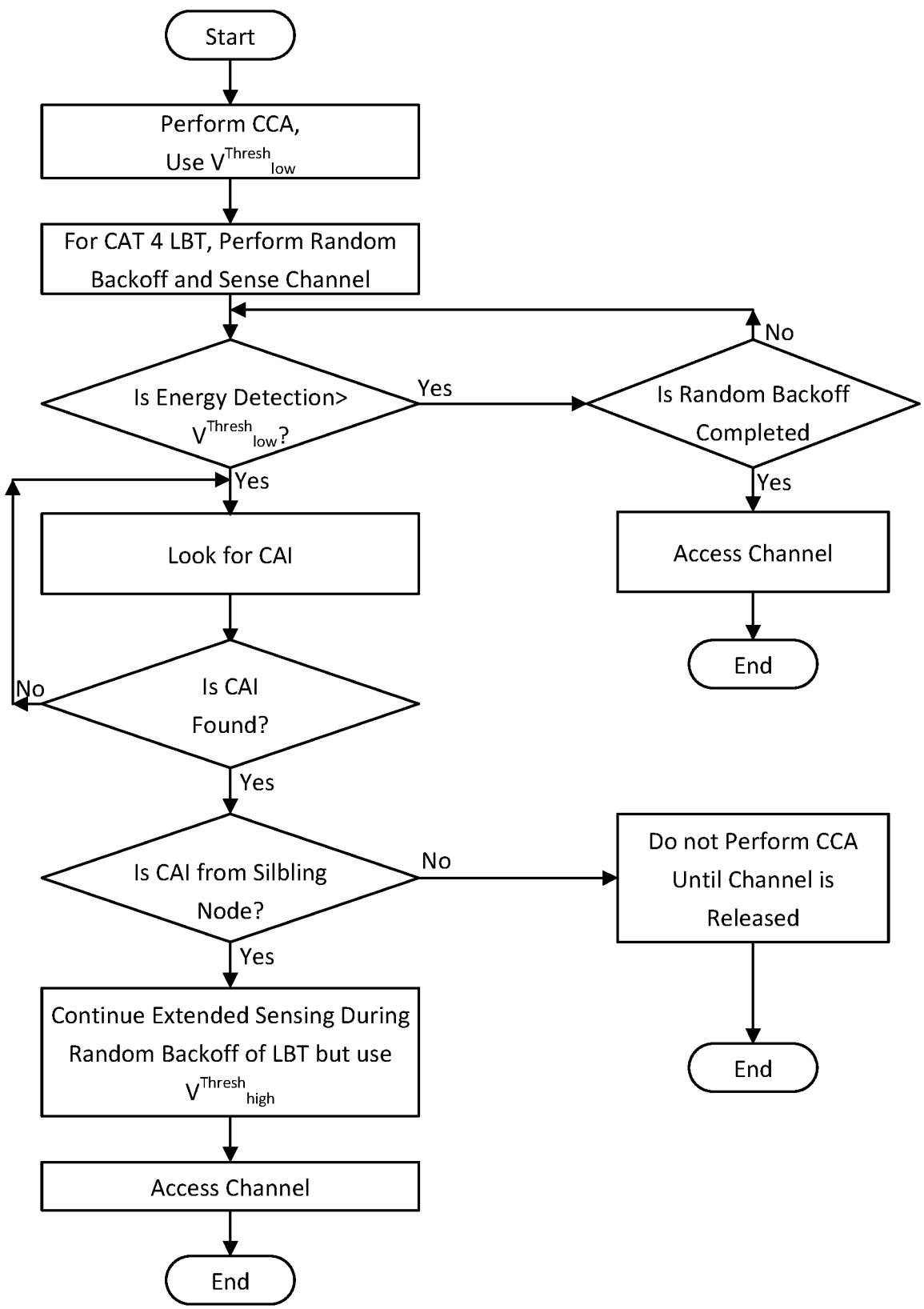
FIG. 5A illustrates a method for identifying intra-cell transmission for spectral reuse wherein on detection of sibling-node CAI, threshold is switched to higher value during an LBT.

To ensure that a UE's CAI is heard by other UEs, especially sibling-node UEs that are multiplexed, it is proposed herein that a method similar to CAT 4 LBT is used—this causes the UEs to backoff randomly. A UE that gains access first to the channel transmits the CAI and the other UEs with larger backoff hear this CAI. As shown in FIG. 3B and FIG. 3C, UE$_1$ obtains channel access before UE$_2$ and transmits its CAI. UE$_2$ starts sensing the channel with CCA with $V_{low}^{thresh}$ as part of CAT 4 LBT. As it continues to the sense the channel during its random backoff, it detects higher energy. So UE$_2$ listens for a CAI. It detects the CAI and recognizes it as an intra-cell transmission. At this point UE$_2$ may do one of the following:

UE$_2$ changes it LBT threshold to $V_{high}^{thresh}$ and continues extended sensing with the higher threshold. If the energy is within this threshold, it transmits its scheduled PUSCH which is in FDM resources with that of UE$_1$. This is shown in FIG. 3A(B). The method is provided in FIG. 5A.

Figure 5B:
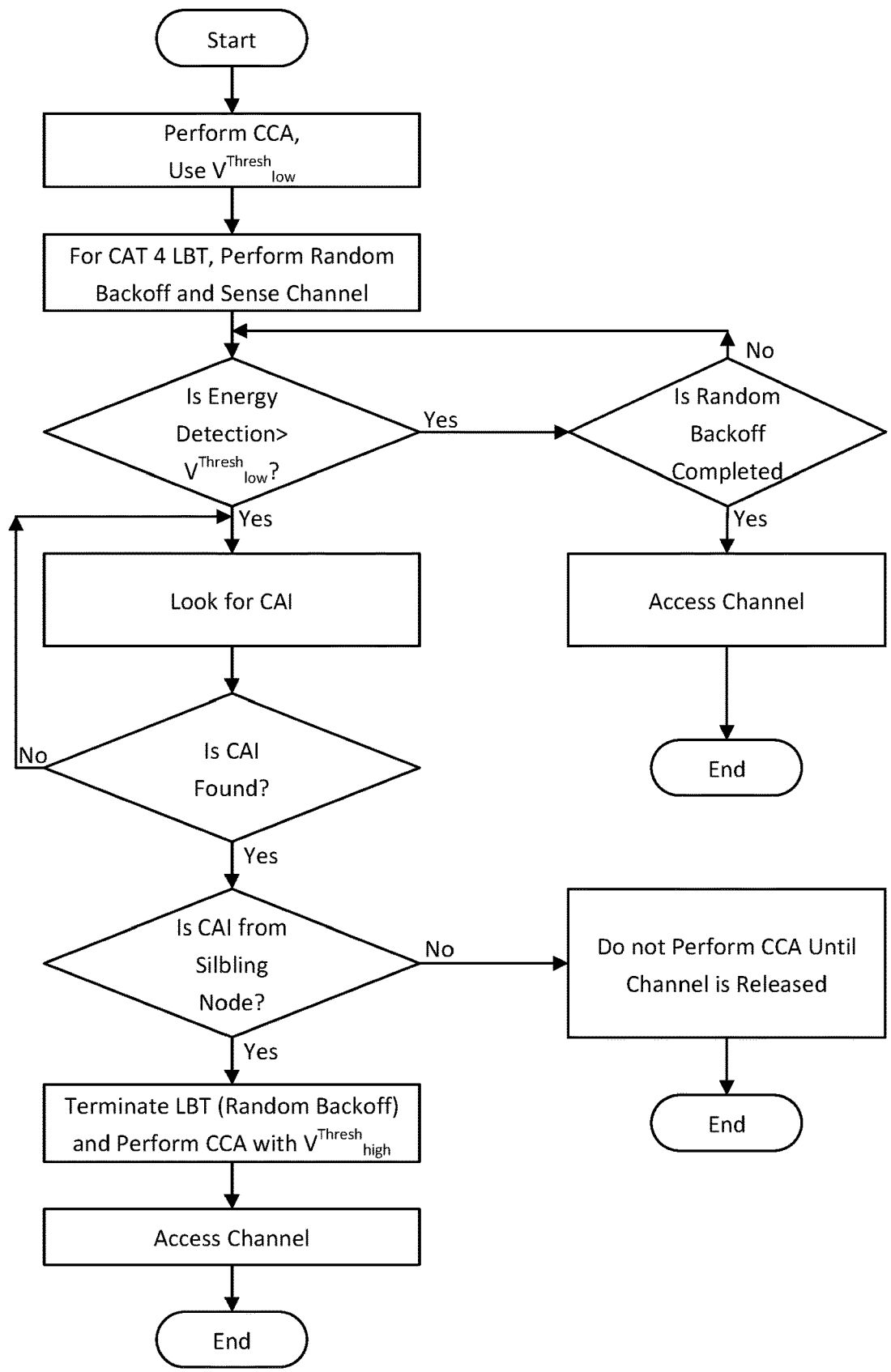
FIG. 5B illustrates a method for identifying intra-cell transmission for spectral reuse wherein on detection of sibling-node CAI, CCA is performed with higher threshold.

UE$_2$ changes end its current LBT and resets its random backoff timer. It performs CCA using $V_{high}^{thresh}$ which is typically a short procedure (such as a 25 μs CCA). If it is successful, UE$_2$ proceeds with its scheduled PUSCH transmission. This is shown in FIG. 3C. The method is provided in FIG. 5B.

If a UE does not receive the CAI from a sibling-node, it may transmit its own CAI. FIG. 3D shows an example where UE$_2$ does not hear the CAI from UE$_1$ and transmits its own CAI. Other sibling-node UEs or gNB may hear both UE$_1$ and UE$_2$'s CAI. So the CAI from multiple UEs may collide in time/frequency. According to one aspect, the UL CAI design may be robust to collision by using orthogonality/low correlation between the CAI from different UEs. One way to get orthogonality is to provision different frequency resources for the CAI of different UEs. Another way to provide robustness is through sequences such as PRACH with good cross correlation properties.

Figure 3E:
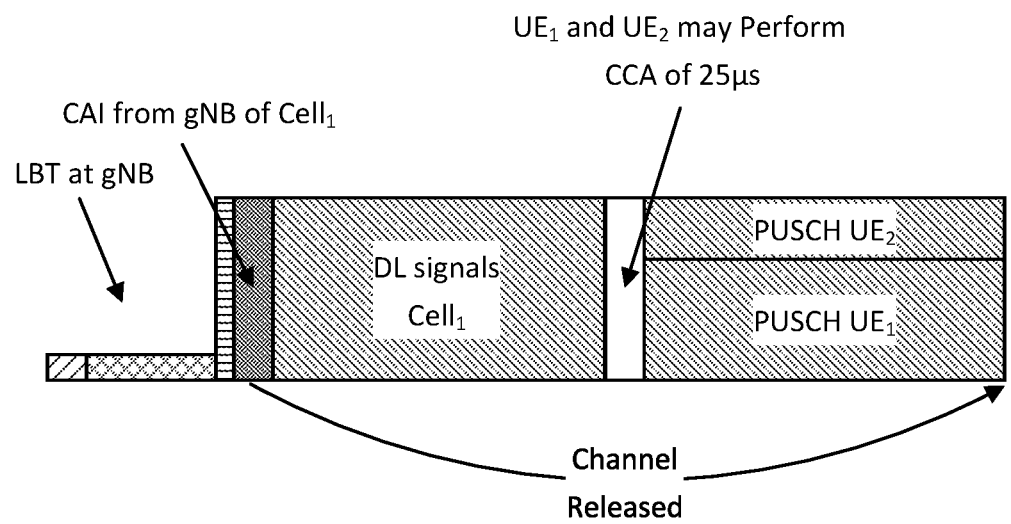
FIG. 3E illustrates transmission of CAI by gNB to indicate that sibling-nodes (UEs) should use higher threshold.

The CAI may also be signaled by the gNB on Cell$_1$ to indicate the occupancy time. The CAI may implicitly indicate to Cell$_1$ UEs that are scheduled or configured to transmit within that occupation time may do so with a higher threshold for CCA. For example, in FIG. 3E, on receiving the CAI from their gNB, UE$_1$ and UE$_2$ perform a single instance CCA and use a higher threshold $V_{high}^{thresh}$ determining channel access.

For the UE, the threshold for the LBT energy level sensing may be configured by the gNB as part of the UL grant or through RRC in a cell-wide or UE-specific manner. For example, if two UEs are multiplexed in frequency where $UE_1$ occupies 80% of the frequency resources whereas $UE_2$ occupies the remaining 20%, the $V_{high}^{thresh}$ used by $UE_2$ may be higher than for $UE_1$. The gNB may configure a table of values for the $V^{thresh}$ values to a UE. It may indicate the actual value to be used as an index into the table. The index may be signaled as in a DCI format such as 1_1, 0_1, 1_0 or 0_0. If a BWP for the UE is not configured to support a field for indicating the index, the UE may apply $V_{low}^{thresh}$ for LBT regardless of whether it detects sibling-node's CAI.

It may also provide RRC configured values to use in certain scenarios—for example, the $V^{thresh}$ may be configured to specific value for PRACH signaling as the gNB does not have knowledge of the number of UEs that may access it.

Alternatively, the UE may implicitly derive its threshold from a reference threshold value configured for a BWP. If a UE occupies a fraction of the bandwidth part, it may scale the reference threshold by the fraction.

The CAI may be used as the reservation signal to ensure efficient use of the spectrum.

FIG. 4 shows the general procedure at nodes upon receiving a CAI from a sibling-node.

Use Case 3: Using CAI to Handshake Between Tx and Rx to Overcome Hidden Nodes

A CAI from the transmitter indicates that the channel is available at the transmitter. It may also request a handshake from the receiver to ensure that the channel is available at the receiver before scheduling large payloads. This helps to resolve the problem of hidden nodes in the receiver's vicinity. In this case, the CAI from the transmitter may be defined as CAI-initiate (CAI-I), and the CAI response from the receiver may be defined as CAI-response (CAI-R). If the CAI-R is not received at the initiating node, it assumes that the responder failed LBT in which case the initiator may not transmit to the responder until a later time. CAI-I and CAI-R may be sent by both the gNB and UE.

When gNB sends CAI-I, it may wait for CAI-R before scheduling grants to the UE. The CAI-I may be transmitted after a Cat 4 LBT as the initiating node intends to use the channel to transmit payload to the responding node. The sensing at the responding node may be in the form of a CCA (that may be a short interval sensing such as 25 µs sensing in LTE unlicensed for DRS in FR1) which is short and reduces the likelihood of other nodes occupying the channel during the sensing period.

Figure 6:
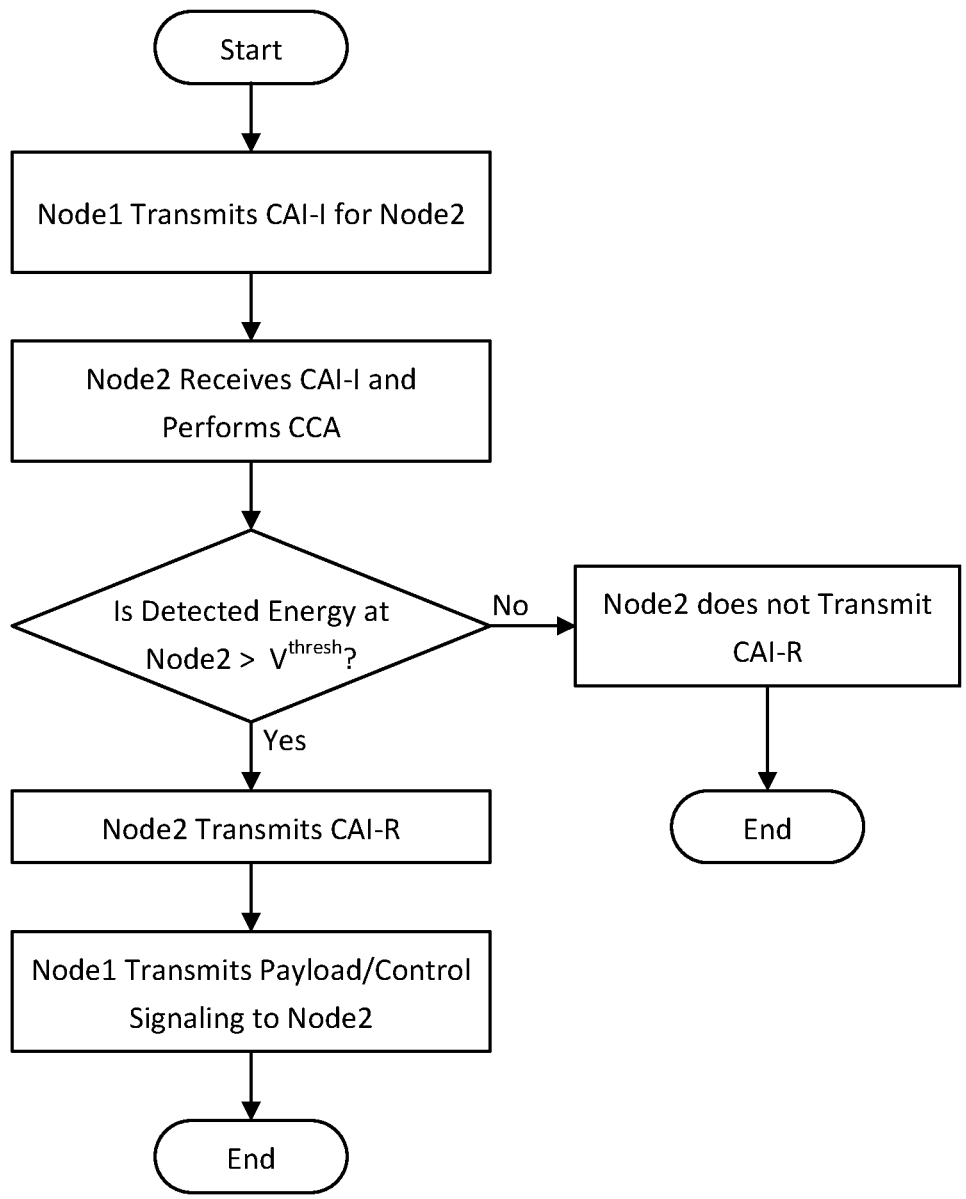
FIG. 6 illustrates a method for handshake using CAI-I and CAI-R.

FIG. 6 shows a method for establishing a handshake between two nodes.

Figure 7:
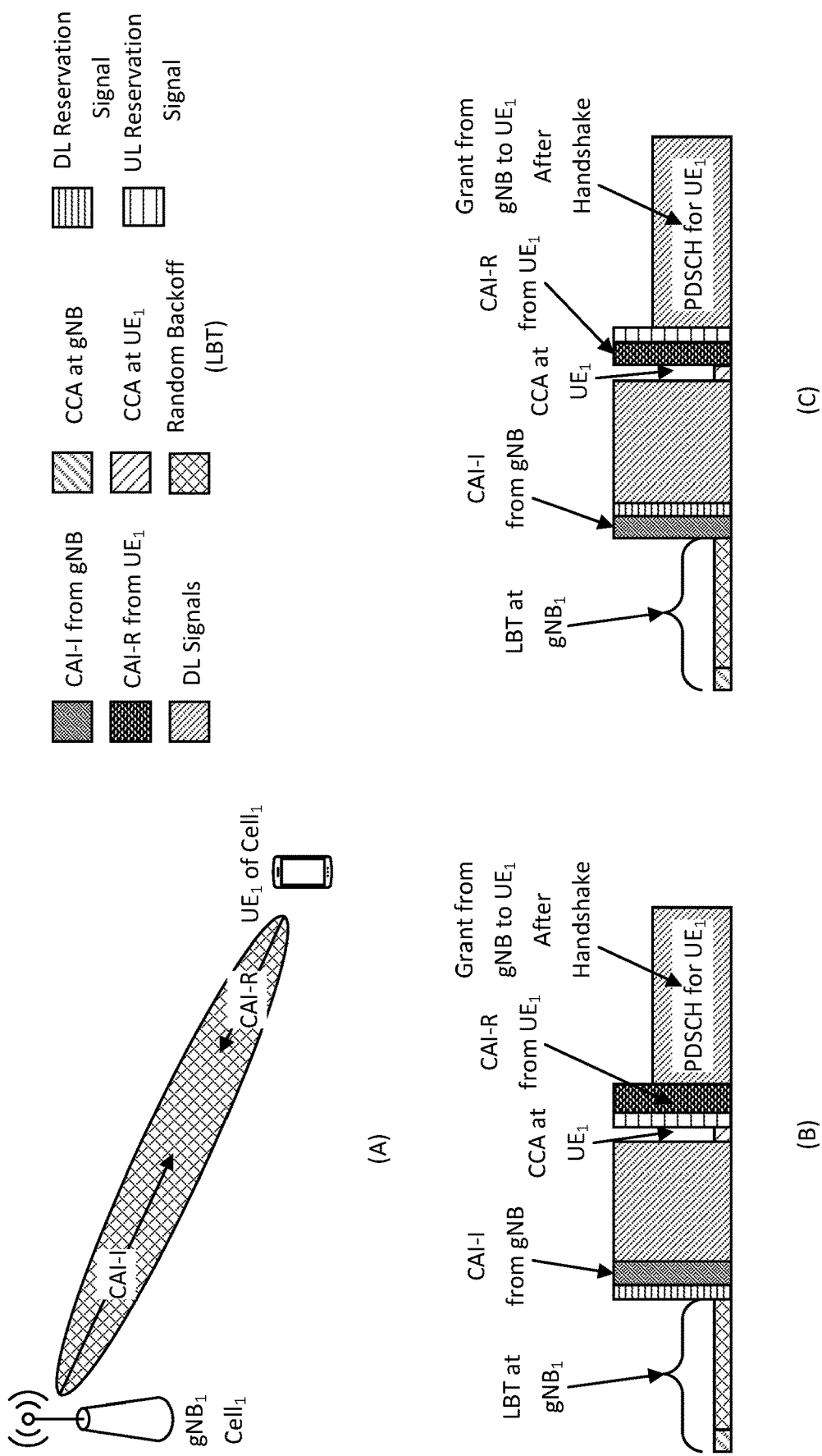
FIG. 7 illustrates (A) Using CAI-I and CAI-R for handshake, (B) Transmission of CAI synchronized to OFDM symbol boundary, and (C) Transmission of CAI asynchronous to OFDM symbol boundary.

FIG. 7(A) illustrates the concept of handshake between two sibling nodes with gNB initiating the CAI-I and the UE responding with CAI-R. The CAI-I may also be transmitted by a UE on the UL, especially when performing CAT 4 LBT procedure. The gNB may respond with CAI-R if the gNB's channel is clear after which the UE transmits the UL signals such as PUSCH or PUCCH.

As shown in FIG. 7(B), CAI-R may be synchronous to the symbol boundary. To achieve this, the responding node transmits a reservation signal following the LBT. The initiating node receives the CAI-R assuming that it has symbol boundary alignment. Synchronous transmission is useful in cases where the amount of information carried in CAI is high and required to be carried in signals such as PDCCH or PUCCH.

Alternatively, as shown in FIG. 7(C), CAI-I and CAI-R may be transmitted asynchronous to the symbol boundary. CAI may carry only a few bits of information and may be signaled in way that it can be detected through correlation in time (such as with preambles), in such a case asynchronous transmission of CAI is preferred to keep the latency low. For the CAI-R especially this enables to keep the latency to complete the handshake is kept at a minimum. The responding node may transmit a reservation signal following the CAI-R to reserve the channel at least for the duration it takes for the initiating node to detect it so that no other node takes the channel. Then the initiating node may transmit to the responding node without performing LBT again. So a reservation signal may be transmitted after the CAI-R is transmitted.

The reservation signal may be generated by repeating the CAI-R signal for the required duration.

As the CAI-R may be used by the gNB to assess the UE's environment when other multiplexed UEs are transmitting, the gNB may occasionally trigger the CAI-R for a given UE and use the result to determine future scheduling. UE may also transmit the detected energy levels (during LBT) back to the gNB. This helps to detect the impact of sibling UEs' interference to a given UE in the UL; gNB can make decisions on multiplexing UEs (orthogonally or non-orthogonally) based on the CAI-R. In this case, the UE may be RRC configured with resources for CAI-R but the UE transmits the CAI-R only when it receives a trigger through the CAI-I.

Use Case 4: Using CAI to Enable Power Savings

A receiver node such as a UE may monitor channel occupancy of its transmitter, for example the gNB in a low power state where it monitors only for the CAI. On receiving the CAI, the receiver switches to a nominal power state where it monitors control channels, data channels and reference signals from the transmitter. On expiration of the COT, the receiver may return to the low power state to monitor the CAI.

Methods Related to CAI

Transmission Occasion of CAI

If $Node_1$ sends CAI at time t ms, then $T_{REL}$ms may be defined as the time when $Node_1$ releases the channel. So, $T_{REL}$=t $T_{OCC}$ms where $T_{OCC}$ is the indicated time of occupancy of the channel. $T_{REF}$ may be defined as the duration of a known interval such as a slot or OFDM symbol or subframe or half frame in a reference numerology. For the remaining discussion, consider the example where $T_{REF}$ is given in terms of the slot duration of a reference numerology. $T_{OCC}$ (in ms) may be defined as a multiple of $T_{REF}$. So the CAI may use D bits to indicate $T_{OCC}$ in terms of the reference slot duration.

$Node_1$ may obtain the largest $T_{OCC}$ of value $T_{OCC}$=$T_{MCOT}$, where $T_{MCOT}$ is the time of the MCOT for the $Node_1$ for that channel access instance and $T_{MCOT}$ may be based on the priority class for LBT used in the channel access. In such a case, the M bits for MCOT may not be separately transmitted.

Figure 8:
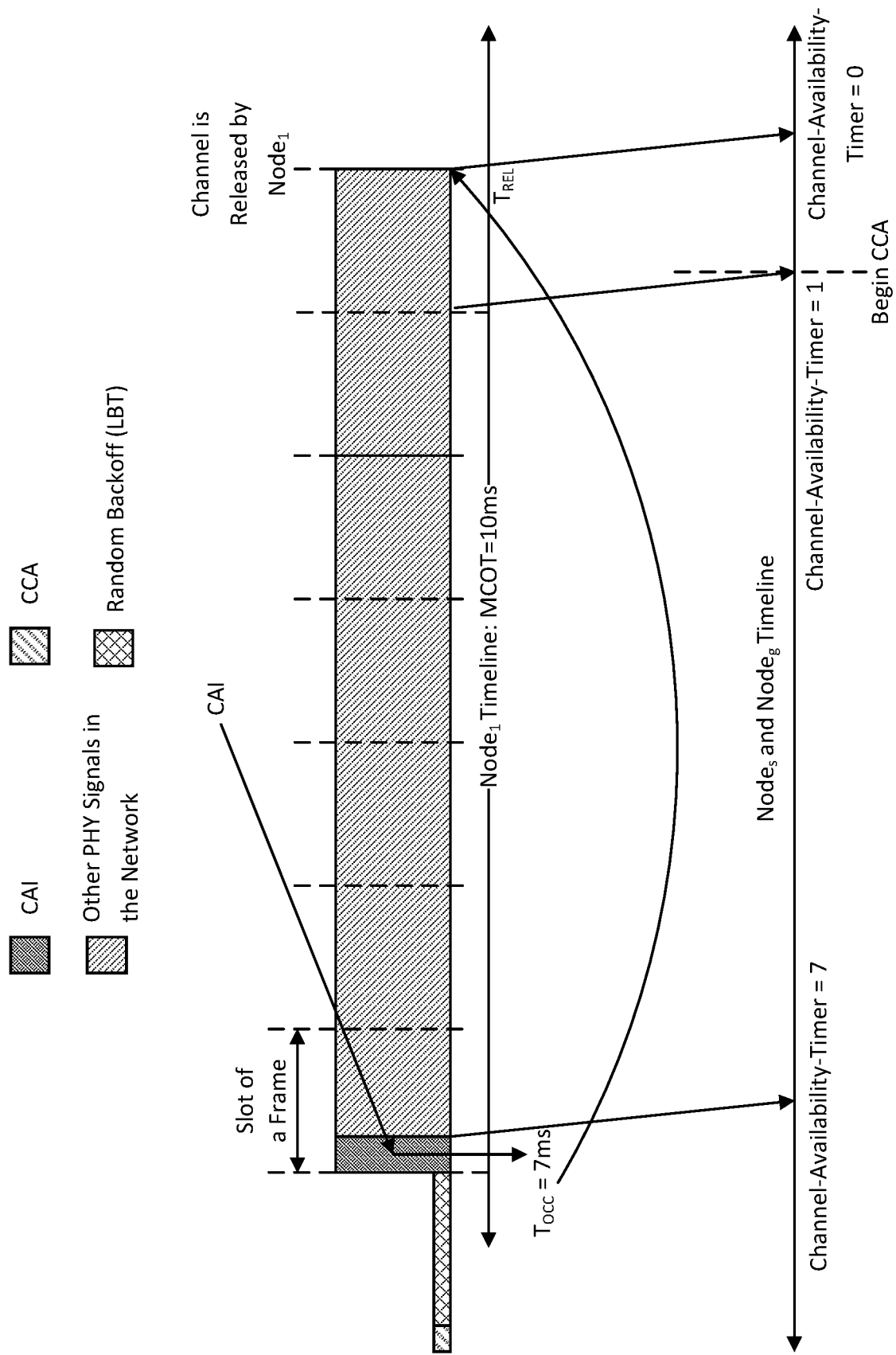
FIG. 8 illustrates indicating channel occupany and release time using $T_{OCC}$ in CAI.

FIG. 8 gives an example for indicating the $T_{OCC}$ in CAI. Here $Node_1$ gets access to the channel with $T_{MCOT}$=10 ms and transmits CAI in slot #N of a frame. $Node_1$ intends to use the channel for 7 slots and then release it. So the CAI indicates $T_{OCC}$=7 ms assuming $T_{REF}$=1 ms.

Nodes and $Node_g$ may use the following method to operate on the $T_{OCC}$. At Nodes and $Node_g$, upon reception of the CAI, a channel-availability-timer is set to $T_{OCC}$. It is assumed that Nodes and $Node_g$ know $T_{REF}$. The counter decrements every $T_{REF}$. Nodes and $Node_g$ expect that the channel is available when the timer reaches 0.

The CAI may be transmitted at the beginning of the slot, to ensure that the channel is truly released when the counter gets reset. But it may not always be possible to transmit CAI at the beginning of the slot. Additionally, to account for propagation delay and receiver latency to decode CAI, Nodes and Node$_g$ may begin to monitor the channel after the timer reaches c≥0. A typical setting may use c=1.

Figure 9:
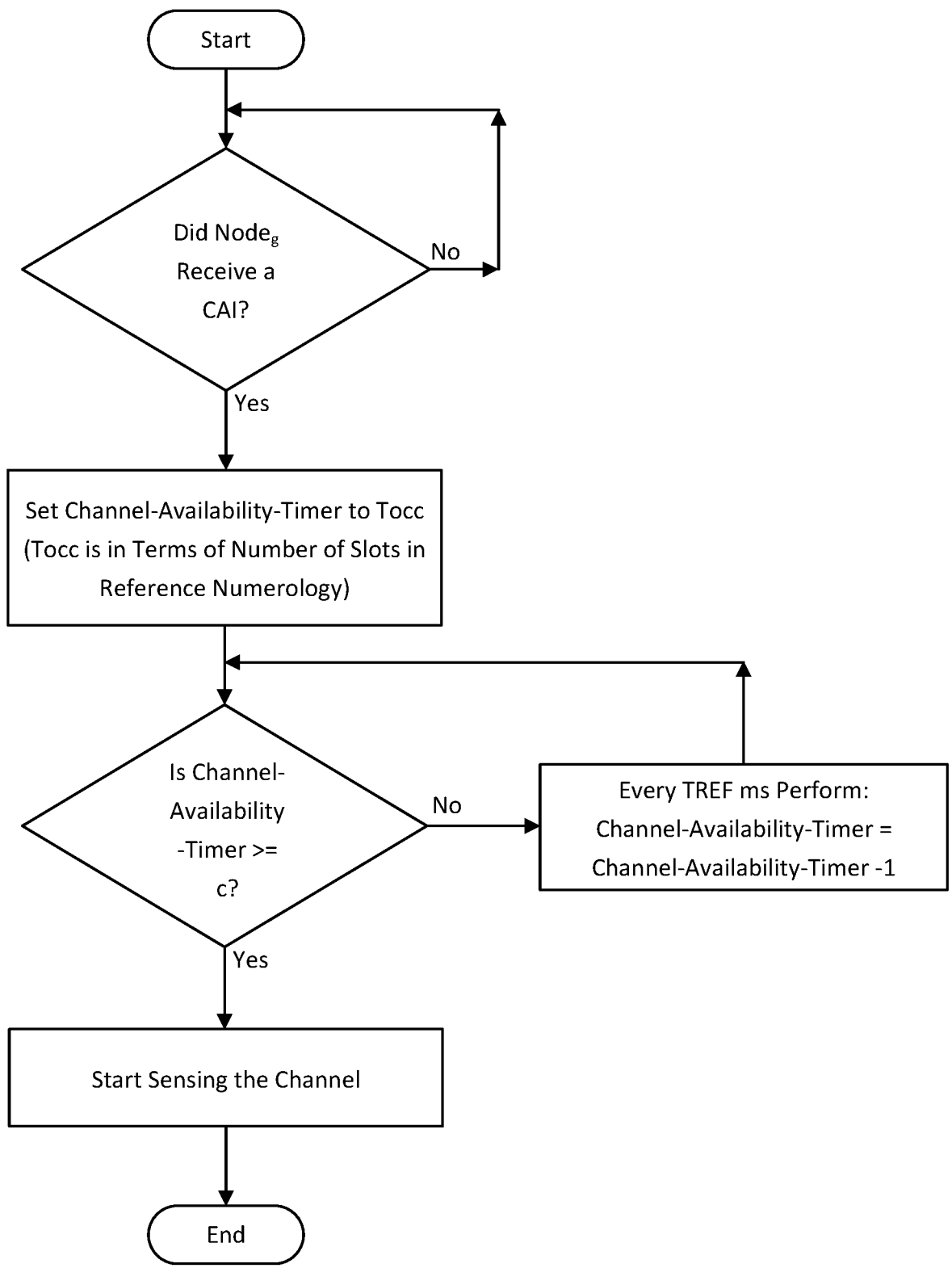
FIG. 9 illustrates a method for sensing the channel (timer decrementing) on reception of CAI.

FIG. 9 shows a method for using the timer at a general-node.

Figure 10:
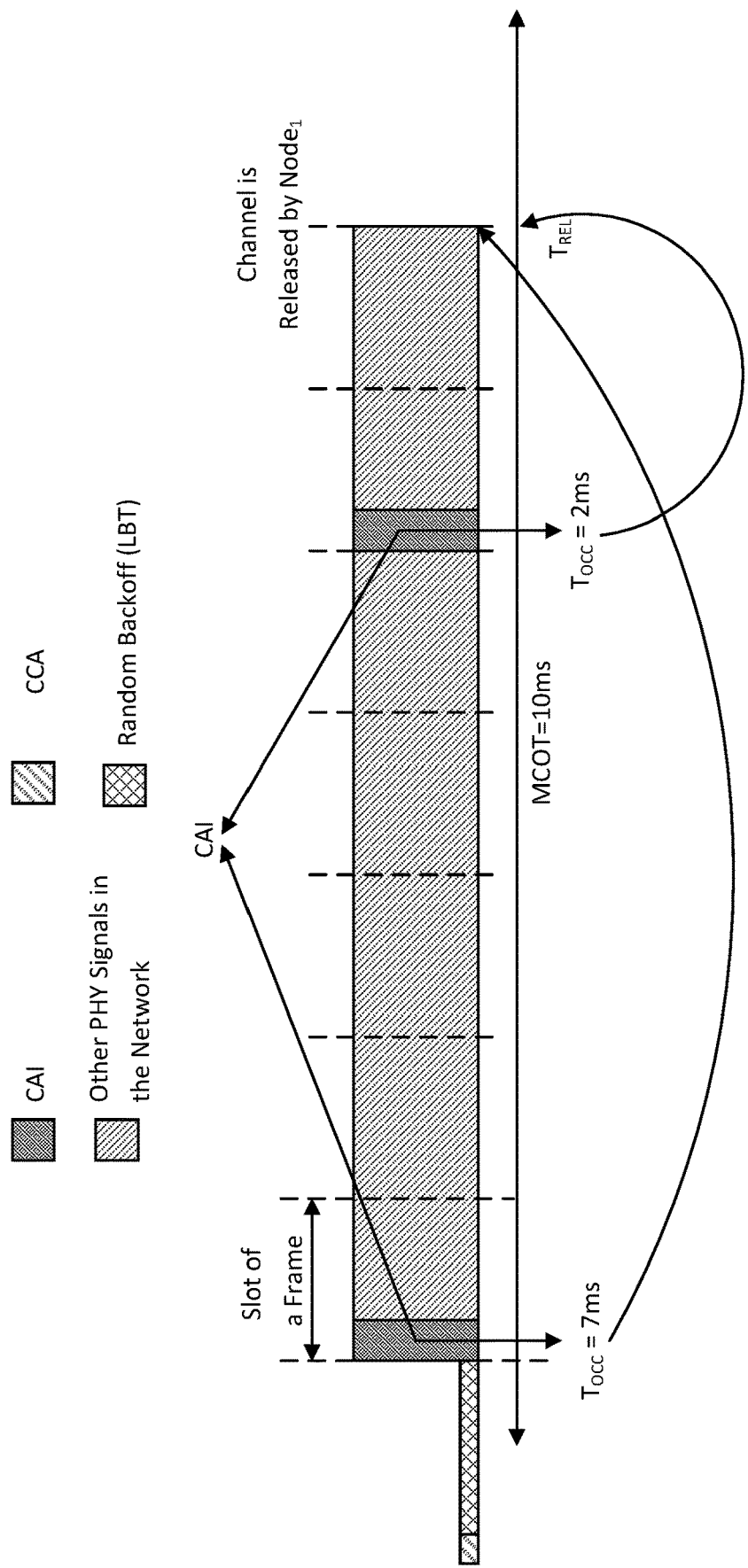
FIG. 10 illustrates periodic transmission of CAI indicting updated $T_{OCC}$.

Furthermore, the CAI may be transmitted periodically or multiple times in a known pattern within a the COT for higher likelihood of detectability and to ensure that UEs with different DRX configurations can still receive the CAI. A UE may not be configured to receive every occasion of the CAI; so multiple instances improve the chances of receiving the CAI. An example is shown in FIG. 10 where CAI is sent in slot #0 and slot #5 of the frame. Both the CAI indicate the same $T_{REL}$ but the $T_{OCC}$ is decremented in slot #5 by 5 indicating the 5 slots have elapsed since the transmission of CAI in slot #0.

Figure 11:
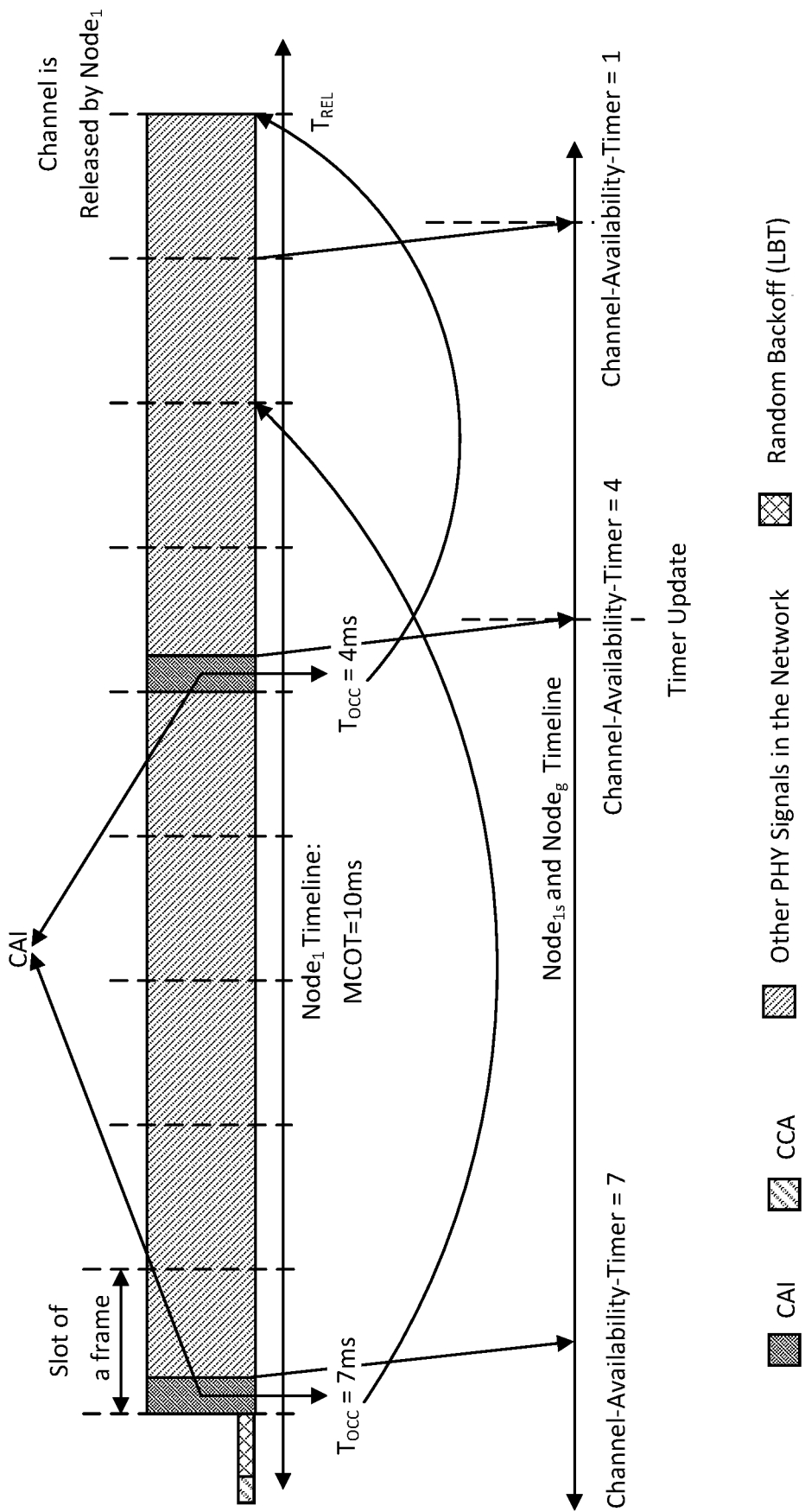
FIG. 11 illustrates transmission of CAI indicting updated $T_{REL}$.

It is also proposed herein that Node$_1$ may increase or decrease its intended time of occupation within its MCOT and indicate the update in a subsequent CAI. FIG. 11 shows an example where $T_{OCC}$=7 ms in the first CAI transmitted upon channel availability. The next CAI transmission changes the $T_{REL}$ by incrementing it by 2 ms through an updated $T_{OCC}$=4 ms. At Nodes and Node$_g$, the channel-availability-timer is set to $T_{OCC}$ on reception of the first CAI and decrements every slot ($T_{REF}$ms). $T_{REF}$ is equal to the slot duration of 1 ms in this example. When the second CAI is received, the timer is updated to the new value of $T_{OCC}$=4 ms and the counter is then decremented until it reaches one or zero, upon which Nodes and Node$_g$ attempt channel access.

In general, this method may be applied if a new CAI is received from any cell—when a Node detects a new CAI, it updates the channel-availability-timer value to the most recent value of $T_{OCC}$ and starts decrementing the timer every $T_{REF}$ ms.

UL Transmission within gNB's MCOT

When the transmitter such as the gNB occupies the channel, it indicates its $T_{OCC}$ in the CAI thereby providing the value of $T_{REL}^{gNB}$. However, within the $T_{OCC}$ duration, it may allow a UE to transmit on the UL. Additionally, the UE may transmit UL CAI to indicate in-network operation to other UEs who may also attempt to access the channel or it may transmit CAI-R if the gNB requests a response. In this case, it is proposed herein that the UL CAI indicate its $T_{OCC}$ as the time to $T_{REL}^{gNB}$ instead of the time duration of its channel occupation.

Figure 12:
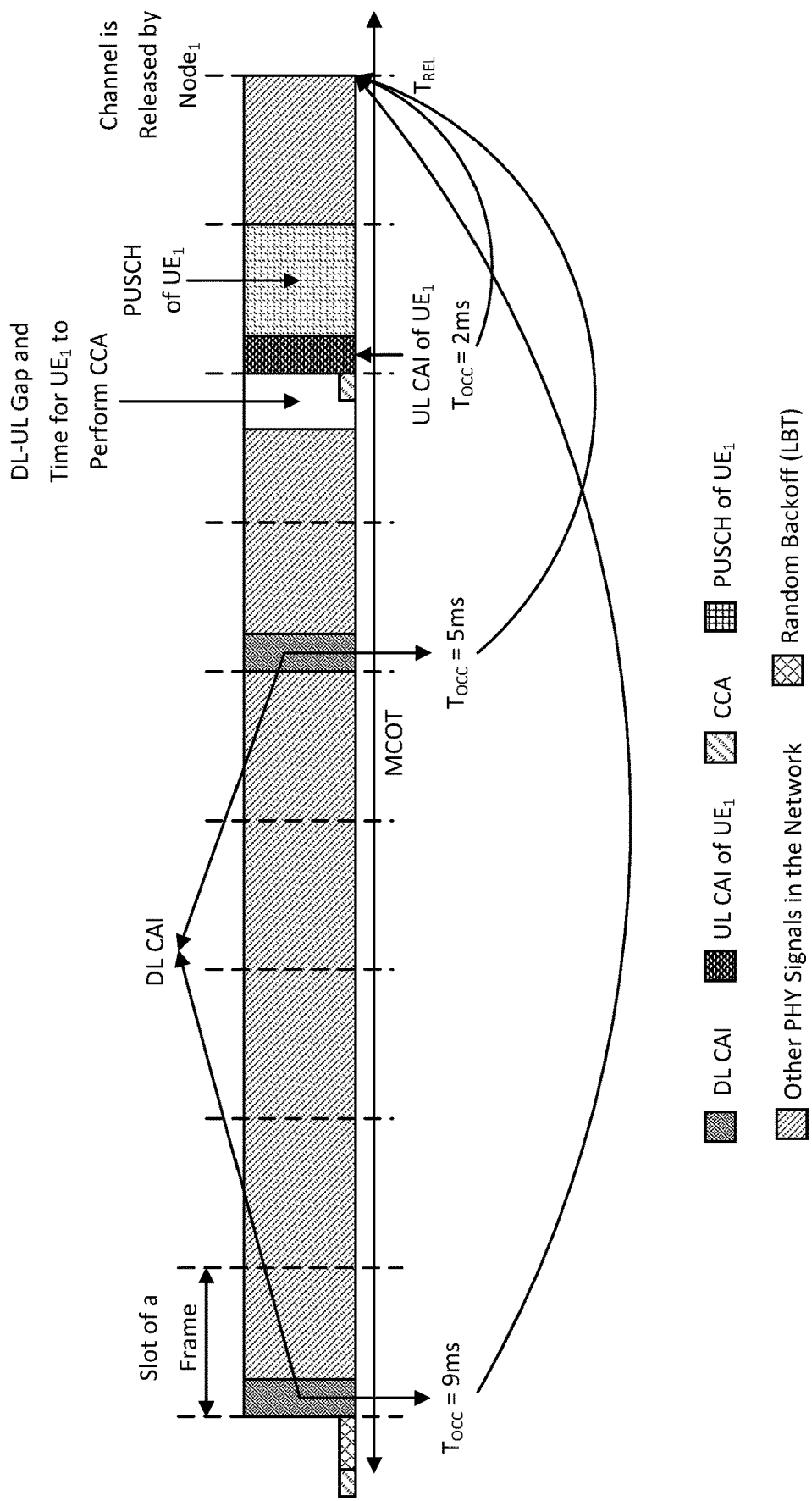
FIG. 12 illustrates transmission of CAI in UL within the gNB's channel occupation time.

FIG. 12 shows the example where the UL transmission from UE$_1$ is only one slot but its UL CAI indicates $T_{OCC}$=2 ms so that channel-availability-timer at Nodes and Node$_g$ decrements based on $T_{REL}^{gNB}$ and is not impacted by the UL CAI.

It is proposed herein that the UE may have knowledge of $T_{REL}$ from the DL CAI or CAI-I or it may receive an explicit value of $T_{REL}^{gNB}$ through a grant.

CAI with Omni and Spatial LBT

If omni-directional LBT is performed, the channel may be accessed on multiple beams at the same time. It is proposed herein that the node can have different $T_{OCC}$ for each beams, while the MCOT is the same for all the beams. The CAI may be sent on multiple beams to indicate occupation of the channel including the $T_{OCC}$ for each beam. However, if all beams have the same $T_{OCC}$, only one field may be required to indicate the $T_{OCC}$ for all beams.

Figure 13:
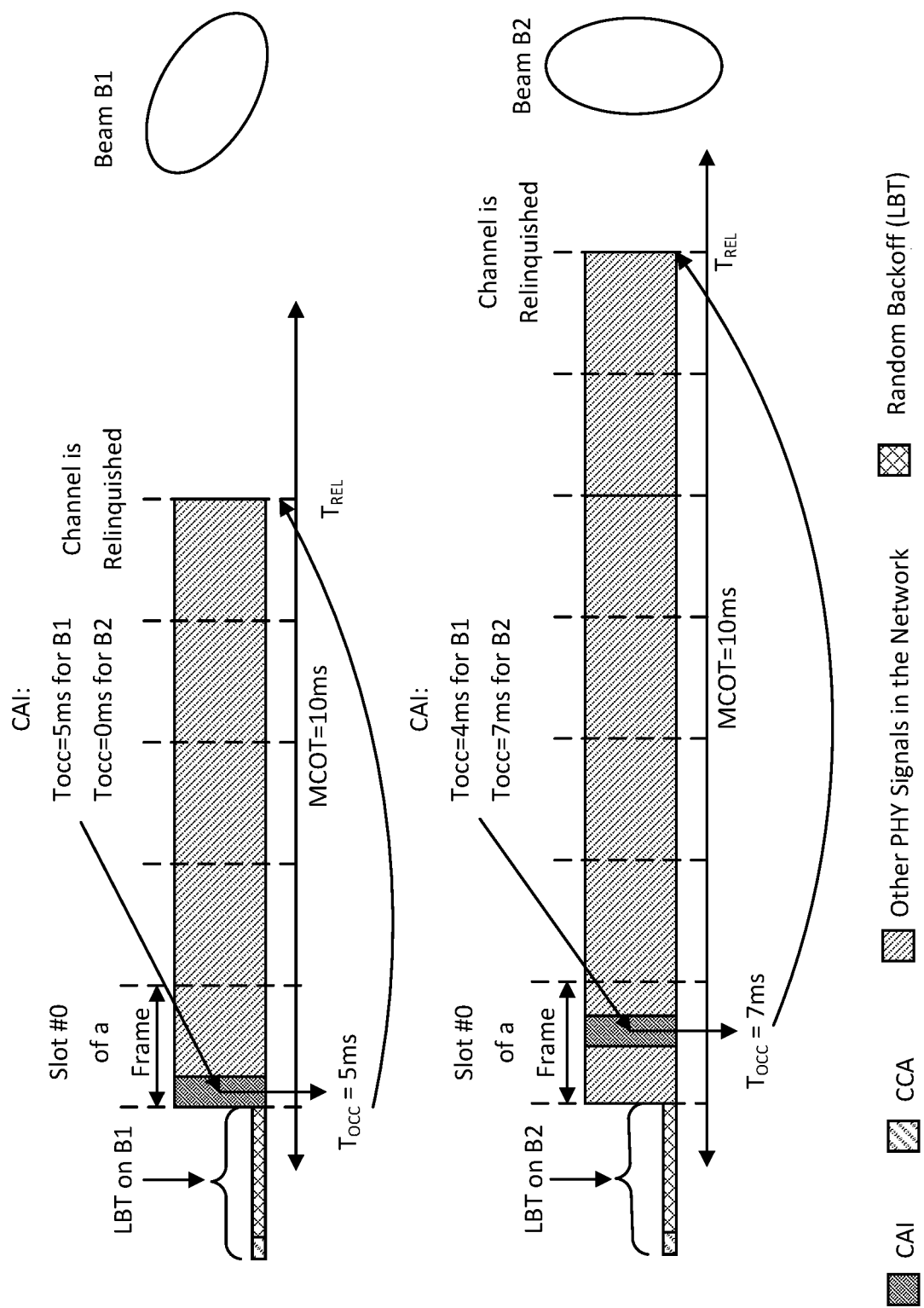
FIG. 13 illustrates $T_{OCC}$ indication on different beams.

If spatial LBT is performed, the gNB may have different $T_{REL}$ for different beams. In this case also, CAI may carry information of $T_{OCC}$ for each beam. So a receiver receiving one of the CAIs knows the network occupancy in multiple spatial directions without requiring to detect CAIs on other beams. This can save some computational overhead. The spatial directions may be indicated as spatial QCL with respect to one of the signals in the DRS or SSB such as the PBCH DMRS or certain CSI-RS in the DRS. FIG. 13 shows an example where the gNB gains channel access on beams B1 and B2. But $T_{OCC}$ is different for the beams. CAI transmitted on B1 and B2 indicates the values for both beams. Also, CAI on some beams may be CAI-I and may carry a trigger for handshake while the CAI on other beams may not carry a trigger and may only indicate channel occupancy. Also, the location of CAI may be different on different beams even if gNB get channel access to those beams at the same time as the gNB may have to sweep through the beams to transmit the CAI.

Information Carried in CAI

The following information may be carried in CAI:
Field cellID which may be related to the NCellID of the gNB. It may be 10 bits and exactly equal to the NCellID. Alternatively, it may be fewer bits obtained through an operation such as mod ($N_{ID}^{cell}$, L) where L may be a power of 2 such as 64 or 128—this allows to keep the overhead smaller while allowing discrimination between different cells. The cellID helps the listening nodes to identify the cell which is occupying the channel.

Transmitter ID field transmitterID of T bits
If gNB (a TRP in the network) is transmitting, the T bits may be set to value $V_{cell}^{tx}$ in one of the following ways:
fixed value common for all NR-U networks
a cell specific value provided in the SI of the cell.
T=0; if field may be absent, implicitly indicating that it is from the gNB.
If a UE is transmitting, the T bits are set to a value $V_{UE}^{tx}$ based on its ID. The ID could be one such as C-RNTI or CS-RNTI or a portion of the C-RNTI or CS-RNTI which is configured by the network it is attached to.

Receiver ID field receiverID of R bits, where R could be equal to T.
If gNB (a TRP in the network) is receiving, the R bits may be set to value $V_{cell}^{rx}$ In one of the following ways. fixed value common for all NR-U networks
a cell specific value provided in the SI of the cell.
T=0; if field may be absent, implicitly indicating that it is from the gNB.
If a UE is receiving, the value is set $V_{UE}^{rx}$ based on the receiver ID such as C-RNTI or CS-RNTI or a portion of the C-RNTI or CS-RNTI.

A one-bit field responseIndicator when set to 1 may indicate if the CAI requires a CAI-R in response from the receiver, when set to 0, the CAI does not require a CAI-R from the receiver.

The CAI-I may carry field resourceCAIR of P bits to indicate the resources for transmitting the CAI-R.

The CAI-I may carry field triggeredUEID of U bits to indicate the IDs of UEs that must respond with the CAI-R.

The CAI-R may carry field detEnergy of E bits to indicate the energy detected during an LBT preceding the CAI-R. The number of bits E may be kept small by assigning predefined thresholds for different energy levels. Knowledge of the energy detected by the responding node helps the initiating node to assess the responder's environment especially when multiple nodes are multiplexed together. Accordingly, the initiating node such as the gNB can set the threshold levels for LBT at the responding node.

The following fields may be defined for each of the numBeams that the CAI carries information for. For omnidirectional LBT, numBeams=1; so a single instance is used for the following fields. For spatial LBT numBeams may be defined in the spec for different unlicensed bands in FR1 and FR2 or configured in the SI of the cell; numBeams may be set to the number of SSBs in the cell. The instances in the payload may be ordered in the increasing order of the SSB index.

Field intendedChannelOccTime Intended time of channel occupation $T_{OCC}$ ms denoted by D bits. This may be indicated the in the form of number of slots for a reference numerology such as 15 KHz for FR1 and 120 KHz for FR2.

Field mcotTransmitter which indicates the MCOT of duration $T_{MCOT}$ ms. It is given by M bits such that $T_{OCC} \leq T_{MCOT}$.

Field freqResourceMCOT indicates the frequency resources over which the channel will be accessed. This allows listening nodes to access the channel outside the indicated frequency band.

In general, as the CAI is signaled for different purposes (such as indicating occupancy time or in-network usage or handshake), it may carry different fields and different amount of information depending on the use case.

A CAI on one cell may indicate the channel occupancy on other aggregated NR-U cells. For example, an NR-U PCell/PSCell may indicate the CAI for itself along with other aggregated NR-U SCells.

Candidate PUSCH Start Positions

Conducting LBT prior to UL PUSCH imposes uncertainty on when the UE would be able to access the channel. Therefore, allowing a UE to have multiple starting positions in one or multiple slot(s) is beneficial to cope with channel uncertainty.

The following two aspects must be considered to support the variable starting position(s) of the PUSCH.

a. Signaling the candidate start positions for PUSCH: The gNB's load for detecting the starting position must be minimized. The gNB may restrict the number of starting positions of the first PUSCH transmission from a UE within the UE's COT to simplify the hardware requirements to detect the PUSCH.

b. UL channel access indication by the UE: UE's indication of the starting location. From the set of allowed starting positions, the UE may indicate the selected starting location of the first PUSCH transmission within its COT. So, the CAI may be transmitted on the UL by a UE to indicate the intended time of channel occupancy. The UL CAI may be explicitly indicated through a new signal such as an RS or preamble sequence or may be implicitly indicated through an existing signal such as the DMRS of the PUSCH. By detecting the UL CAI, the gNB recognizes the starting position of the PUSCH of the UE. For example, the gNB can detect the starting position of UE's PUSCH by detecting and processing UE's DMRS (auto-correlation or cross-correlation), if the presence of DMRS can indicate the starting position without ambiguity. Otherwise, the gNB can detect it via energy detection of the received PUSCH symbol by symbol.

Signaling the Candidate Start Positions for PUSCH

The gNB may detect the presence of a PUSCH transmission, potentially by detecting the DMRS signal from a UE. But the gNB must determine the start of the PUSCH transmission which can vary depending on the UE's channel access. The gNB can blindly decode the PUSCH for all candidate PUSCH starting OS. For instance, consider that an UL grant is for a slot of 14 OS. But the UE is able to get channel access only from OS #2 and punctures the PUSCH for OS #0 and OS #1. Then the gNB receives the transmission and decodes assuming PUSCH starts at OS #0, failing which it may decode for PUSCH starting location OS #1, failing with it decodes for PUSCH starting location OS #2 and so on until it successfully decodes the PUSCH. If it fails to decode it, it buffers the PUSCH assuming that it started at OS #0 of the slot and schedules a retransmission for the PUSCH. Assuming that the retransmission is received in its entirety, the gNB may decode by chase combining assuming that the original transmission started at OS #0, failing which it decodes with chase combining assuming that the original transmission started at OS #1, failing which it decodes with chase combining assuming that the original transmission started at OS #2—if it gets success at this attempt, it stops. This blind decoding procedure can incur prohibitively high hardware complexity for the gNB.

Figure 48:
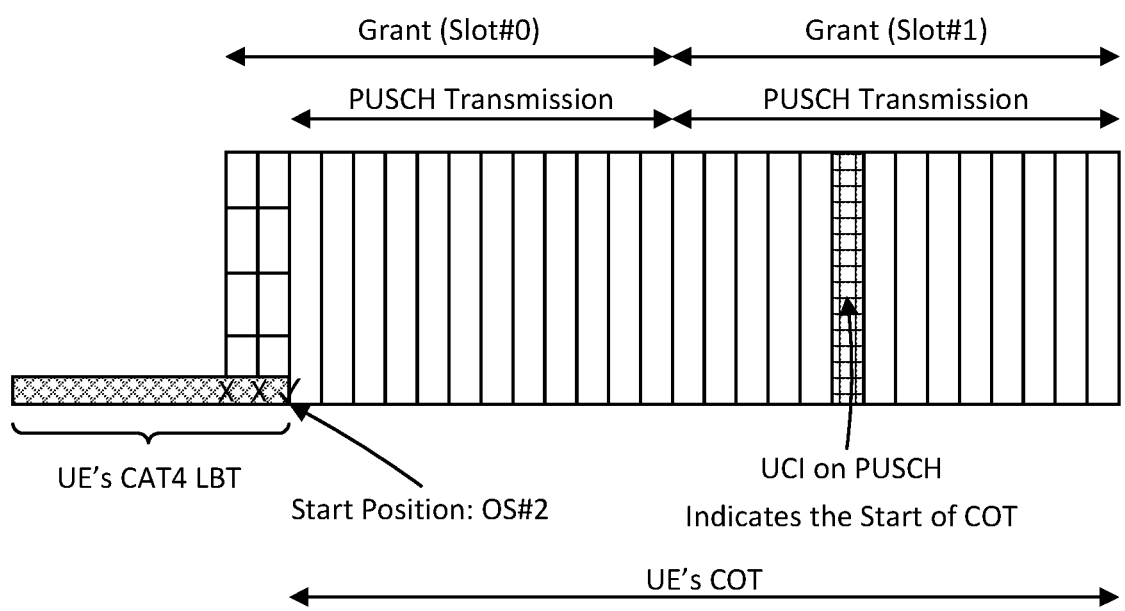
FIG. 48 shows a UE indicating the start of its channel access after a first PUSCH transmission which does not occupy the granted resources due to channel availability.

Also, it can be seen that it is advantageous to enable the gNB to know the starting position of the PUSCH to minimize the blind decoding. If the information is made available at the time of the PUSCH transmission itself through a signal such as the CAI transmitted at the start of the PUSCH, the gNB can avoid blind decodes while processing retransmissions through chase combining. However, even if the CAI cannot be made available to the gNB at the time of processing the PUSCH, if the CAI information can be transmitted to the gNB prior to a scheduled retransmission, it will enable the gNB to reduce the blind decodes in processing the retransmission. According to one aspect, the UE may transmit its channel access information through a preamble or a UCI; this may indicate the time when its COT began, additionally, it may also indicate when the UE's COT ends. The gNB recognizes the starting position of the PUSCH from this and identifies the punctured symbols in the original transmission before it chase combines with a retransmission. The concept is shown in FIG. 48 where the start of the COT is indicated by the UE through UCI on PUSCH; this occurs after the first PUSCH transmission which started on OS #2 has concluded.

Figure 21G:
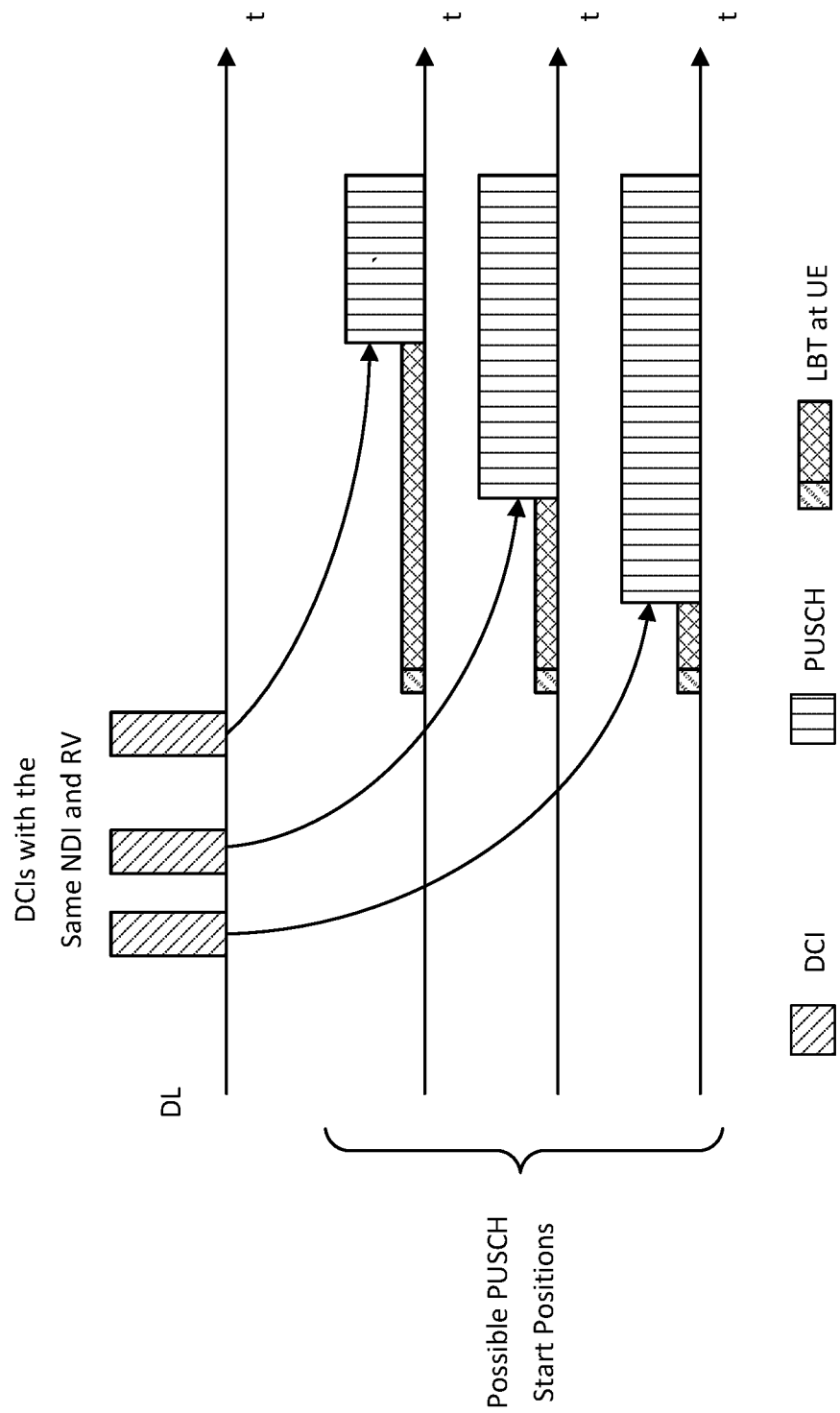
FIG. 21G shows multiple DCI providing multiple start positions for PUSCH.

In order to keep the overhead of blind decoding acceptable at the gNB, the UE may be restricted to transmitting PUSCH beginning from certain starting positions. Disclosed herein is a method in which the gNB may transmit multiple DCIs similar to DCI formats format 0_0 or 0_1 to provide the UE with multiple start position(s) of PUSCH with all the associated parameters for the different PUSCH start position such as UL DMRS configurations, MCS, TPC, etc. To this end, the gNB may use the same values of the new data indicator (NDI) and redundancy version (RV) across multiple DCIs, but it may adjust fields such as time domain resource assignment, MCS, TPC, for example. In this case, the UE may interpret the reception of multiple UL grants with the same NDI and RV values as alternatives, and the UE may only use one of the UL grants and ignore the others based on the outcome of the LBT at the UE side. To provide the UE with enough processing time to prepare the PUSCH based on the start position, the earlier DCI may be associated with UL grant with earlier start position. For example, FIG. 21G shows three DCIs providing different start positions for PUSCH and the UE may deploy only one of them based on the LBT outcome at the UE's side.

Figure 22:
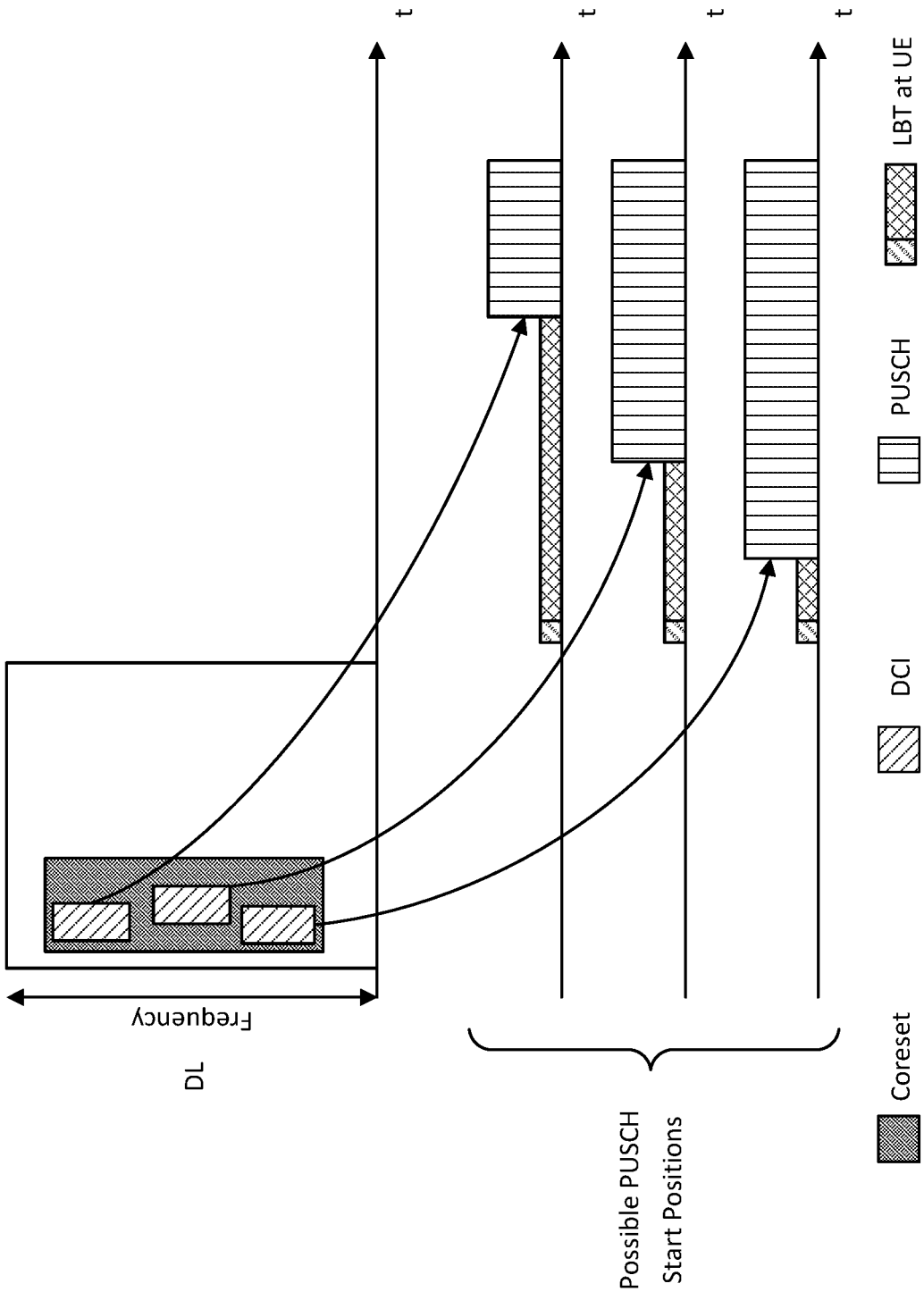
FIG. 22 shows multiple DCIs providing multiple start positions for PUSCH are transmitted in the same CORESET.

Alternatively, all DCIs may be transmitted in the same CORESET, as shown in FIG. 22 for example. Those DCIs may carry the same NDI and RV to indicate that provided UL grants are alternatives to each other and the UE may only select one grant and ignore the other provided grants. The UE may use the UL grant that provides maximum amount of resources first, followed by the second maximum amount of resource and so on.

A new field in DCI of 1 bit size field, e.g., called DCI repetition flag for example, may indicate that all DCIs carrying the same RV and NDI with repetition flag is set to one are alternative to each other and the UE may select to use the grant provided by only one of these DCIs. In contrast, if repetition flag is set to zero then one DCI may overwrite the other DCIs. Here, the UE doesn't select which DCI to use, instead, it is gNB which determines which DCI may be used according to the following rules, for example:

The DCI transmitted in later CORESET may overwrite those DCIs transmitted in earlier CORESETs; and If the DCIs are transmitted in the same CORESET, then the DCI transmitted in the lowest PRB may overwrite those DCIs transmitted in higher PRBs According to another aspect, a single DCI may provide multiple start positions. For example, the following information may be transmitted with this DCI with CRC scrambled by C-RNTI (other RNTI may be used whenever applicable):

Number of start positions which indicates the number of candidate PUSCH start positions that the UE may use depending on the LBT outcome. The size of this field may be defined by a high-layer parameter, e.g. RRC parameter called maxNumStartPosit.

Or/and for each candidate start position, dedicated time domain recourse assignment may be used to signal the start position for each candidate PUSCH start positions. The bitwidth for this field is determined by determined as $\lceil \log(I) \rceil$ bits, where I is the number of entries in the higher layer parameter pusch-TimeDomainAllocation-List times the number of start positions as indicated in the aforementioned field.

Or/and MCS field for each candidate start position and the bitwidth of this field is the number of start positions as indicated in the aforementioned field times the number of bits needed to convey the MCS for each start position separately.

Or/and NDI and RV may the same for all candidate PUSCH start positions.

Antenna ports field for each candidate PUSCH start position.

Figure 23:
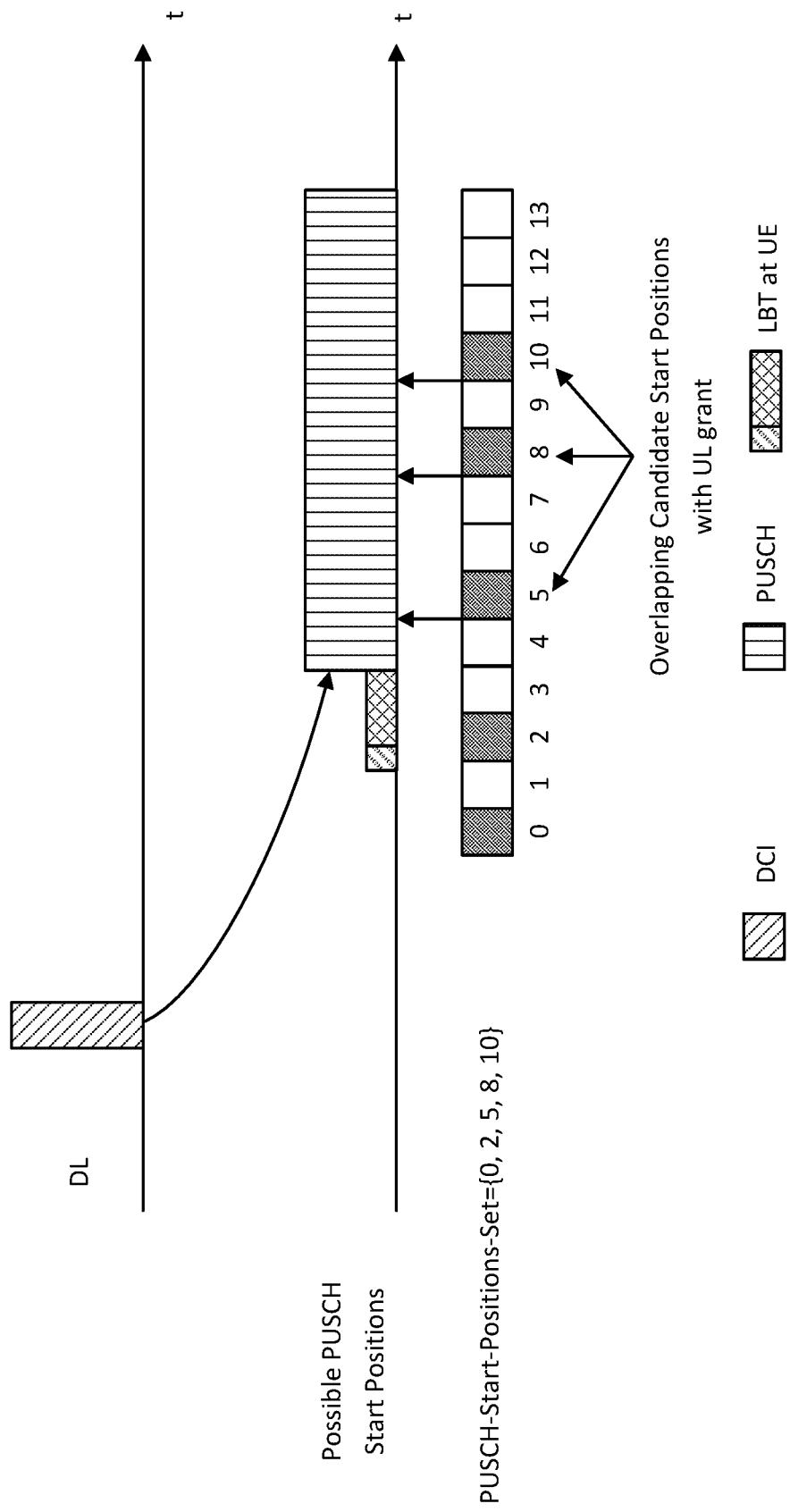
FIG. 23 shows configuring multiple start position relative to the slot boundaries.

To reduce the overhead of transmitting multiple DCIs to indicate different start positions for PUSCH, the UE may choose one of multiple candidate positions given by high layer parameter, for example RRC parameter named PUSCH-start-Positions-set. The candidate positions set may be relative to the slot or relative to the scheduled PUSCH. If PUSCH-start-Positions-set is relative to the slot, then the UE may choose one candidate start position out of those overlapping with original PUSCH grant. FIG. 23 shows an example of a PUSCH-start-Positions-set that provides multiple PUSCH start positions relative to the slot at symbols $\{0, 2, 5, 8, 10\}$. In this example, PUSCH is scheduled to start from the OS 4. The PUSCH start position may be at the beginning of the UL grant, as indicated by DCI, or one of the candidate start positions that overlap with grant which are symbols $\{5, 8, 10\}$ depending on the LBT outcome at the UE side.

Figure 24:
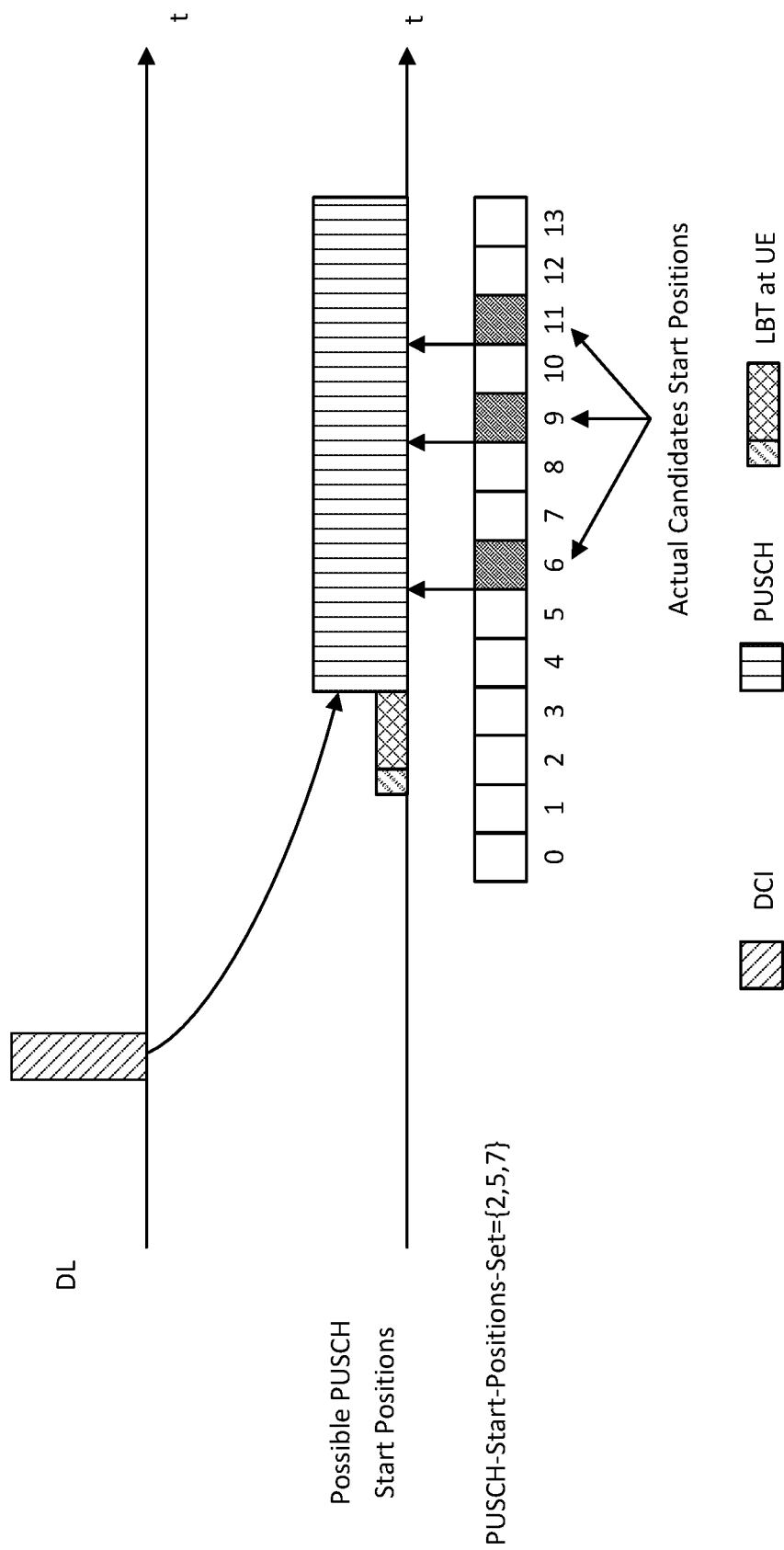
FIG. 24 shows configuring multiple start position relative to the start position of the scheduled PUSCH.

Alternatively, the candidate start positions may be given by a high layer parameter, such as RRC parameter PUSCH-start-Positions-set, relative to the original start position of PUSCH given in the UL grant. In other words, the actual symbols' indices of the candidate start positions is given by PUSCH-start-Positions-set after shifting them relative to the index of the first symbol in the UL grant. If some of the actual symbols' indices of the candidate start positions are beyond the end position of scheduled PUSCH, the UE may ignore those candidate position. As illustration, FIG. 24, shows an example in which PUSCH-start-Positions-set=$\{2, 5, 7\}$ and original start position provided by the UL grant is the $4^{th}$ symbol. Hence, the actual candidates start positions are $\{6, 9, 11\}$ and the UE attempt to access the channel at any of those position based on LBT outcome.

Moreover, to avoid signaling the candidate start positions, they may be defined according to some rules either relative to the slot boundaries or relative to the PUSCH grant itself. For example, every even/odd symbol may be a candidate start position. In yet another example, the candidate start positions may follow a certain pattern like every L symbol(s) after the first symbol in granted PUSCH or in the slot, e.g., L=1 means every other symbol is a candidate start position. The value for L may depend on several parameters in the PUSCH grant such as the duration of the grant, MCS, etc. For example, if L depends on MCS, it may be given by Table 2.

TABLE 2

Candidate start positions as function of scheduled MCS

| Scheduled MCS | L |
|---|---|
| $I_{MCS} < MCS_{th\_1}$ | No additional positions |
| $MCS_{th\_1} \leq I_{MCS} < MCS_{th\_2}$ | 4 |
| . | . |
| . | . |
| . | . |
| $MCS_{th\_(N-1)} \leq I_{MCS} < MCS_{th\_N}$ | 1 |

In Table 2, $I_{MCS}$ is the MCS given the DCI providing the PUSCH grant and $MCS_{th\_i}$ for $i \in \{1, \ldots, N\}$ may be provided by a high-layer parameter such as RRC parameter PUSCH-start-Positions-th. If the high layer-parameter indicate that the MCS thresholds in any row are equal, i.e., $MCS_{th\_(i-1)} = MCS_{th\_i}$, then L of the associated row where both these MCS thresholds appear is disabled.

Table 3 illustrates an example of the dependency of the number of start position and their location on the duration of the scheduled PUSCH. In this example, if the duration of PUSCH grant is 3 symbols or less, then L may be set to zero to indicate that UE may attempt to access the channel at each symbol. While if the duration of PUSCH grant is 4 symbols, then L may be set to 1 meaning that the UE may attempt to access the channel every other symbol and so on. The value of L for different PUSCH grant duration may be given by high-level parameters.

TABLE 3

Candidate start positions as function of scheduled PUSCH duration

| PUSCH duration in symbols | L |
|---|---|
| <3 | 0 |
| 3 | 0 |
| 4 | 1 |
| . | . |
| . | . |
| . | . |
| 14 | 3 |

Other mathematical rules may also be applied to define the indices of the candidate start positions such as the OFDM symbols that their indices (l) satisfy l mod M=0 where M may depend on the some of the original PUSCH grant parameters, e.g., MCS, the duration of the grant in symbols, etc. To establish the function dependency of M on any of the original PUSCH grant parameters, a table similar to Table 2 may be used for example. If any of the aforementioned rules are applied relative to the slot boundaries, then the UE may only consider the candidate start positions that overlap with the UL grant.

In another aspect, indicating the candidate start position explicitly (using high layer parameters) and implicitly (according to specified rules) can be combined. For example, the candidate start positions may be the union of the positions given explicitly and implicitly. Moreover, in the absence of explicit indication of the candidate start positions, the UE may apply that implicit indication is used.

It is appreciated that the aforementioned solutions and/or any possible combination of them may be extended to provide the UE with the possible candidate start positions for multiple scheduled contiguous or non-contiguous PUSCHs thorough either a single or multiple UL grants. As a possible solution, an RRC parameter may provide the UE with location(s) of the candidate start position(s). These locations may be relative to the scheduled PUSCHs or relative to the slot boundary. Then the UE may only consider the locations that overlap with the scheduled PUSCH.

Figure 50A:
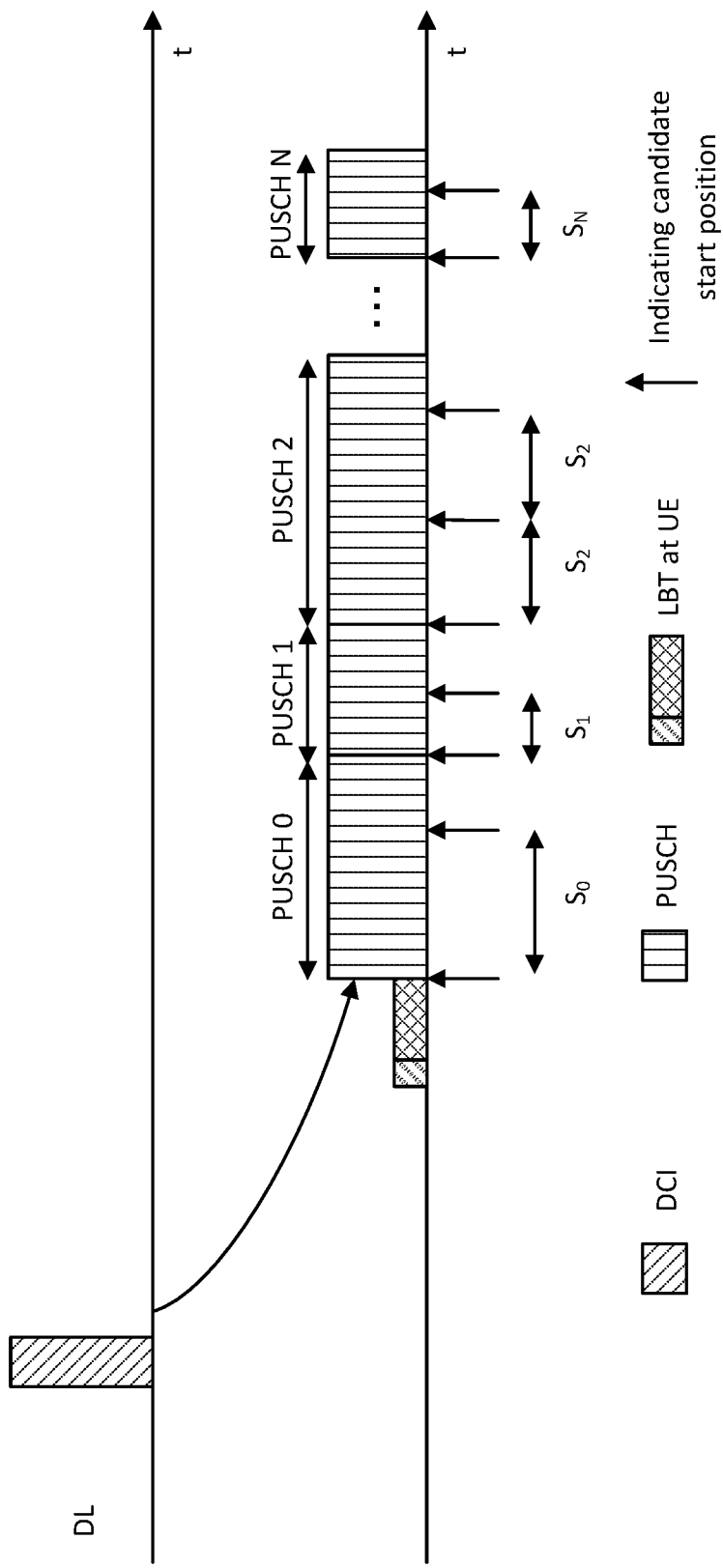
FIG. 50A shows candidate start positions for multiple contiguous PUSCHs depending on each PUSCH.

FIG. 50A shows an example of the candidate start locations are configured as a shift from the first OFDM symbol in each scheduled PUSCH and the shift value may be indicated by a high layer signaling such as RRC parameter. The shift values may depend on PUSCH index as shown in FIG. 50A. For example, in PUSCH k, the candidate start positions are separated by $S_k$, where k is the index of PUSCH. The UE may be indicated through a high layer signaling with shift values for contiguous PUSCHs, for example, a set of the shift levels may be indicated to the UE such as {a, b, c, d, . . . }. Then the UE may set $S_0$=a for PUSCH 0, $S_1$=b for PUSCH 1, and so on so forth. Or, the UE may be indicated through a high layer signaling with a single parameter that the UE may use it to derive the locations of the candidate start positions for each PUSCH, it may be as function of PUSCH index, for example.

Figure 50B:
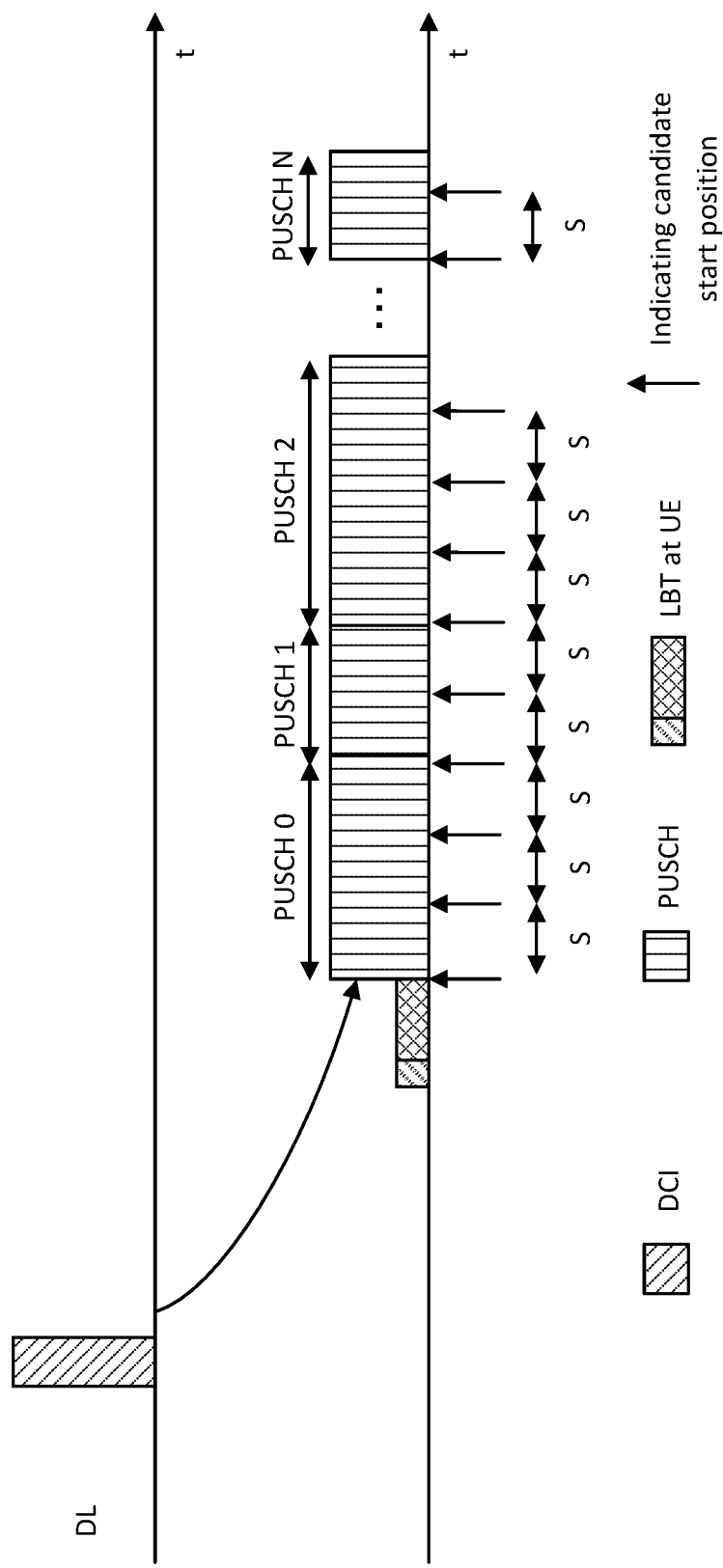
FIG. 50B shows candidate start positions for multiple contiguous PUSCHs depending on the first symbol of the first PUSCH.

Alternatively, the candidate PUSCH start position may be separated by shift S starting from the first OFDM symbol in the first scheduled PUSCH as shown in FIG. 50B, for example. Other rules may also be applied to define the location of the candidate start positions. Also, the UE may treat the first OFDM symbol of each PUSCH as a candidate start position in addition to those indicated by high layer signaling.

Figure 50C:
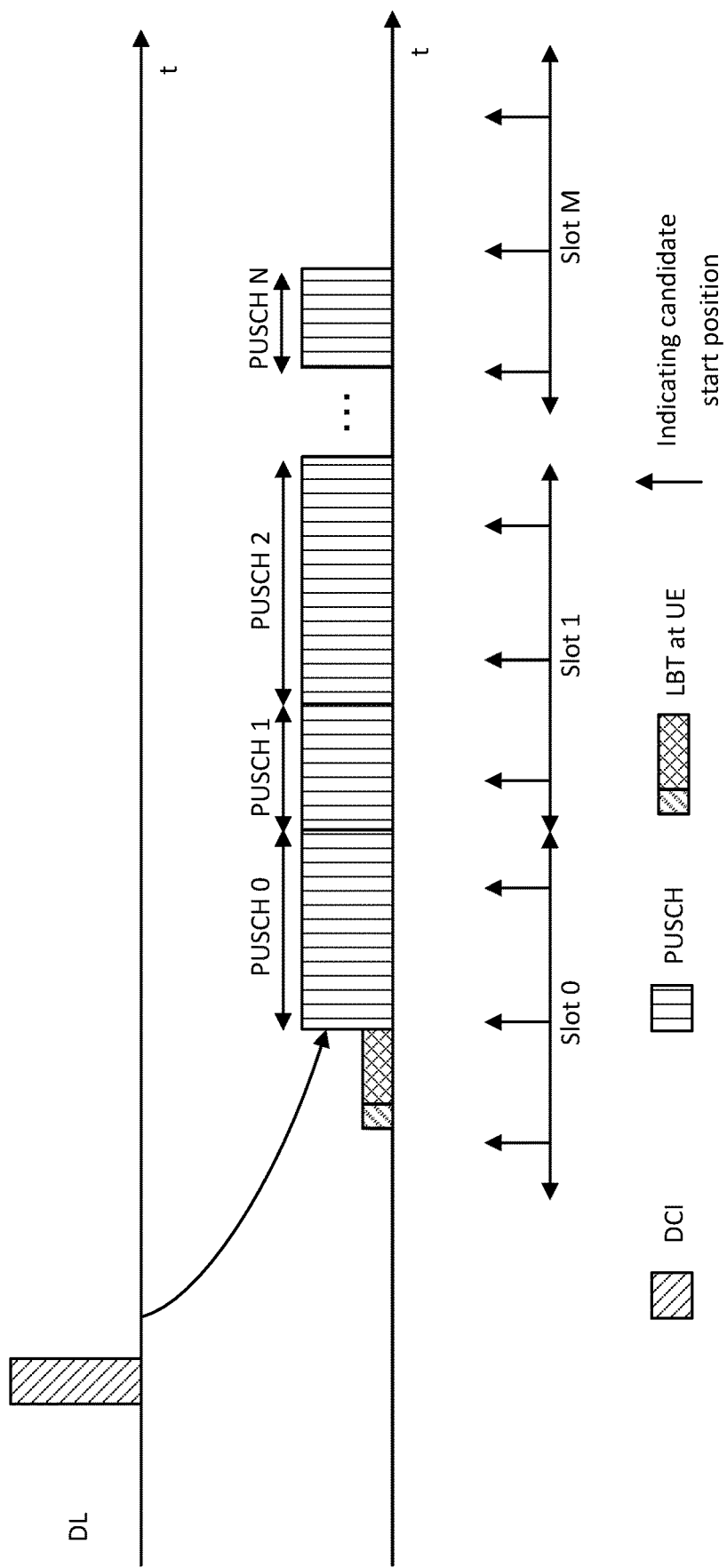
FIG. 50C shows candidate start positions for multiple contiguous PUSCHs relative to the slots' boundaries.
Figure 50D:
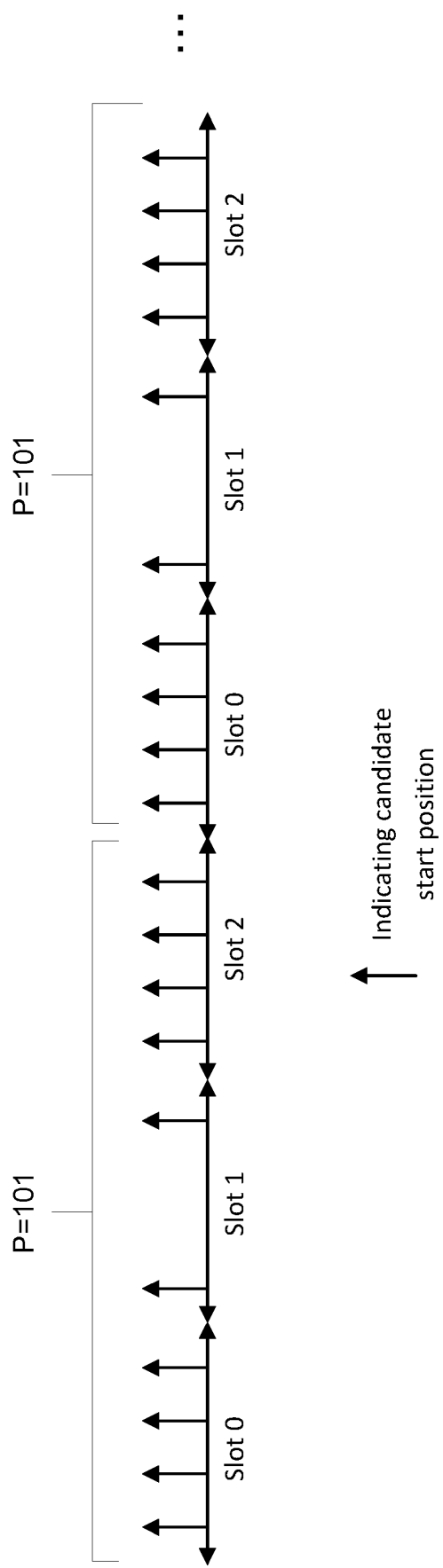
FIG. 50D shows candidate start positions for multiple contiguous PUSCHs relative to the slots' boundaries with particular pattern P.

FIG. 50C exemplifies the case in which the candidate start positions are defined relative to the slot boundaries. The number and location of the candidate start positions may be the same across the slots or vary from slot to another. High layer signaling may indicate these locations. In addition to the first OFDM symbol in each PUSCH, the UE may consider the candidate start positions that overlap with any scheduled PUSCH as a valid candidate start positions that the UE may use to attempt to access the channel while other candidate start positions that are outside the scheduled PUSCH are invalid and UE may not attempt to access the channel at those locations. The high layer may indicate the indices of OFDM symbols in each slot that the UE may use as candidate start positions, for example a bitmap of 14 bit size may indicate which OFDM symbols can be used candidate start position if the corresponding bits are set to one. Moreover, each slot in the subframe/radio frame may have different locations for the candidate start positions, concatenated bitmaps of each slot by be signaled to the UE and location of candidate start positions are repeated every subframe or radio frame. Also, gNB may define a pattern over a certain number of slots, wherein a group of the slots has a certain candidate start positions while other groups have different candidate positions. This pattern may be repeatedly applied. For example, FIG. 50D shows a pattern P=101 over 3 slots, wherein the slot correspond to 1 have four candidate start positions while slot correspond to 0 has 2 candidate start positions. This pattern is repeated every three slots.

The gNB may semi-statically indicate particular set of configurations of the candidate start positions to enable the gNB to flexibly adjust these configurations. For example, the gNB may provide the UE with multiple high layer configurations indicating different sets of candidate start positions arrangements, then gNB may use MAC-CE to select the appropriate configurations by pointing to the high layer message ID that carry these configurations, for example.

Additionally, gNB may dynamically indicate the appropriate configurations of the candidate start positions through using DCI. For example, a bitfield of length equal to $\lfloor \log_2 (K) \rfloor$ where K is the number indicated configurations through high layer signaling. This bitfield may be indicated in the DCI carrying the grant(s) or in a separate DCI either in UE-specific search space or in group common search space with the proper RNTI. Moreover, gNB may use MAC-CE to signal a sub-set of the candidate start positions to the UE and then gNB may use DCI to indicate the selected configurations of the candidate start positions.

UL Channel Access Indication by the UE

Adjusting DMRS Scheduling Based on the PUSCH Starting Position

For PUSCH mapping type A, the position(s) of the DMRS symbols is defined relative to the slot boundaries which may lead to ambiguous behavior if the UE fails to acquire the channel according to scheduled/configured grant. If the multiple start positions are provided by dedicated DCIs as shown in FIG. 21 and FIG. 22 for example, i.e., one-to-one mapping of a DCI to a distinct start PUSCH position, then each DCI may carry the appropriate DMRS scheduling information that are combined with DMRS RRC configurations depending on the PUSCH start position. However, this may entail significant overhead in terms of signaling and UE power consumption for decoding multiple DCIs for the same grant. Therefore, to alleviate such burden, signaling the candidate start positions either explicitly (using high layer parameters) or implicitly (according to specified rules) may be more useful than using multiple DCIs. However, such static configurations may not be adequate to adjust the DMRS scheduling based on the UE selected start position of PUSCH. Next, several embodiments are described to cope with such challenge.

For a single UE MIMO (SU-MIMO), several alternatives may be employed.

PUSCH Start Before $l_0$

If a UE accesses the channel before $l_0$, which is given by the high-layer parameter dmrs-TypeA-Position (see 3GPP TS 36.211, Physical channels and modulation (Release 15), V15.3.0), the UE may deploy the configured and scheduled UL DMRS as long as the DMRS symbols of PUSCH the UE selected start position and its new duration are the same as the DMRS symbols of PUSCH with the old duration. For example, if the PUSCH duration is equal to 10, 11, or 12 OFDM symbols, then the DMRS occupy the symbols $l_0$, 9 as illustrated in Table 4 (see 3GPP TS 36.211, Physical channels and modulation (Release 15), V15.3.0).

TABLE 4

DMRS positions for PUSCH mapping type A for a single-symbol DMRS with dmrs-AdditionalPosition = 1 and intra-slot frequency hopping disabled

| Duration in symbols | DMRS positions |
|---|---|
| 10 | $l_0$, 9 |
| 11 | $l_0$, 9 |
| 12 | $l_0$, 9 |

Figure 25:
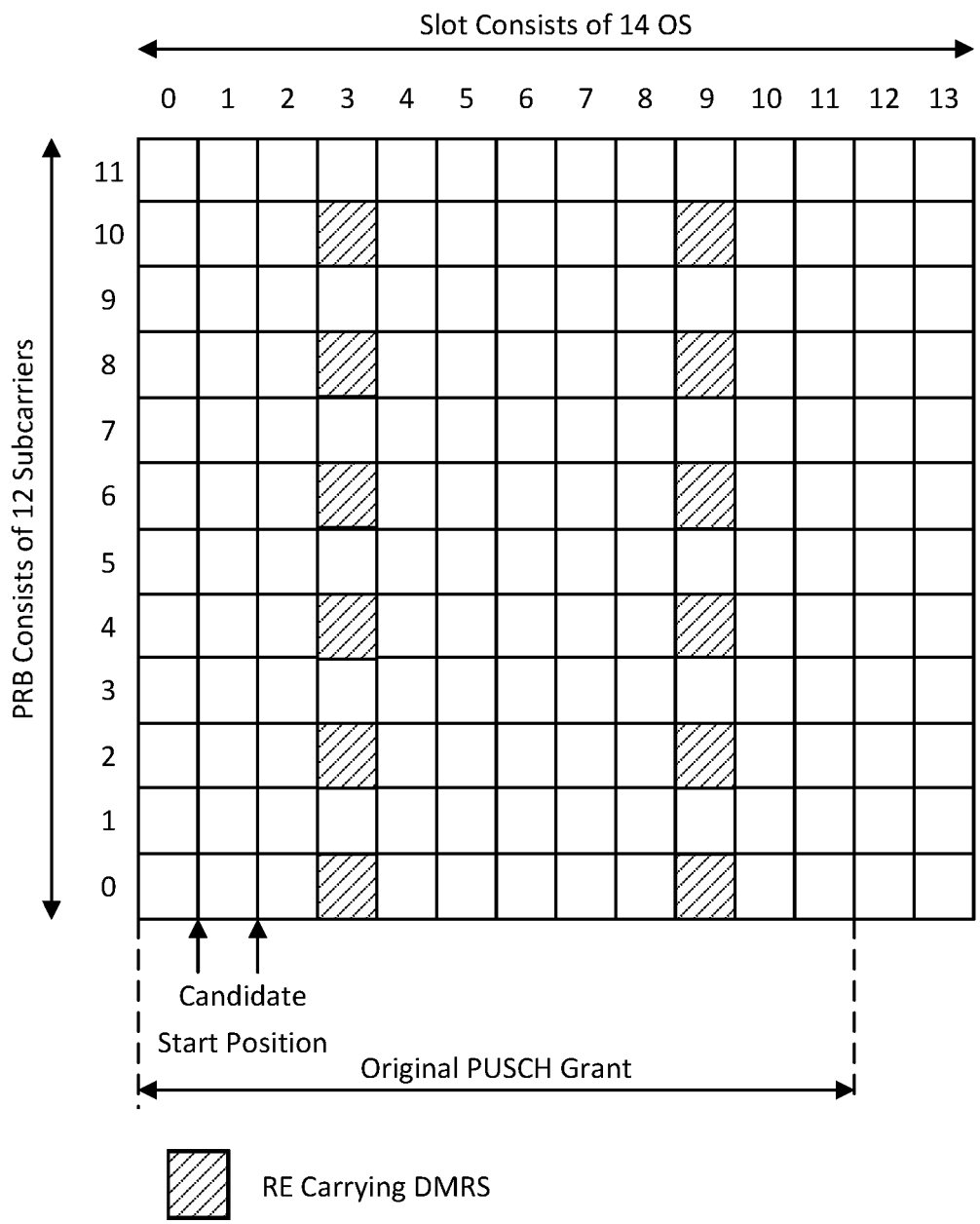
FIG. 25 shows starting PUSCH before 10 and the old DMRS configurations are still valid for the duration of PUSCH with the UE selected start position.

FIG. 25 shows an example for PUSCH that is scheduled for transmission over 12 OFDM symbols from OS 0 to OS 11 with one additional UL DMRS symbol, but UE fails in accessing the channel due to LBT failure. If the channel becomes available starting from the illustrated candidate positions in the figure, OS 1 and OS 2, then duration of PUSCH with the UE selected start positions are 11 and 10, respectively. Hence, the UE may still use the same scheduled DMRS.

Figure 26:
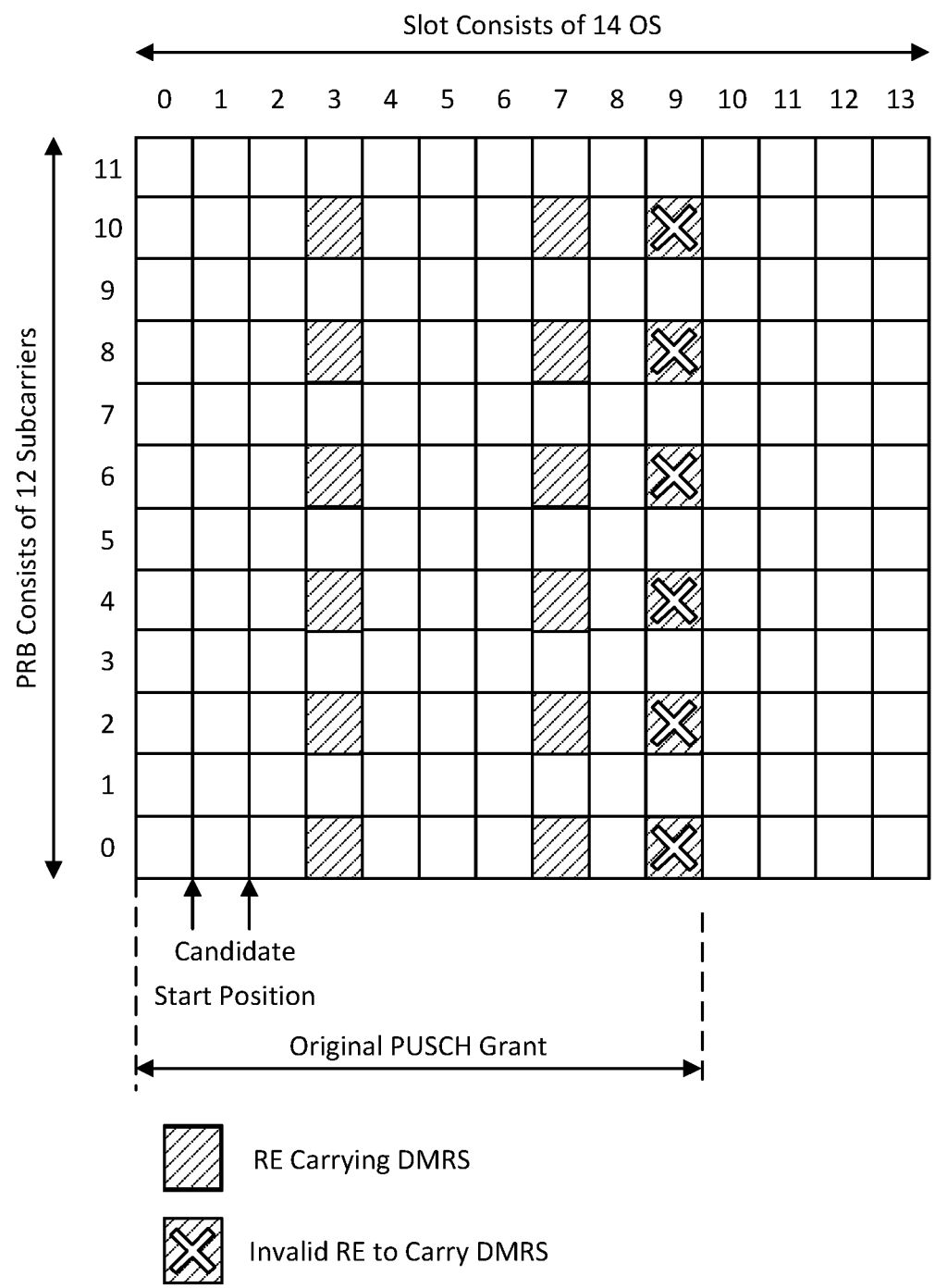
FIG. 26 shows starting PUSCH before 10 and the old DMRS configurations are NOT valid for the duration of PUSCH with the UE selected start position.

On the other hand, if the duration of PUSCH with the UE selected start position uses different DMRS configurations than the original PUSCH duration, then the UE may follow the new DMRS configurations associated with new PUSCH duration with the same number of additional DMRS symbols. FIG. 26 shows an example of PUSCH initially scheduled with duration of 10 symbols from OS 0 to OS 9 with one additional UL DMRS symbol, but the UE fails in accessing the channel at OS 0. However, if the UE access the channel at OS 1 or OS 2, the duration of the PUSCH with the UE selected start position is 9 and 8, respectively. Hence, the UE may not use the old DMRS configurations associated with original PUSCH grant, but the UE may use new DMRS configurations associated with PUSCH duration 8 and 9 OFDM symbols. In this case, the DMRS shall be in OS $l_0$, 7 as illustrated in the figure.

PUSCH Start from or after $l_0$

Figure 27:
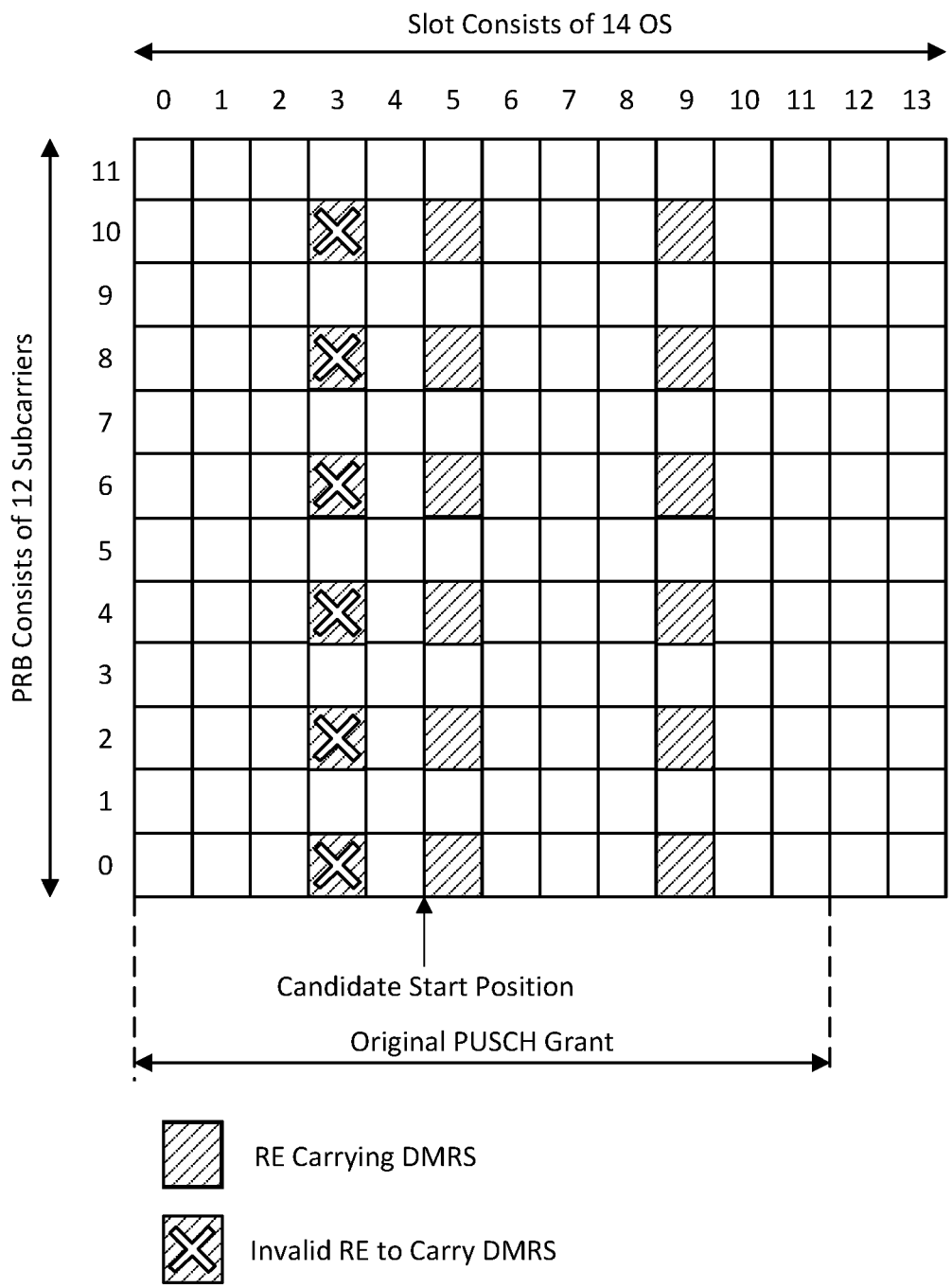
FIG. 27 shows starting PUSCH after 10 and DMRS are mapping according to PUSCH mapping type B instead of PUSCH mapping type A.

If the UE accesses the channel starting from or after the symbol $l_0$, given by the high-layer parameter dmrs-TypeA-Position, the UE may assume the PUSCH mapping type A, in which DMRS is mapped relative to slot boundary, is effectively changed to PUSCH mapping type B, in which DMRS is mapped relative to PUSCH based on the new PUSCH duration. In other words, the UE may set $l_0$ to zero and map the DMRS according to the new PUSCH duration and the number of additional DMRS symbols given by the high-layer parameter dmrs-additionalPoistion. FIG. 27 shows an example for PUSCH that is scheduled for transmission over 12 OFDM symbols from OS 0 to OS 11 with one additional UL DMRS symbol, but UE fails in accessing the channel due to LBT failure. If the channel becomes available starting from the illustrated candidate position in the figure, i.e., OS 5, then duration of PUSCH with the UE selected start position is 7 OFDM symbols. In this case, the UE may map the UL DMRS according to the new PUSCH duration of 7 OSs following mapping type B in $l_0$ and 4 relative to the start of PUSCH as shown in the figure as illustrated in the figure and Table 5.

TABLE 5

PUSCH DMRS positions for PUSCH mapping type A and B

| Duration in symbols | DMRS positions for PUSCH mapping type A for a single-symbol DMRS with dmrs-AdditionalPosition = 1 | DMRS positions for PUSCH mapping type B for a single-symbol DMRS with dmrs-AdditionalPosition = 1 |
|---|---|---|
| 7 | $l_0$ | $l_0$, 4 |
| . | . | . |
| . | . | . |
| . | . | . |
| 12 | $l_0$, 9 | $l_0$, 10 |

Figure 28:
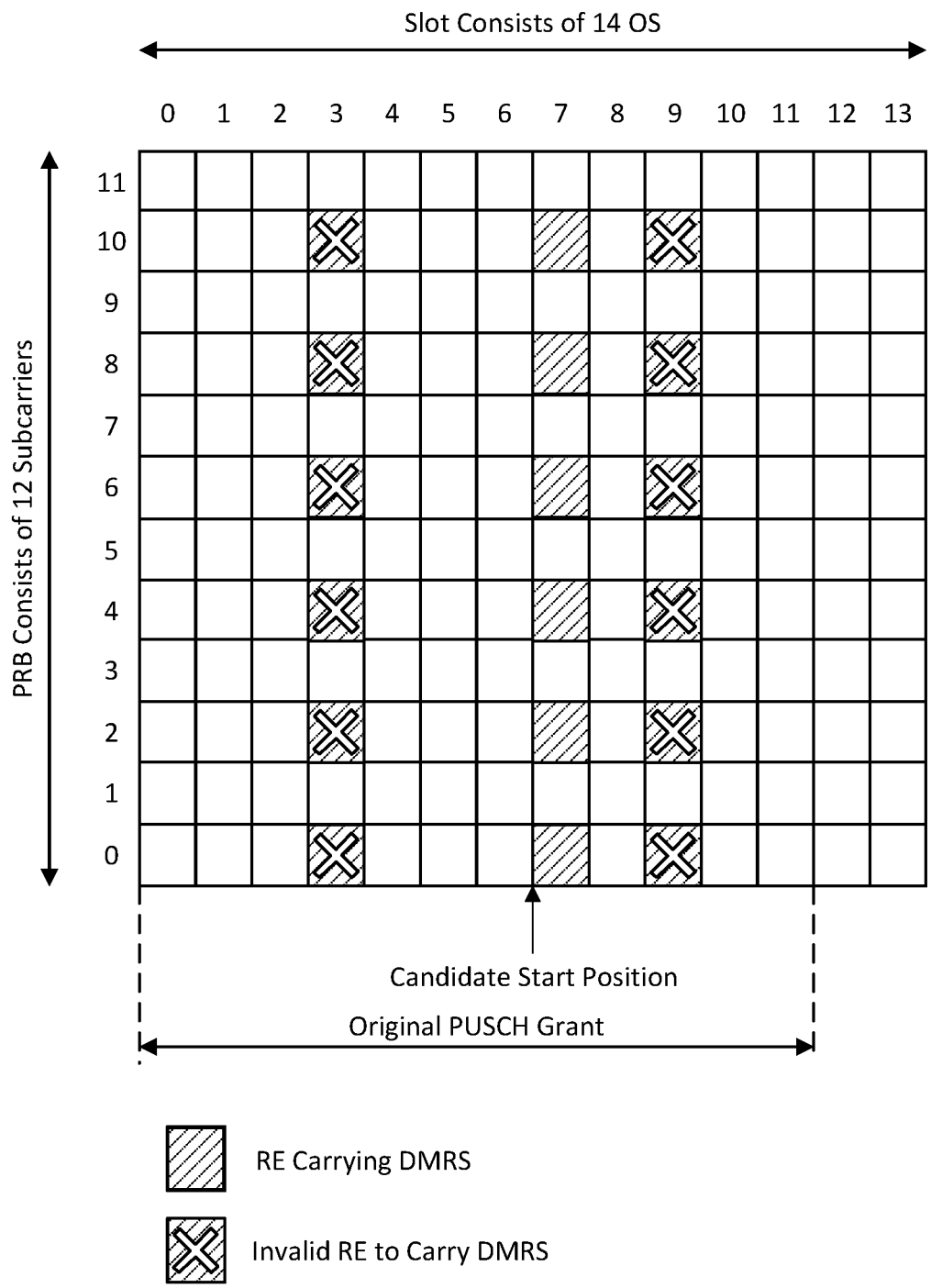
FIG. 28 shows starting PUSCH after 10 and DMRS are mapping according to PUSCH mapping type B instead of PUSCH mapping type A.

As another example, FIG. 28 shows PUSCH that is scheduled for transmission over 12 OFDM symbols from OS 0 to OS 11 with one additional UL DMRS symbol, but UE fails in accessing the channel due to LBT failure. In this example, the UE accesses the channel starting from OS 7 which makes the duration of the PUSCH with the UE selected start position is four OFDM symbols which has only has one symbol carrying DMRS with no additional DMRS positions.

Though in the previous examples, these aspects are illustrated on a single symbol DMRS with one additional DMRS position, these aspects are still applicable to single symbol DMRS with any additional number DMRS position(s) and also applicable to double symbol DMRS with any additional number DMRS position(s).

Figure 29:
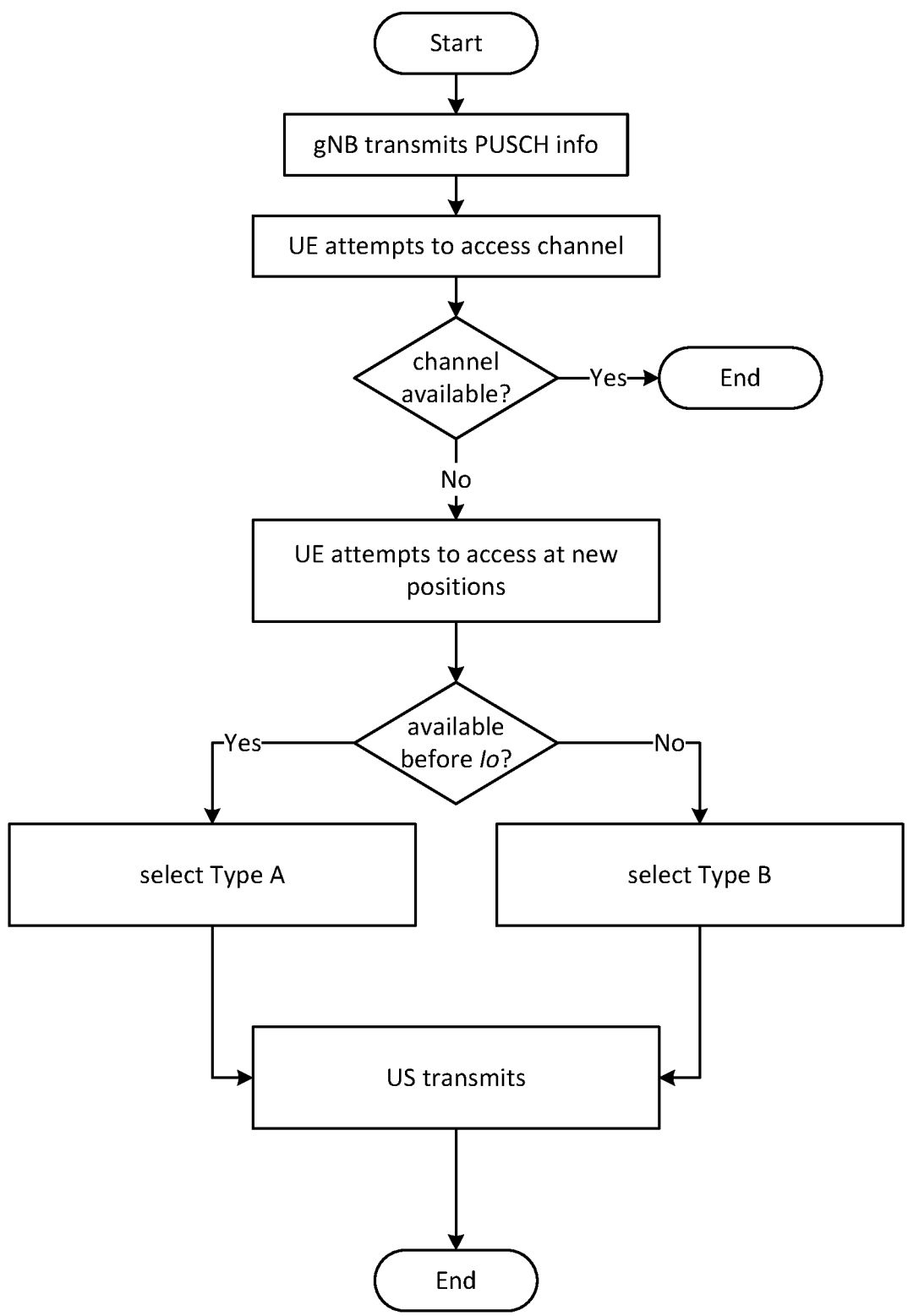
FIG. 29 shows a procedure to access the channel to transmit PUSCH with multiple start positions.

FIG. 29 illustrates an example procedure in which a DMRS configuration may be adjusted according to the candidate PUSCH start positions. In the example of FIG. 29, first, a gNB transmits a request for grant PUSCH mapping type A and to schedule the corresponding DMRS based on PUSCH duration. Next, the UE attempts to access the channel to start PUSCH from the first scheduled OS. If the channel is available, the procedure ends. If the channel is not available, the UE attempts to access the channel at new start positions. To access the channel before Io, the UE selects ULDM R5 configurations according to PUSCH mapping type A and a PUSCH new duration, but with the same configuration of scheduled DMRS in terms of OM RS type (1 or 2), number of additional DMRS positions, and single or double DMRS symbols. To access the channel not before Io, the UE selects UL DM R5 configurations according to PUSCH mapping Type B and a PUSCH new duration, but with the same configuration of scheduled DMRS in terms of DMRS type (1 or 2), number of additional DMRS position, and single or double DMRS symbols. In either case, the UE transmits PUSCH with the new DMRS configurations.

The case of multi-user MIMO (MU-MIMO), i.e., the DMRS of other UEs are sharing the same CDM group with different OCC sequence or using orthogonal frequency resources, is more challenging because the UEs are sharing the same resources for PUSCH. Therefore, shifting the DMRS of one UE independent of other UEs DMRS may result in significant interference between the different antenna ports used by different UEs. To cope with such challenge, several alternatives may be employed as described below.

Figure 30:
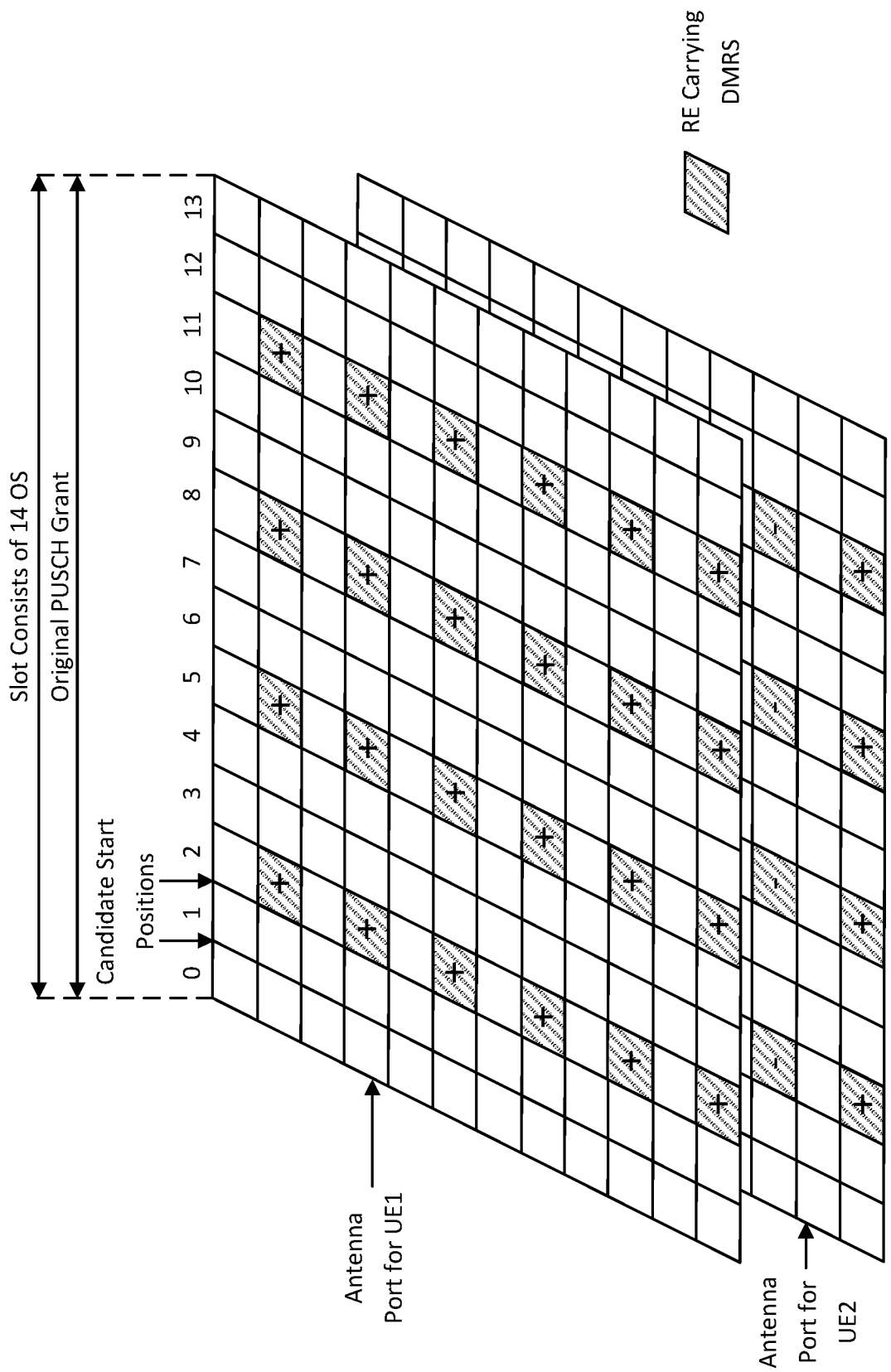
FIG. 30 shows the OFDM symbols carrying the UL DMRS of the duration of PUSCH duration with the UE selected start position are as same as the old OFDM symbols carrying UL DMRS of the originally scheduled PUSCH.

The UE may change PUSCH start position as long as UL DMRS symbol(s) of the PUSCH with the UE selected start position occupy the same symbol(s) which carries the UL DMRS of the old PUSCH or some of those symbols. For example, for PUSCH mapping type A with a single-symbol DMRS with three additional DMRS positions, if the PUSCH durations are 12, 13, or 14, then the DMRS occupy the same symbols $l_0$, 5, 8, 11. Therefore, if the original PUSCH grant duration is 14 symbols with three additional DMRS are configured as shown in FIG. 30 for example, the $UE_1$ may attempt to access the channel starting from OS 1 or 2 which makes the duration of PUSCH with the UE selected start position equal 13 and 12 symbols, respectively. For both PUSCH start positions, the UL DMRS may occupy the same symbols as the UL DMRS of the originally scheduled PUSCH. In such case, the DMRS of $UE_1$ and $UE_2$ are still orthogonal even after changing the start positions for $UE_1$ PUSCH.

Figure 31:
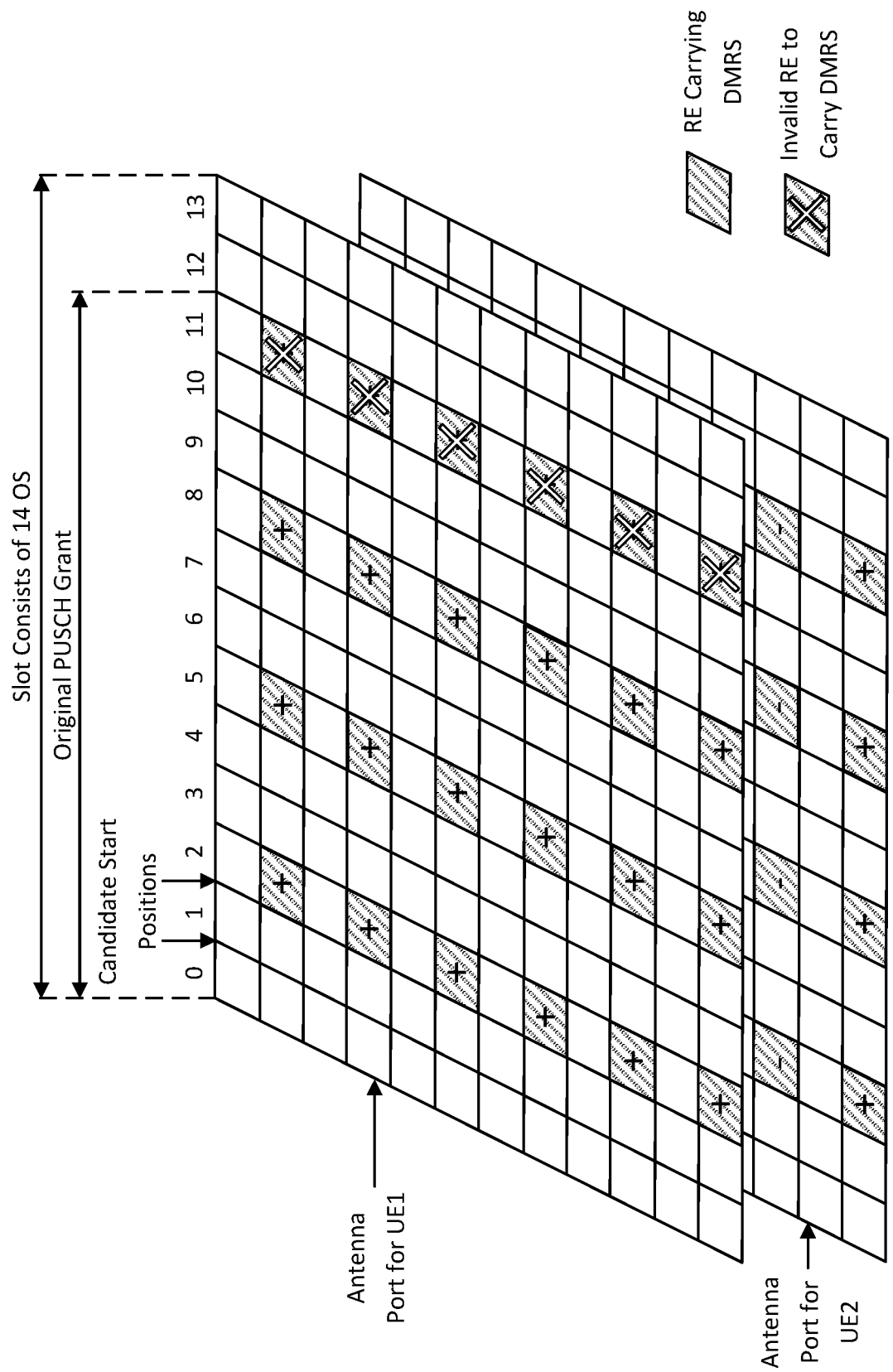
FIG. 31 shows the OFDM symbols carrying the UL DMRS of the PUSCH with the UE selected start position are different than the old OFDM symbols carrying UL DMRS of the originally scheduled PUSCH.

This may not be always the case, i.e., the UL DMRS occupy the same symbols for the PUSCH with the UE selected start position and the originally scheduled PUSCH. Therefore, according to another aspect, the indices set, $S_{new}$, of OFDM symbols carrying the UL DMRS of the PUSCH with the new duration to be selected out of the symbols indices set, $S_{old}$, which carry the UL DMRS of the PUSCH with the old duration. If the two sets are not overlapping and some of the indices belong to $S_{new}$ does not belong to $S_{old}$, then those indices are replaced with the closest indices in Som. The symbols in $S_{old}$ and not used for transmitting the UL DMRS for PUSCH with new duration may not be used to carry data to avoid collision between them the DMRS of other UEs. FIG. 31 shows an example of PUSCH grant of duration equal to 12 symbols, from OS 0 to OS 11, with three additional DMRS are configured occupying, i.e., $S_{old}=\{l_0, 5, 8, 11\}$. If the $UE_1$ attempts to access the channel starting from OS 1 or OS 2 which makes the durations of the PUSCH with the UE selected start position are 11 and 10, respectively. Unfortunately, for the duration of PUSCH with the UE selected start position, UL DMRS has to occupy symbols $S_{new}=\{l_0, 6, 9\}$ which means only $l_0$ overlap with symbols carrying the UL DMRS of $UE_2$. Moreover, the UE may replace 6 and 9 in $S_{new}$ by the closest indices in $S_{old}$ which are 5 and 8, respectively, to have $S_{new}=\{l_0, 5\ 6, 8\ 9\}$. By doing so, the orthogonality between the $UE_1$ and $UE_2$ is maintained.

Figure 32:
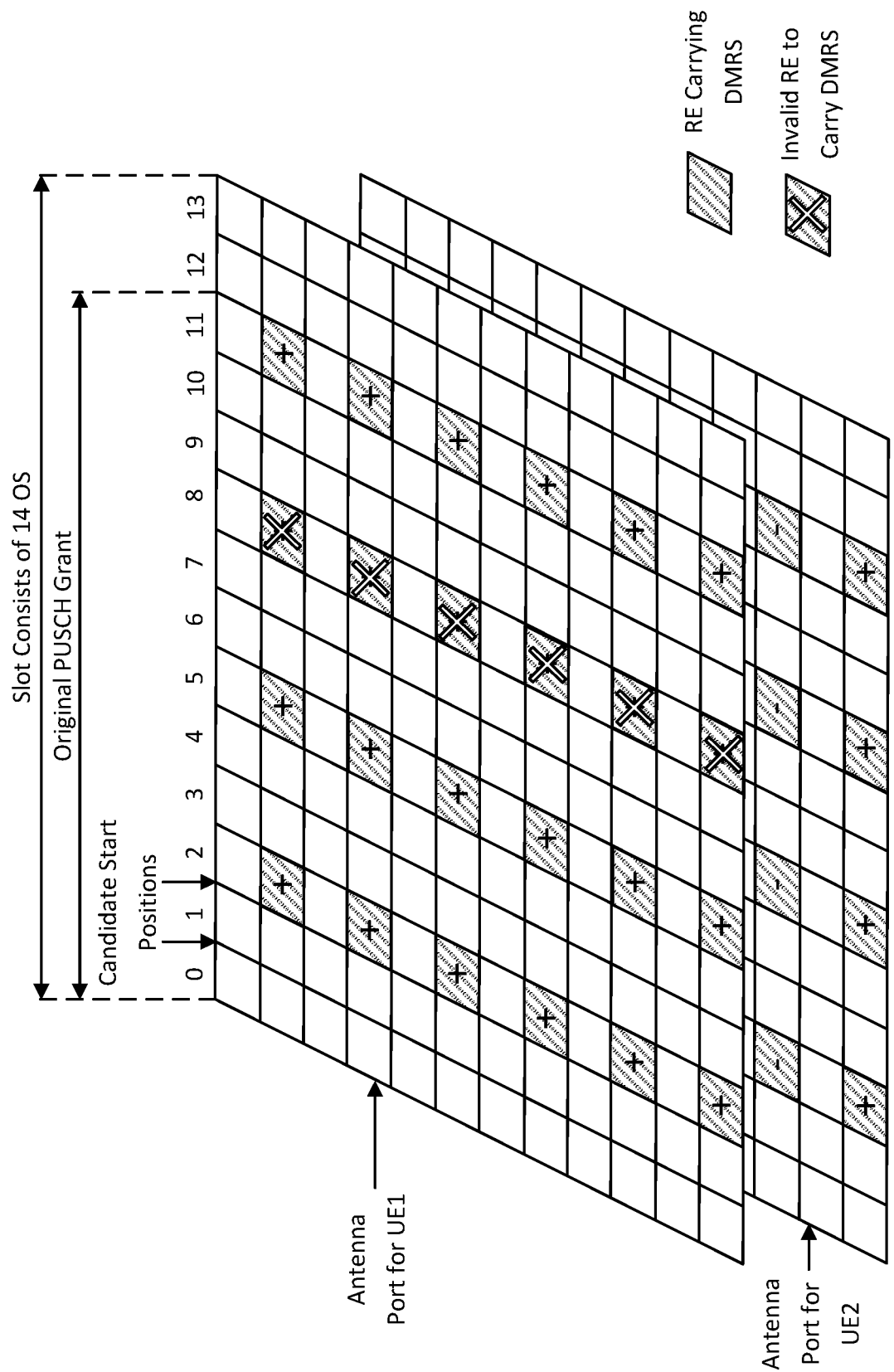
FIG. 32 shows the OFDM symbols carrying the UL DMRS of the PUSCH with the UE selected start position are different than the old OFDM symbols carrying UL DMRS of the originally scheduled PUSCH and the last OS carries DMRS.

To avoid doing extrapolation over many OFDM symbols which may severely degrade the channel estimation from the last OFDM symbols from the last DMRS to the end of the PUSCH, the index of last OFDM symbol of the PUSCH may be used with the old duration if more than one OFDM symbol are needed to carry the PUSCH with the new duration. In the previous example with $S_{old}=\{l_0, 5, 8, 11\}$ and $S_{new}=\{l_0, 6, 9\}$, the UE may replace 6 and 9 in $S_{new}$ by 5 and 11, respectively, to have $S_{new}=\{l_0, 5\ 6, 11\ 9\}$ as shown in FIG. 32.

Figure 33:
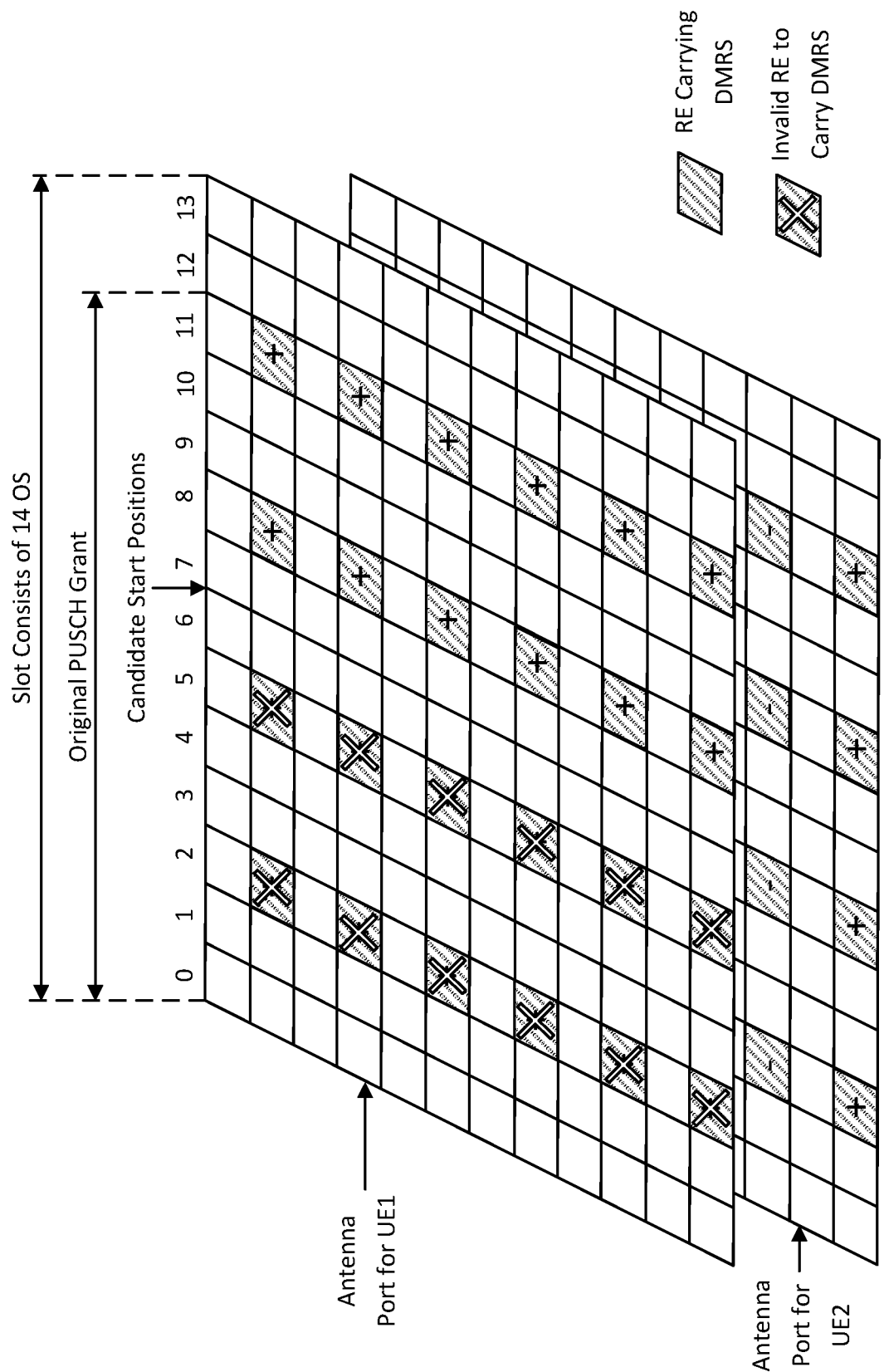
FIG. 33 shows the OFDM symbols carrying the UL DMRS of the PUSCH with the UE selected start position follow PUSCH mapping type B and are different than the old OFDM symbols carrying UL DMRS which follow PUSCH mapping type A of the originally scheduled PUSCH.

If PUSCH mapping type A is used, but the UE acquires the channel the channel after $l_0$, then PUSCH mapping type B may be used to map the DMRS according to the duration of PUSCH with the UE selected start position. If indices set, $S_{new}$, of symbols to carry UL DMRS for the PUSCH with the new duration is different than the indices set of symbols which are supposed to carry UL DMRS for PUSCH with old duration, then for each element in $S_{new}$ is replaced by the closest element in $S_{old}$. FIG. 33 shows an example of PUSCH grant of duration equal to 12 symbols, from OS 0 to OS 11, with three additional DMRS are configured occupying, i.e., $S_{old}=\{l_0, 5, 8, 11\}$. If the $UE_1$ fails in accessing the channel starting from OS0, but succeeds starting OS7, i.e., after $l_0$, then DMRS are mapped according PUSCH mapping type B may be used. Since the PUSCH new duration is five symbols, UL DMRS may occupy the symbols indexed by $l_0$, 4 relative to the PUSCH start position, OS7, hence, $S_{new}=\{7, 11\}$. Comparing $S_{new}$ with $S_{old}$, the UE may replace OS7 by OS8 to have $S_{new}=\{8, 11\}$.

Figure 34:
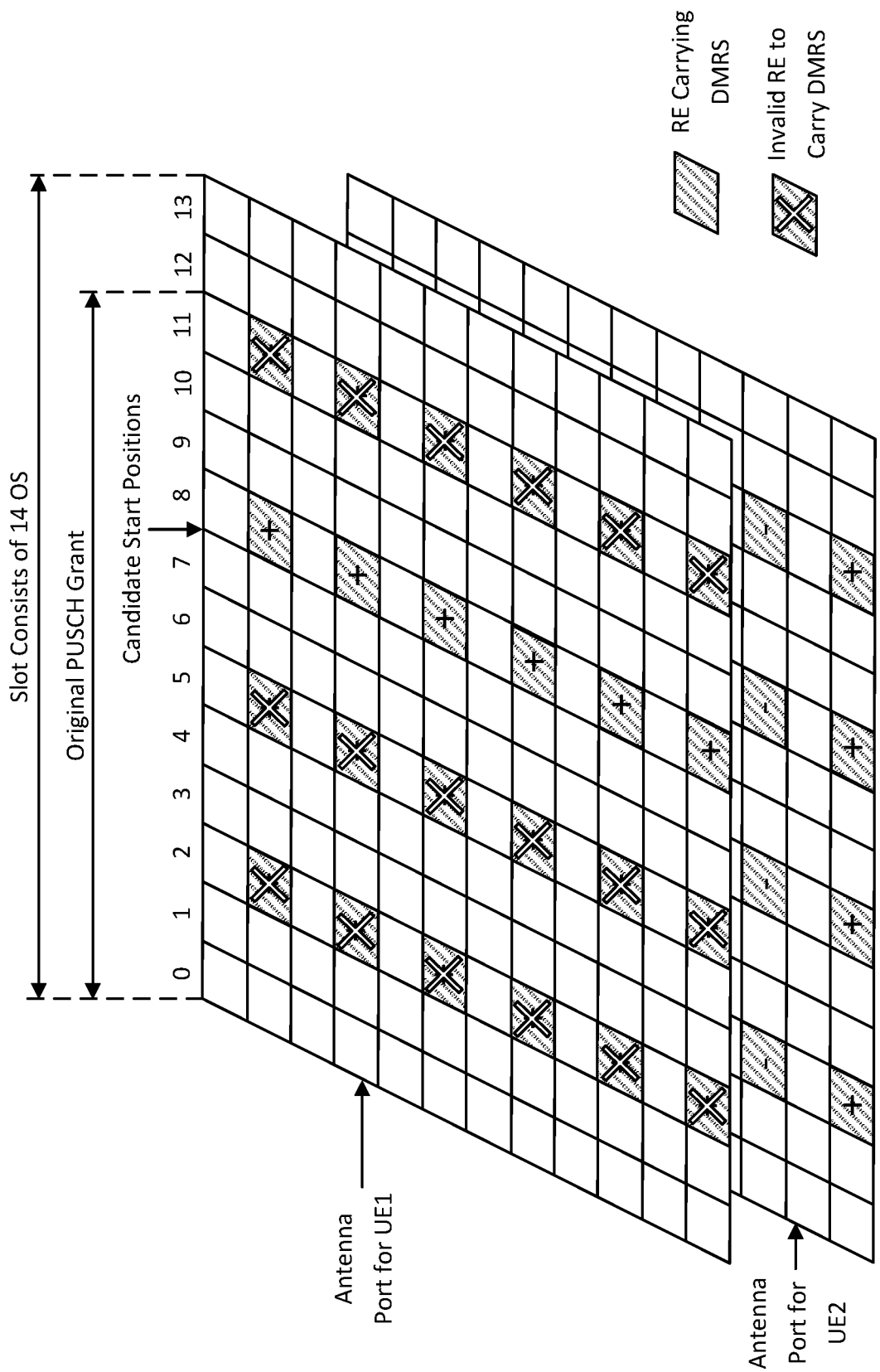
FIG. 34 shows one OFDM symbol carrying the UL DMRS of the PUSCH with the UE selected start position follows PUSCH mapping type B while the old OFDM symbols carrying UL DMRS which follow PUSCH mapping type A of the originally scheduled PUSCH.

If the UE accesses the channel at OS8, then the PUSCH new duration is 5 and, according to PUSCH mapping type B, and the index of the symbol carrying DMRS is $l_0$, relative PUSCH, i.e., $S_{new}=\{8\}$. In this case, the may not use the last symbol $S_{old}$ to carry DMRS as shown in FIG. 34.

Figure 51:
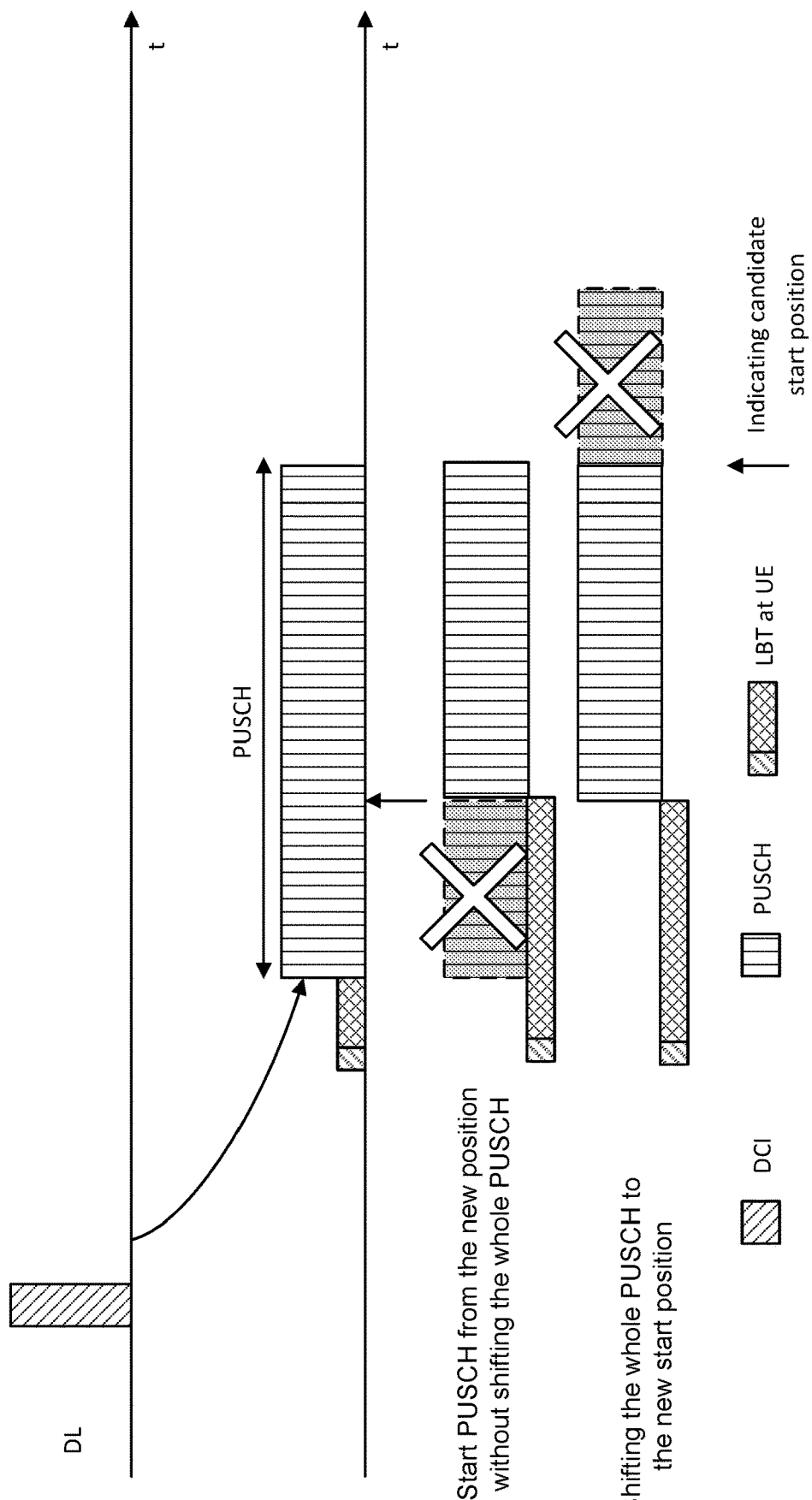
FIG. 51 shows an example of shifting whole PUSCH to the new start position.
Figure 52A:
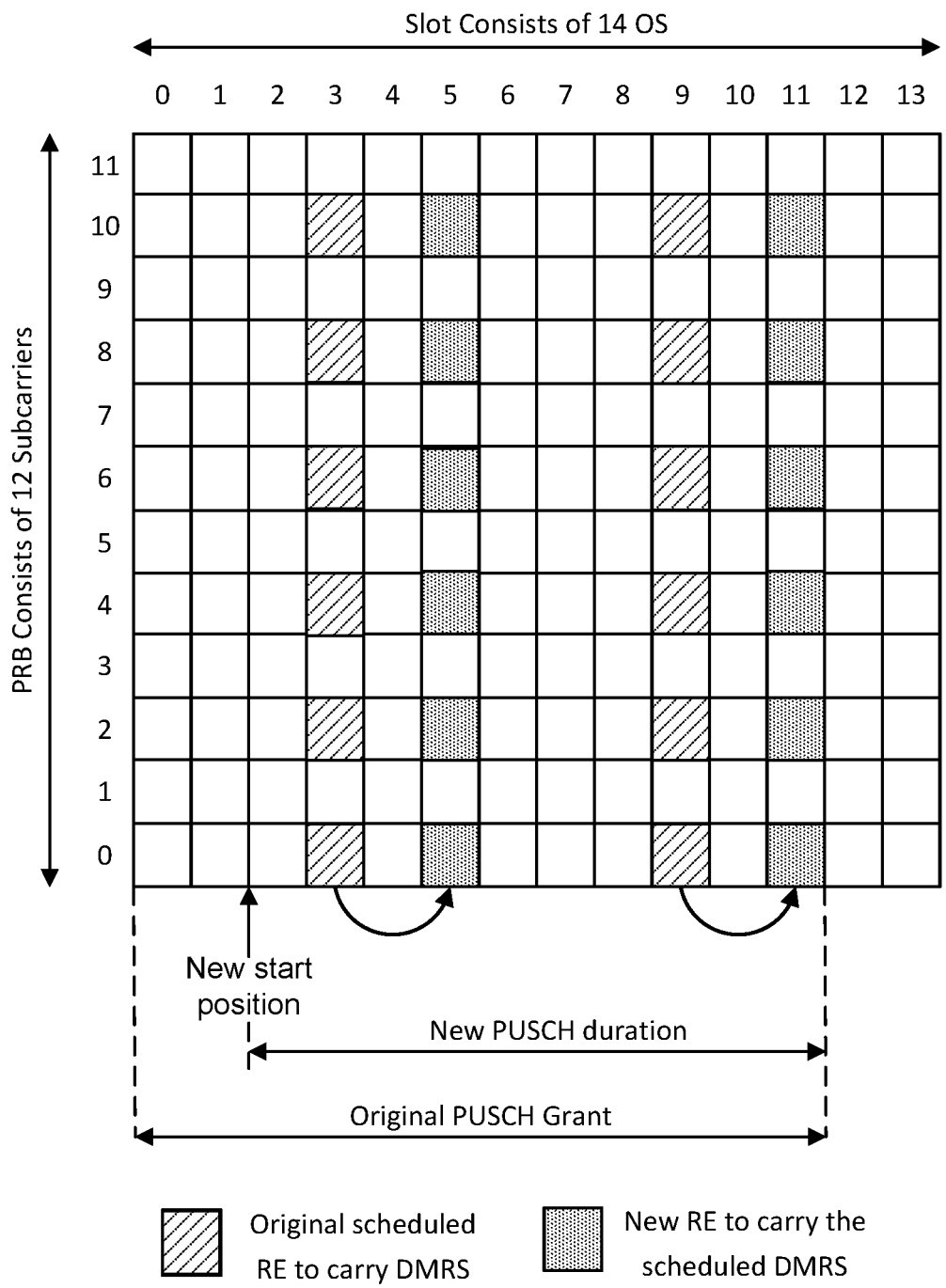
FIG. 52A shows PUSCH and the scheduled DMRS are shifted by two OFDM symbols as same as the new start position relative to the original start position.

Additionally, the UE may shift the whole scheduled PUSCH to the new start position and the scheduled DMRS may shifted relative to the new start position rather than just start PUSCH transmission from the new start position without shifting the whole PUSCH as illustrated in FIG. 51 for example. FIG. 52A shows an example for PUSCH that is scheduled for transmission over 12 OFDM symbols from OS 0 to OS 11 with one additional UL DMRS symbol, but UE fails in accessing the channel due to LBT failure. If the channel becomes available starting from the illustrated candidate position in the figure, OS 2, i.e., the PUSCH start position is shifted by two OFDM symbols. Then the DMRS symbols are shifted by two OFDM symbols such that their new locations are OS 5 and OS 11. The UE may puncture/rate match the truncated symbols at the end of the granted PUSCH due to shifting the whole PUSCH.

Figure 52B:
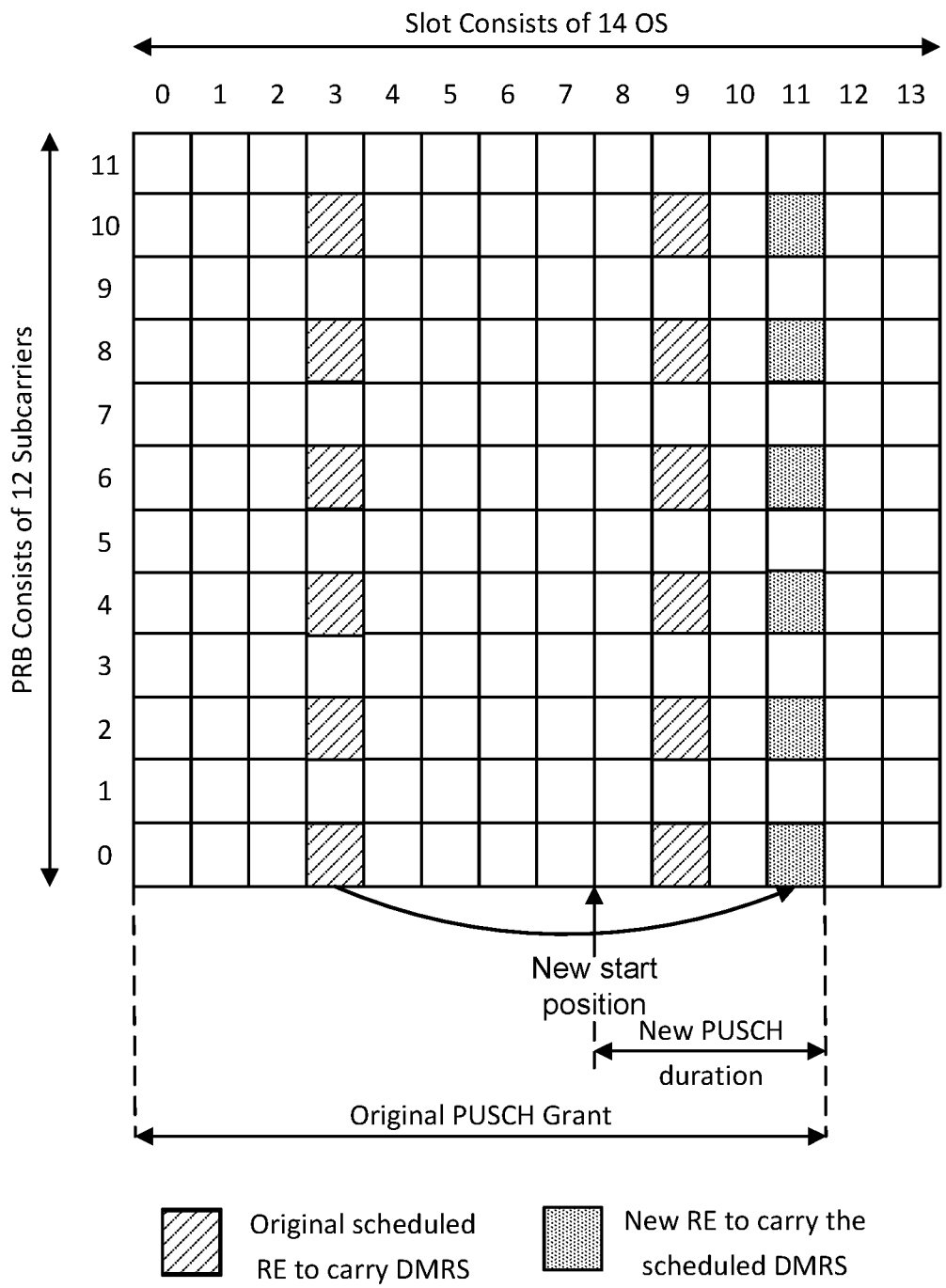
FIG. 52B shows that one of the scheduled DMRS symbols are dropped because it falls beyond the end of the scheduled PUSCH.

Depending on the new start position, the UE may puncture one or more scheduled DMRS symbols if their new shifted locations are beyond the end of the scheduled PUSCH. For example, FIG. 52B shows an example for a UE that transmits only one DMRS symbol instead of the originally two scheduled DMRS symbols. The DMRS symbol that was scheduled to be transmitted in OS 3, the UE may transmit it in OS 11. While the DMRS scheduled to be transmitted in OS 9 may be dropped.

The UE may be configured to transmit at least one DMRS symbol, in the first OFDM symbol in the new PUSCH start position, for example. This may be beneficial, if all the scheduled DMRS symbols are shifted to beyond the end of the scheduled PUSCH, i.e., all the scheduled DMRS symbols are dropped. High layer signaling may indicate the minimum number of DMRS symbols, their locations, etc. in case none of the scheduled DMRS symbols can be transmitted due to shifting PUSCH. Moreover, the UE may be configured that if the remaining number of OFDM symbols to carry PUSCH is less than a certain threshold, then the UE may not transmit this PUSCH because it most likely to be decoded successfully. Such threshold may be indicated to the UE by high layer signaling.

Figure 53A:
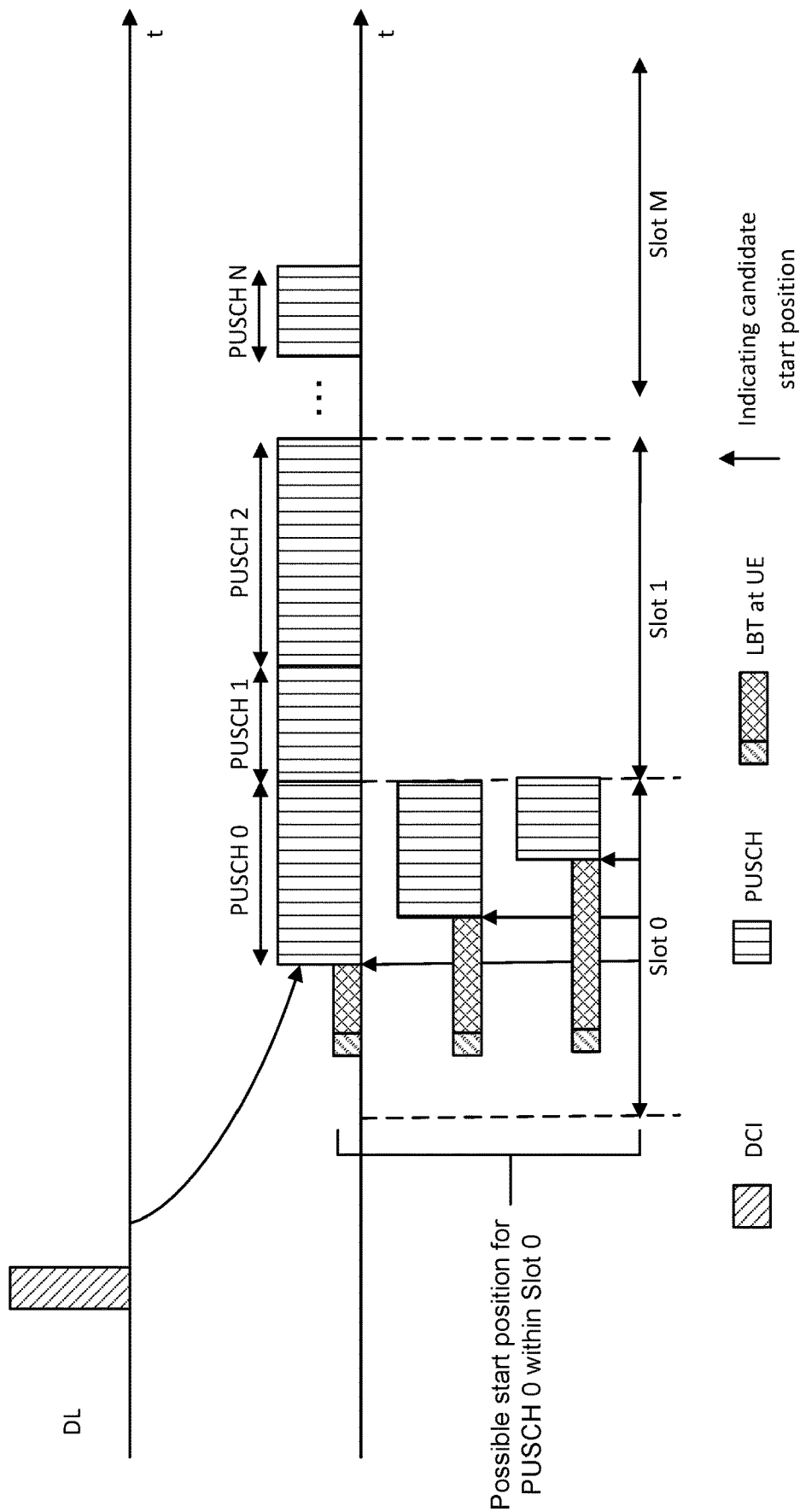
FIG. 53A shows an example of shifting PUSCH without crossing the slot boundary.

If PUSCH is not allowed to cross the slot boundary and the UE is scheduled with multiple contiguous PUSCHs, then each scheduled PUSCH may not be shifted to start beyond the end of slot containing the original scheduled PUSCH. For example, FIG. 53A shows an example of a UE scheduled N PUSCHs and the three candidate start positions are indicated for PUSCH 0. Then based on the channel availability, PUSCH 0 may be shifted to begin from any of the indicated candidate start positions. If the channel is not available at any of the indicated candidate PUSCH start positions or the remaining number of OFDM symbols in slot 0 is less than particular threshold indicated by high layer, for example, then UE may drop PUSCH 0. Then the UE may attempt to access the channel to transmit next PUSCH.

Figure 53B:
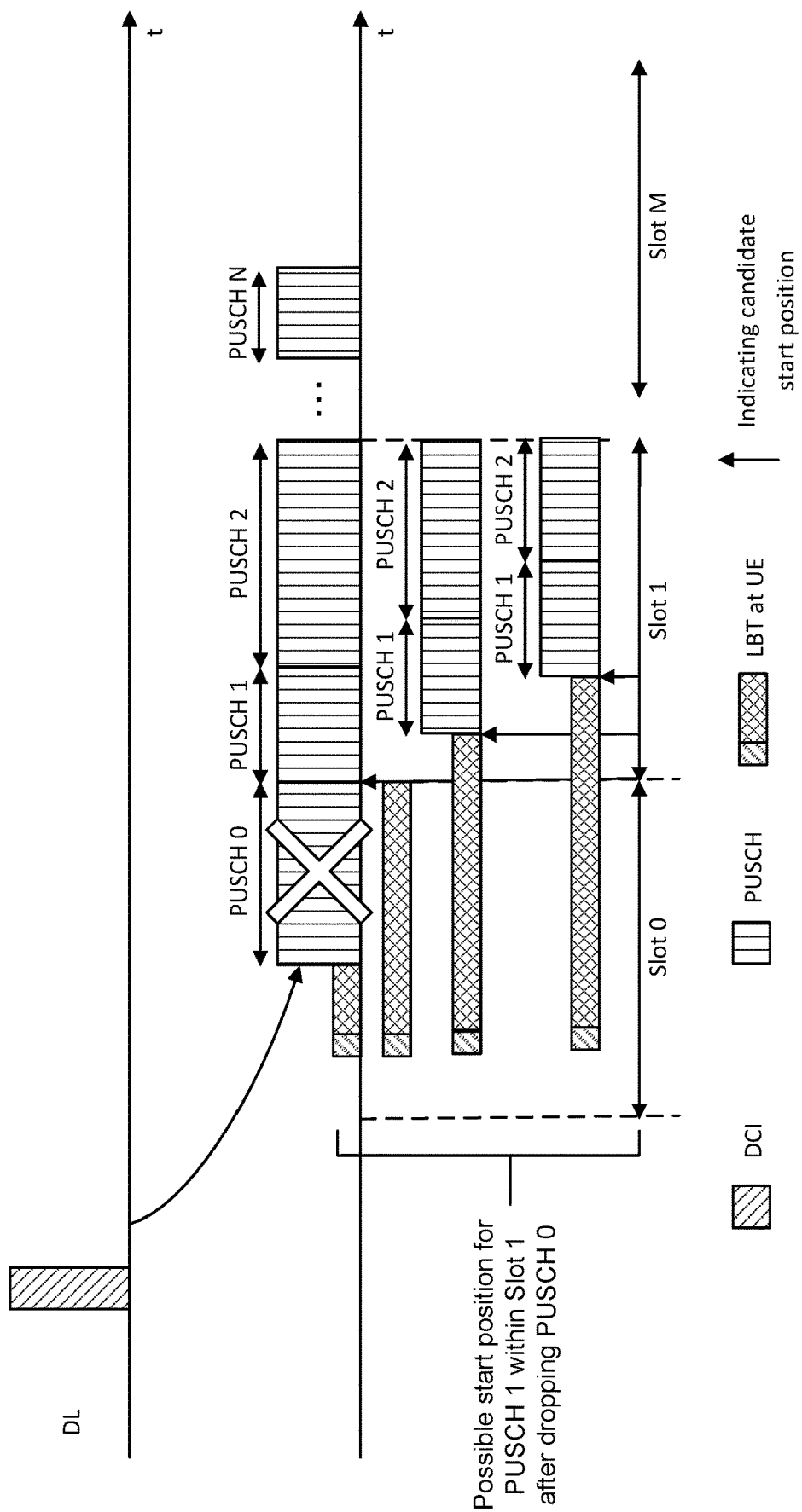
FIG. 53B shows an example of shifting multiple scheduled PUSCHs in slot without crossing the slot boundary.

If slot contains multiple PUSCHs, then the UE may shift all the scheduled PUSCHs within the slot as shown in FIG. 53B, for example. In this figure, PUSCH 0 is dropped because of channel unavailability. Therefore, the UE may attempt to access the channel to transmit PUSCH 1. If the channel is unavailable, then PUSCH 1 and the followed PUSCH 2 will be shifted together to the new start position. If any PUSCH reaches the end of the slot boundary, then the OFDM symbols that fall beyond slot boundary will be punctured. The UE may perform rate matching/puncturing the data due to the reduction in the number of available OFDM symbols for this PUSCH.

Figure 54A:
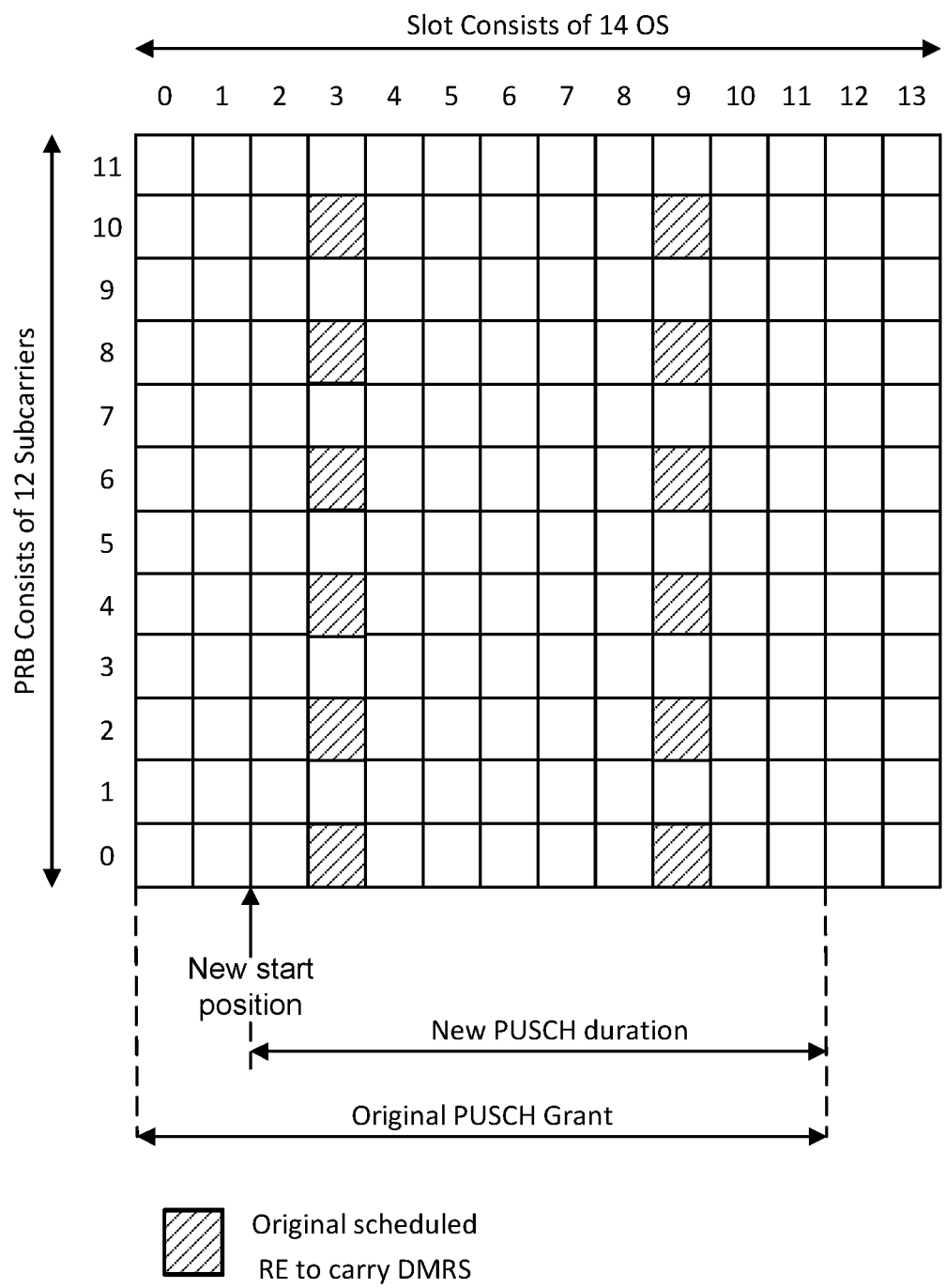
FIG. 54A shows an example of shifting PUSCH while keeping the scheduled DMRS location fixed.
Figure 54B:
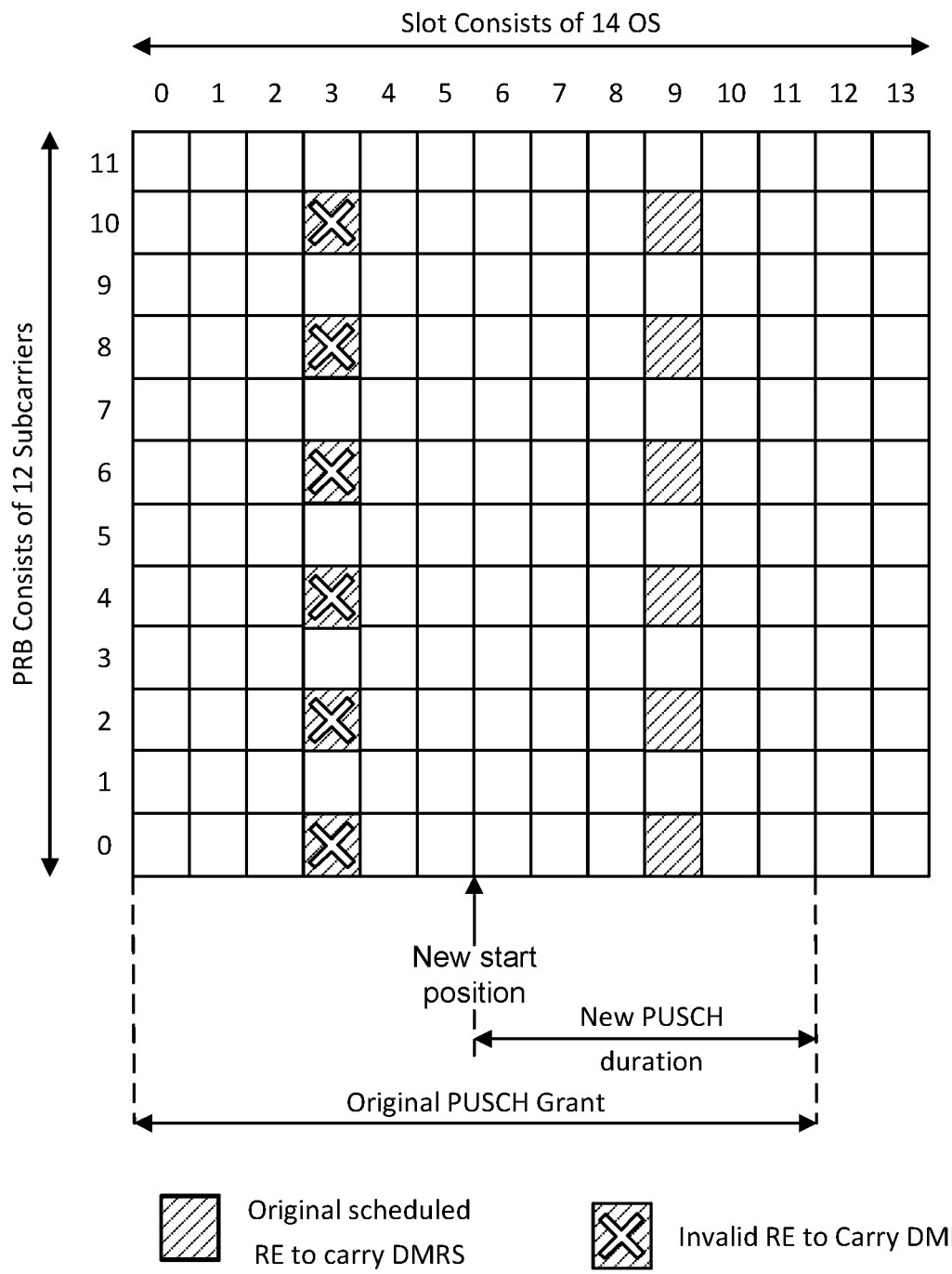
FIG. 54B shows an example of shifting the PUSCH such that one of the scheduled DMRS symbols is dropped because it falls before the new start position.
Figure 54C:
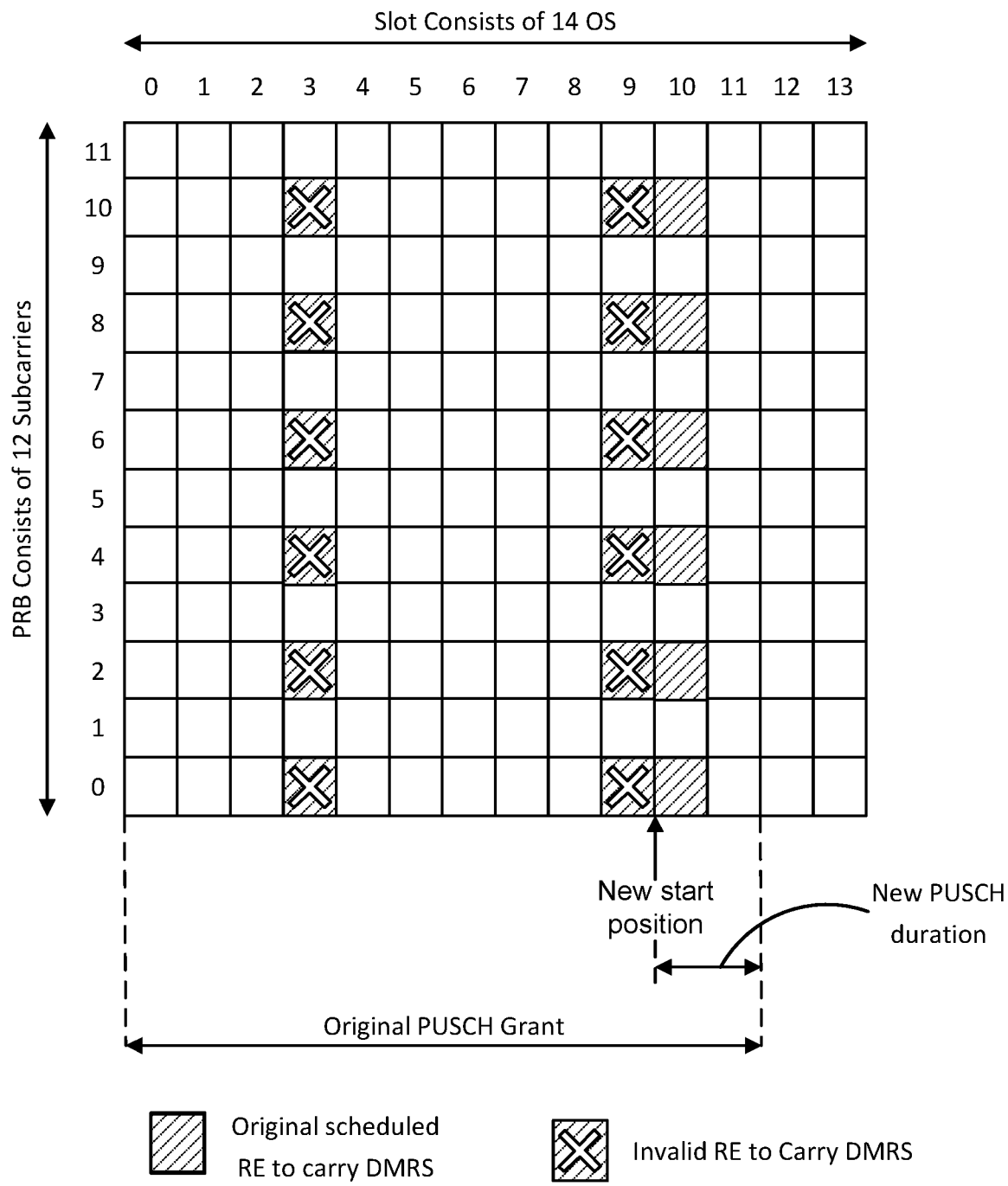
FIG. 54C shows an example of transmitting DMRS symbol in the first symbol of PUSCH with the new start position because all the originally scheduled DMRS are dropped as they fall before the new start position.

Additionally, the UE shift PUSCH to the new start position, but the UE may keep the scheduled DMRS symbols in their locations as indicated in the original grant as illustrated in FIG. 54A, for example. If one or more DMRS symbols fall before the new start position of PUSCH, then those symbols will be dropped as shown in FIG. 54B, for example. If the new start position of PUSCH fall beyond all the scheduled DMRS symbols, then the UE may abandon the transmission of PUSCH. Or, as aforementioned, the UE may be configured with particular number of compensation DMRS symbols that can be transmitted, their locations, any other configurations, etc., through high layer signaling for example, that UE may transmit all the scheduled DMRS symbols are dropped. FIG. 54C shows an example in which the PUSCH start position is at OS 10 where all the previous DMRS symbols are dropped. In this case, the UE may transmit a DMRS symbol in first OFDM symbol of the PUSCH with the new start position.

Power Boosting in the First PUSCH Transmission

Figure 35:
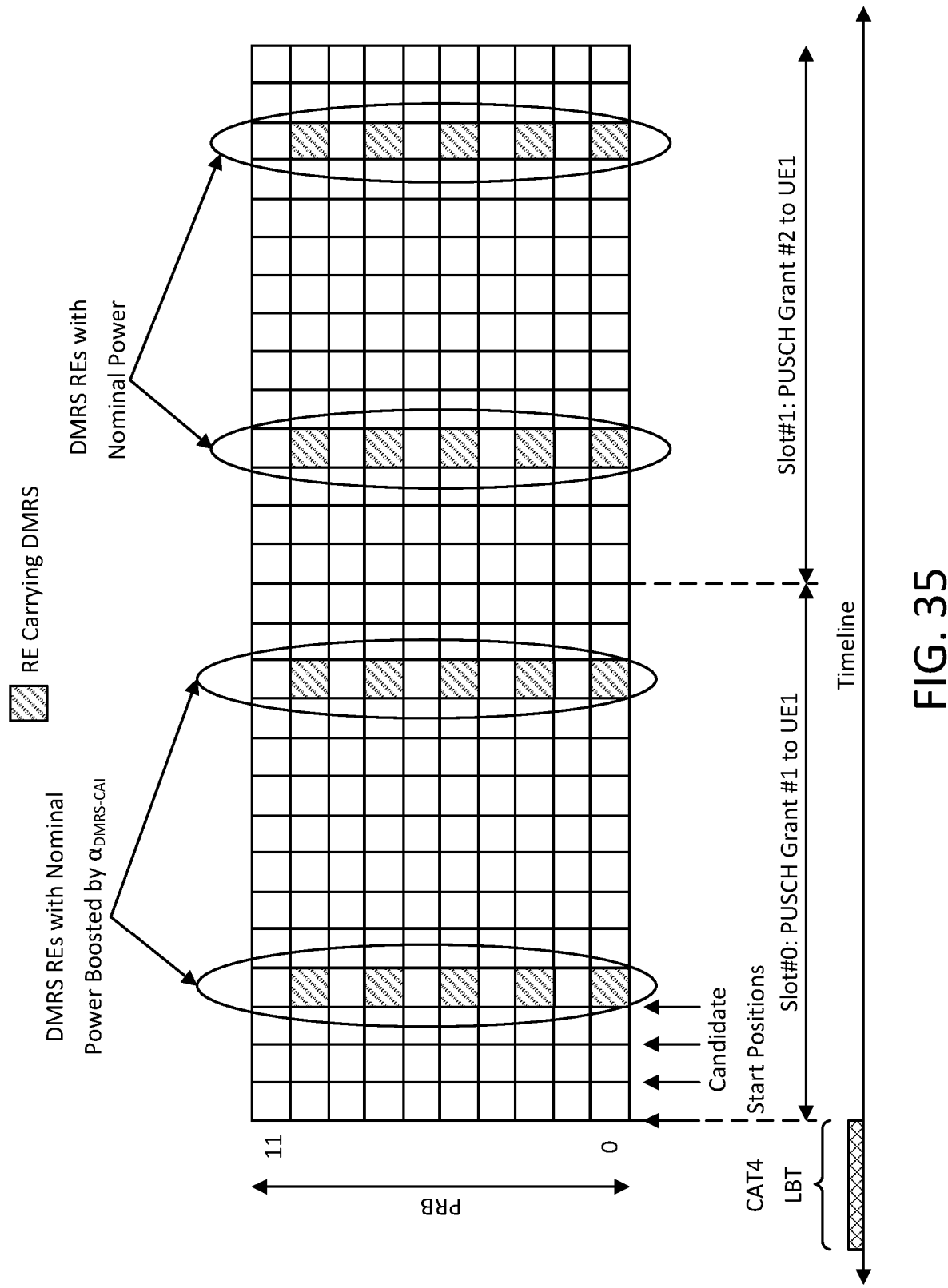
FIG. 35 shows power boosting for DMRS REs of the first PUSCH transmission in UE's COT.

For the first PUSCH transmission in a UE's COT, the DMRS power is boosted relative to the DMRS in the subsequent PUSCH transmissions within that COT. This ensures higher reliability of detection of the PUSCH at the gNB and improves channel quality estimation. This in turn improves the BLER on the PUSCH if the PUSCH transmission is rate matched to fewer resources or punctured due to delayed channel access. The concept is shown in FIG. 35 where the nominal power is boosted in the DMRS sequence of the first PUSCH transmission of the UE following CAT4 LBT.

Figure 36:
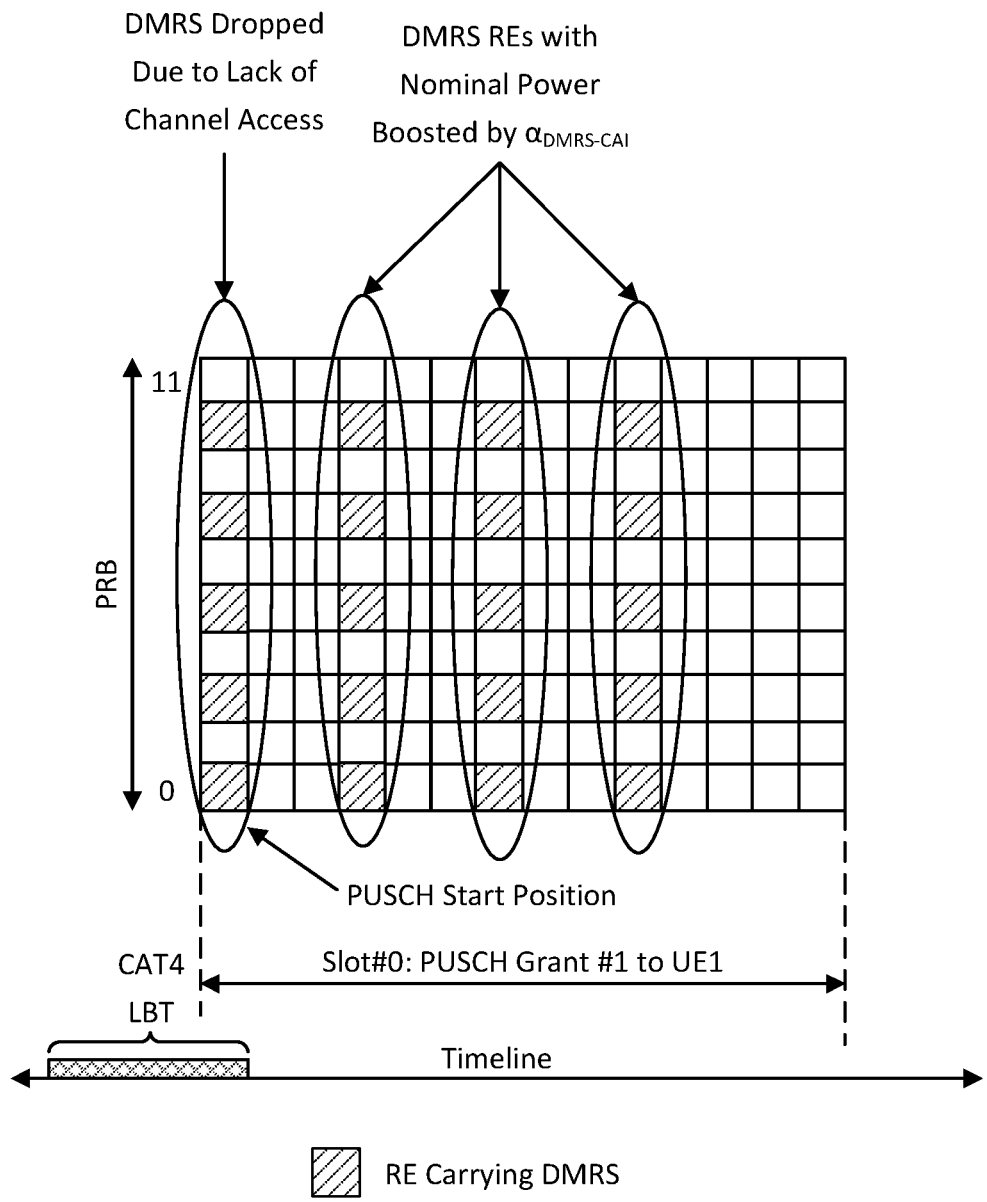
FIG. 36 shows power boosting on remaining DMRS REs after dropping some DMRS REs due to channel non-availability.

As another use case, if the PUSCH transmission starts at a location causing the UE to drop one or more OS carrying a DMRS sequence, the UE may boost the power of the remaining DMRS sequences to boost the quality of channel estimation. FIG. 36 shows an example of Type B PUSCH transmission where OS #0 is not transmitted due to lack of channel availability. The power is boosted on the remaining DMRS symbols within the grant, thereby compensating to some extent for the loss of the DMRS sequence in OS #0. Here, the gNB will detect the absence of DMRS on OS #0 and recognize that the PUSCH did not start on OS #0. It identifies DMRS on OS #3 and attempts to decode the PUSCH from starting locations OS #1, 2, and 3.

The power boost value $\alpha_{DMRS-CAI}$ is configured to the UE through RRC signaling. The value may be dependent on the number of DMRS sequences actually transmitted in the available PUSCH resources.

Also, the power for the PUSCH REs may be boosted within the available PUSCH resources for the first PUSCH transmission within the UE's COT, following the UE's LBT. The boost may be a function of the number of available OS. If the original grant has N OS and the UE is able to get access only to K OS, then the UE may boost the power of the PUSCH REs in the K OS by a factor $P_{PUSCH,boost} = 10 * \log 10(\alpha_{PUSCH-CAI} * N/K)$ Here, $\alpha_{PUSCH-CAI}$ is configured to the UE through RRC signaling and is a value greater than or equal to 0 and is applied to the first PUSCH following the channel access. A typical setting could use a value of 1. The UE may apply the power boost only if it has power headroom for given N and K. Otherwise, it may boost the power to the maximum possible value for the device. $P_{PUSCH-CAI} = \max(P_{PUSCH,nominal} + P_{PUSCH,boost}, P_{max})$. Here $P_{PUSCH-CAI}$ is the power applied to the first PUSCH transmission following the LBT, $P_{max}$ is the maximum power the UE may transmit ($P_{max}$ may be dependent on the UE's capability and/or may be configured to the UE through RRC signaling). $P_{PUSCH,nominal}$ is the nominal power at which a PUSCH transmission is transmitted. PUSCH transmissions following the first PUSCH transmission may use P PUSCH,nominal power levels.

PUSCH Starting Location Dependent DMRS Sequence

Figure 37:
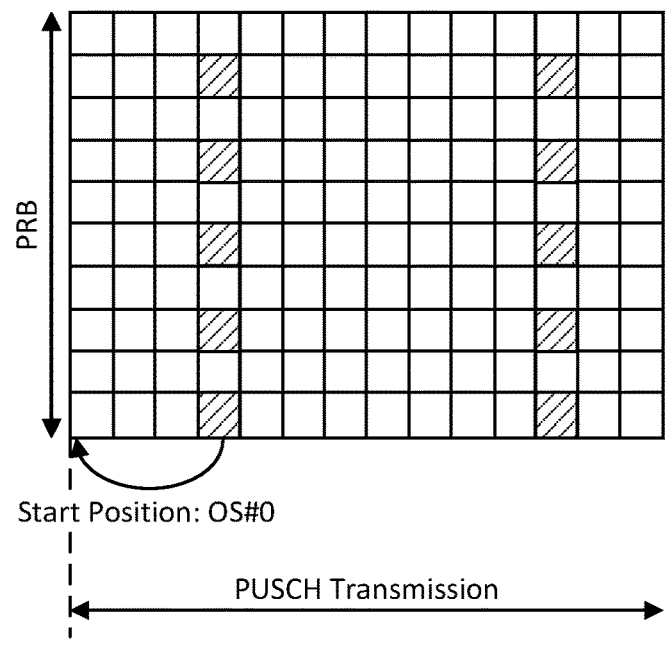
FIG. 37 shows the starting position of PUSCH transmission indicated through DMRS sequence (A) Sequence #1 indicates PUSCH starting at OS #0 (B) Sequence #2 indicates PUSCH starting at OS #1 (C) Sequence #3 indicates PUSCH starting at OS #2 (D) Sequence #4 indicates PUSCH starting at OS #4.
Figure 37:
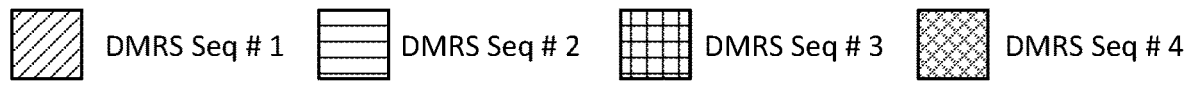
Figure 37:
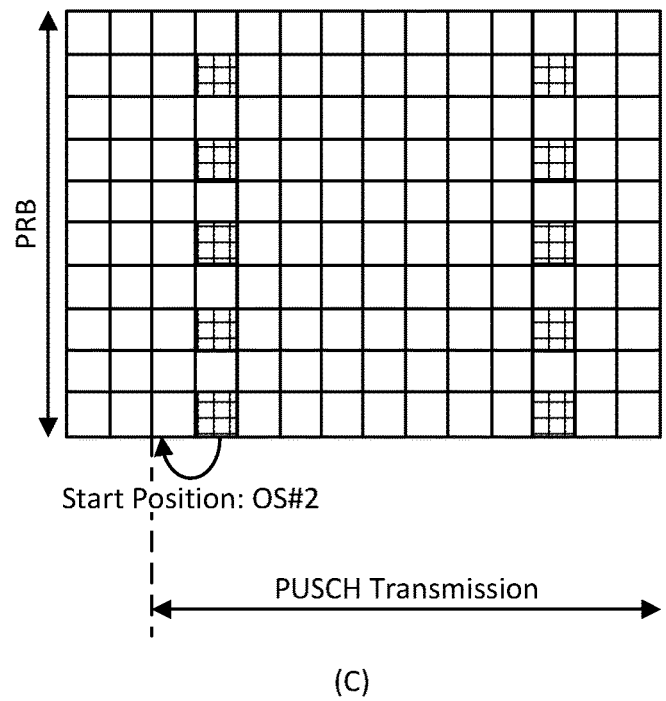
Figure 37:
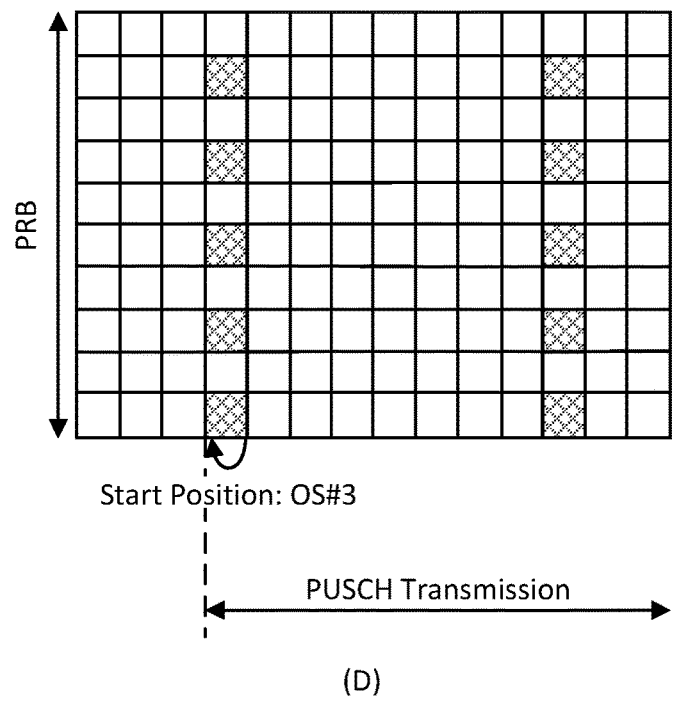

A UE may be configured through RRC signaling with multiple DMRS sequences wherein a UE selects a DMRS sequence that indicates the starting OS of the PUSCH. The concept is shown in FIG. 37 where the UE is configured with 4 candidate starting positions—OS #0, OS #1, OS #2, and OS #3 and four corresponding DMRS sequences. The UE transmits sequence #1 for the DMRS when it has channel access to OS #0, the UE transmits sequence #2 for the DMRS when it has channel access to OS #1, and so forth. Here, the gNB monitors for all candidate DMRS sequences. On finding a valid sequence, it infers the starting location of the PUSCH transmission from the sequence. This method avoids the need for blindly detecting the starting OS for the PUSCH transmission.

The sequences may be defined by providing different initialization parameters for the candidate starting locations in the pseudo-random sequence generator. For example, the parameter $n_{CAI}$ may be introduced in the DMRS sequence where $n_{CAI}$ is a function of the starting location of the PUSCH. If transform precoding for PUSCH is enabled, the reference-signal sequence r(n) shall be generated according to:

$$r(n) = r_{u,v}^{(\alpha,\delta)}(n)$$

$$n = 0, 1, \ldots, M_{sc}^{PUSCH} - 1$$

where $r_{u,v}^{(\alpha,\delta)}(m)$ is a low PAPR sequence defined as follows: $\delta = 1$ and $\alpha = 0$ for a PUSCH transmission dynamically scheduled by DCI.

$r_{u,v}^{(\alpha,\delta)}(n)$ is defined by a cyclic shift $\alpha$ of a base sequence $\bar{r}_{u,v}(n)$ according to $$r_{u,v}^{(\alpha,\delta)}(n) = e^{j\alpha n} \bar{r}_{u,v}(n), 0 \leq n < M_{ZC}$$

$M_{ZC} = mN_{sc}^{RB}/2^\delta$ is the length of the sequence. Multiple sequences are defined from a single base sequence through different values of $\alpha$ and $\delta$.

Base sequences $\bar{r}_{u,v}(n)$ are divided into groups, where $u \in \{0, 1, \ldots, 29\}$ is the group number and v is the base sequence number within the group, such that each group contains one base sequence (v=0) of each length $M_{ZC} = mN_{sc}^{RB}/2\delta$, $1 \leq m/2^\delta \leq 5$ and two base sequences (v=0,1) of each length $M_{ZC} = mN_{sc}^{RB}/2\delta$, $6 \leq m/2^\delta$.

The sequence group $u = (f_{gh} + n_{ID}^{RS} + n_{CAI}) \mod 30$, where $n_{ID}^{RS}$ is given by:

$n_{ID}^{RS} = n_{ID}^{PUSCH}$ if $n_{ID}^{PUSCH}$ is configured by the higher-layer parameter nPUSCH-Identity-Transform-precoding and the PUSCH is not a msg3 PUSCH $n_{ID}^{RS}=n_{ID}^{cell}$ otherwise where $n_{CAI}$ is defined as the parameter that identifies the starting location of the PUSCH where $f_{gh}$ and the sequence number v are given by:

if neither group, nor sequence hopping shall be used $$f_{gh}=0$$

$$v=0$$

if group hopping but not sequence hopping shall be used $$f_{gh} = \left(\sum_{m=0}^{7} 2^m c\big(8(N_{symb}^{slot}n_{s,f}^{\mu} + l) + m\big)\right) \bmod 30$$

$$v = 0$$

where the pseudo-random sequence c(i) is a pseudo-random Gold sequence of length 31 and shall be initialized with $c_{init}=\lfloor n_{ID}^{RS}/30 \rfloor$ at the beginning of each radio frame;

if sequence hopping but not group hopping shall be used $$f_{gh} = 0$$

$$v = \begin{cases} c(N_{symb}^{slot}n_{s,f}^{\mu} + l) & \text{if } M_{ZC} \geq 6N_{sc}^{RB} \\ 0 & \text{otherwise} \end{cases}$$

where the pseudo-random sequence c(i) is a pseudo-random Gold sequence of length 31 whose generator shall be initialized with $c_{init}=n_{ID}^{RS}$ at the beginning of each radio frame.

Figure 38:
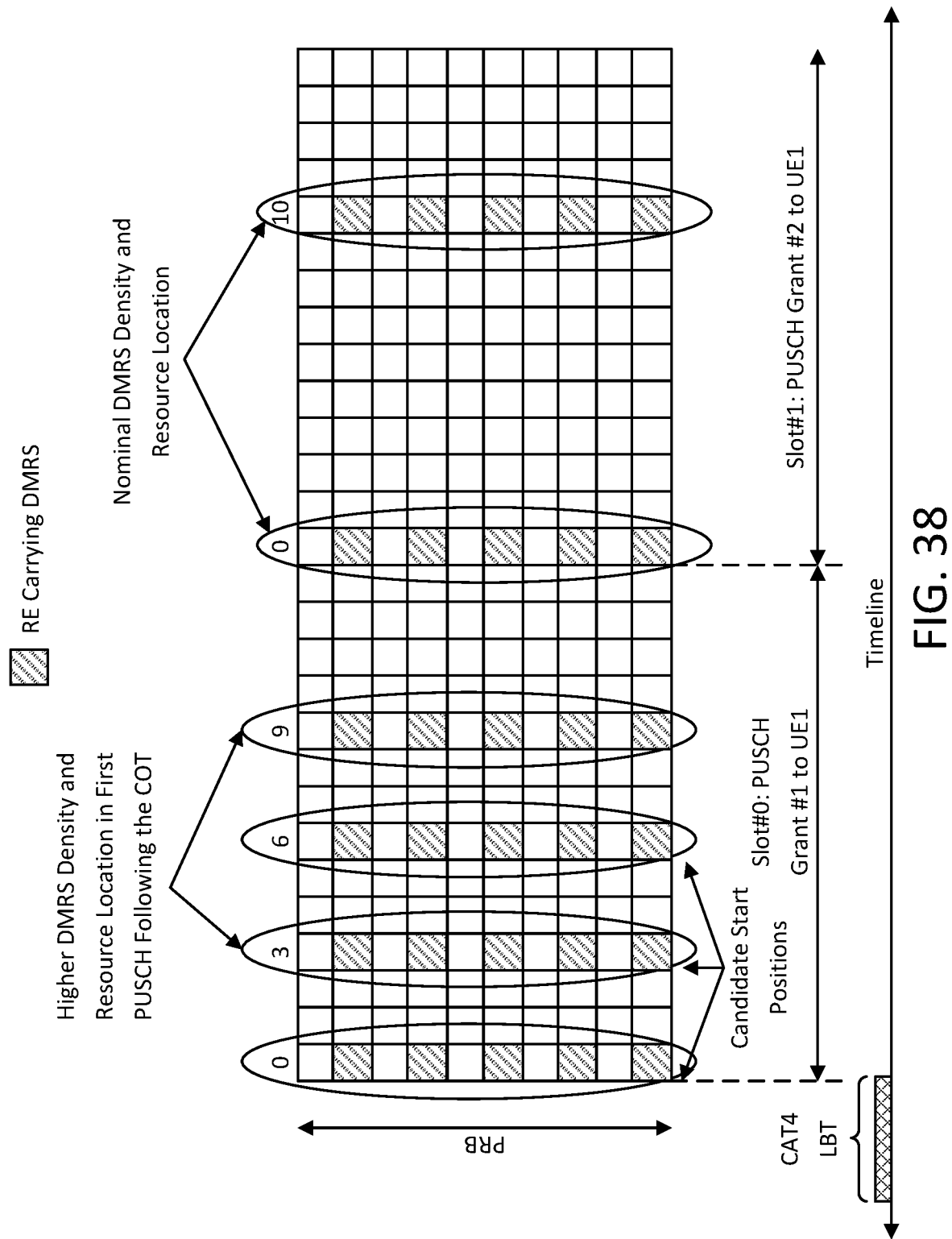
FIG. 38 shows higher DMRS resource density and different timing resources for DMRS in the first PUSCH transmission of a UE's COT.

If transform precoding for PUSCH is not enabled, the sequence r(n) shall be generated according to $$r(n) = \frac{1}{\sqrt{2}}(1 - 2 \cdot c(2n)) + j\frac{1}{\sqrt{2}}(1 - 2 \cdot c(2n+1)).$$

where the pseudo-random sequence c(i) is a pseudo-random Gold sequence of length 31 whose generator shall be initialized with $$c_{init}=(2^{17}(N_{symb}^{slot}n_{s,f}^{\mu}+l+1)(2N_{ID}^{nSCID}+1)+2N_{ID}^{nSCID}+n_{SCID}+n_{CAI}) \bmod 2^{31}$$

where l is the OFDM symbol number within the slot, $n_{s,f}^{\mu}$ is the slot number within a frame, and $n_{SCID} \in \{0,1\}$ and $N_{ID}^{nSCID} \in \{0, 1, \ldots 65535\}$ is given by the higher-layer parameter UL-DMRS-Scrambling-ID if provided and the PUSCH is not a msg3 PUSCH $n_{SCID}=0$ and $N_{ID}^{nSCID}=N_{ID}^{cell}$ otherwise otherwise where $n_{CAI}$ is defined as the parameter that identifies the starting location of the PUSCH DMRS Resource Density in the First PUSCH Transmission The UE is RRC configured for a certain number of DMRS sequences for a PUSCH transmission. According to another aspect, when the UE performs a PUSCH transmission following a successful LBT, the UE may use a different number of DMRS sequences, i.e., the UE may use a different number of DMRS transmissions in the first PUSCH transmission of its COT. This enables the gNB to improve channel estimation and consequently the BLER on the PUSCH when it is punctured or rate matched to fewer resources. The DMRS configuration for the PUSCH following a successful LBT may be configured through RRC signaling to the UE. As seen in FIG. 38, the density of DMRS is higher and time resources of DMRS is different in the first PUSCH transmission following the LBT compared to the next PUSCH transmission in the UE's COT. Here the UE has 2 UL grants of PUSCH Type B and is RRC configured to transmit DMRS in OS #{0,3,6,9} for the first PUSCH transmission and OS #{0,10} in the subsequent PUSCH transmissions.

UL Preamble to Indicate Variable Starting Position

Figure 39:
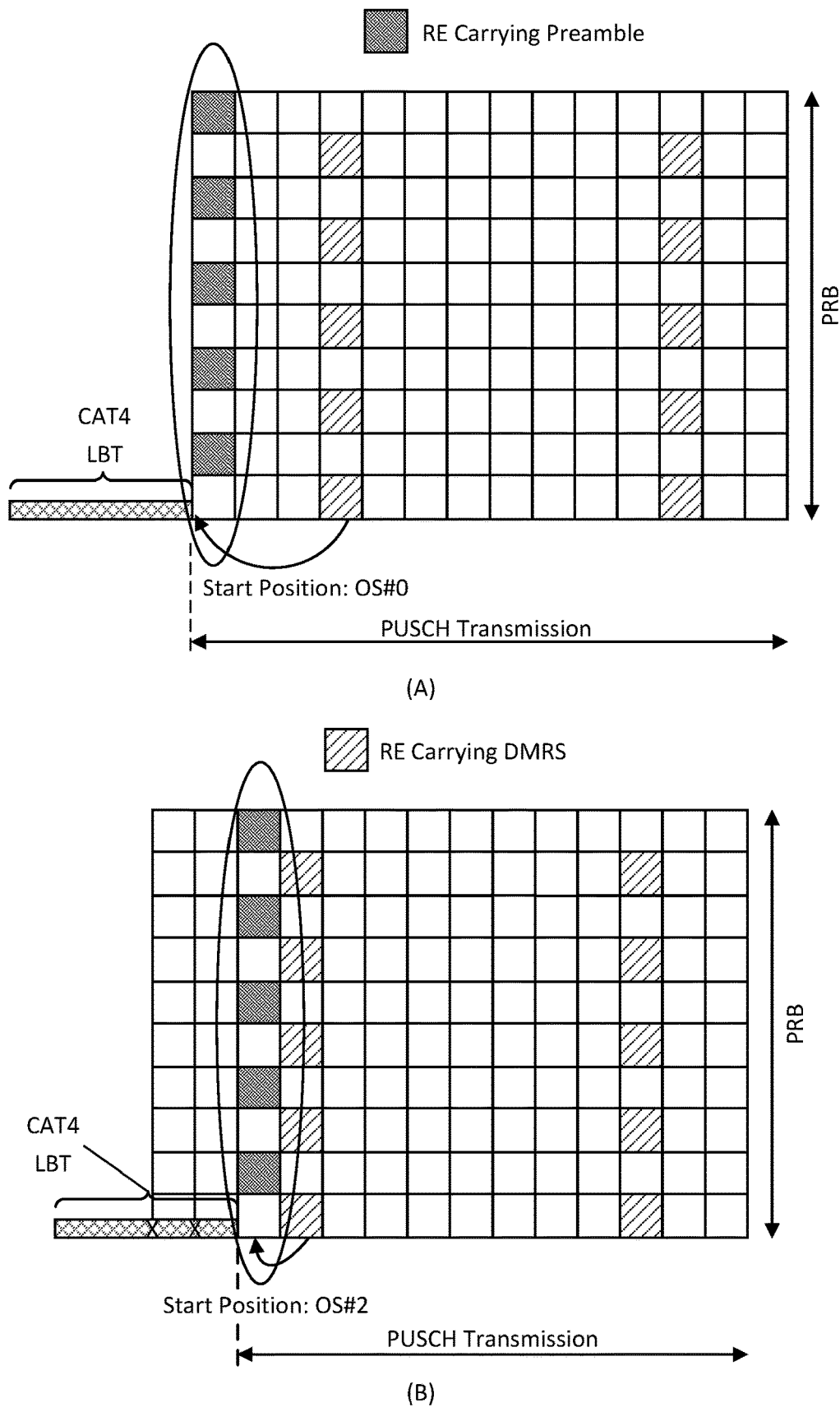
FIG. 39 shows a UL Preamble indicating start of PUSCH transmission.

The UE may transmit an UL preamble to indicate the starting position of the first PUSCH following the LBT. The PUSCH resources are relative to the location of this preamble. For example, the PUSCH may begin in the same OS as the preamble as shown in FIG. 39. In this example, the preamble is transmitted on every other RE. But in general, the preamble may have any set of time/frequency resources configured to the UE. The gNB monitors and detects the preamble; on detecting it, the gNB finds the PUSCH in the same OS.

The gNB configures the spatial direction of transmission of the preamble. For example, the preamble may have the same correspondence as the DMRS sequence of that PUSCH transmission. Alternatively, the preamble may be transmitted in the spatial direction that has correspondence with a different RS such as the SSB/PBCH or a CSI-RS. If the preamble resource collides with a DMRS resource of the PUSCH, the DMRS is dropped and preamble is transmitted.

Figure 40:
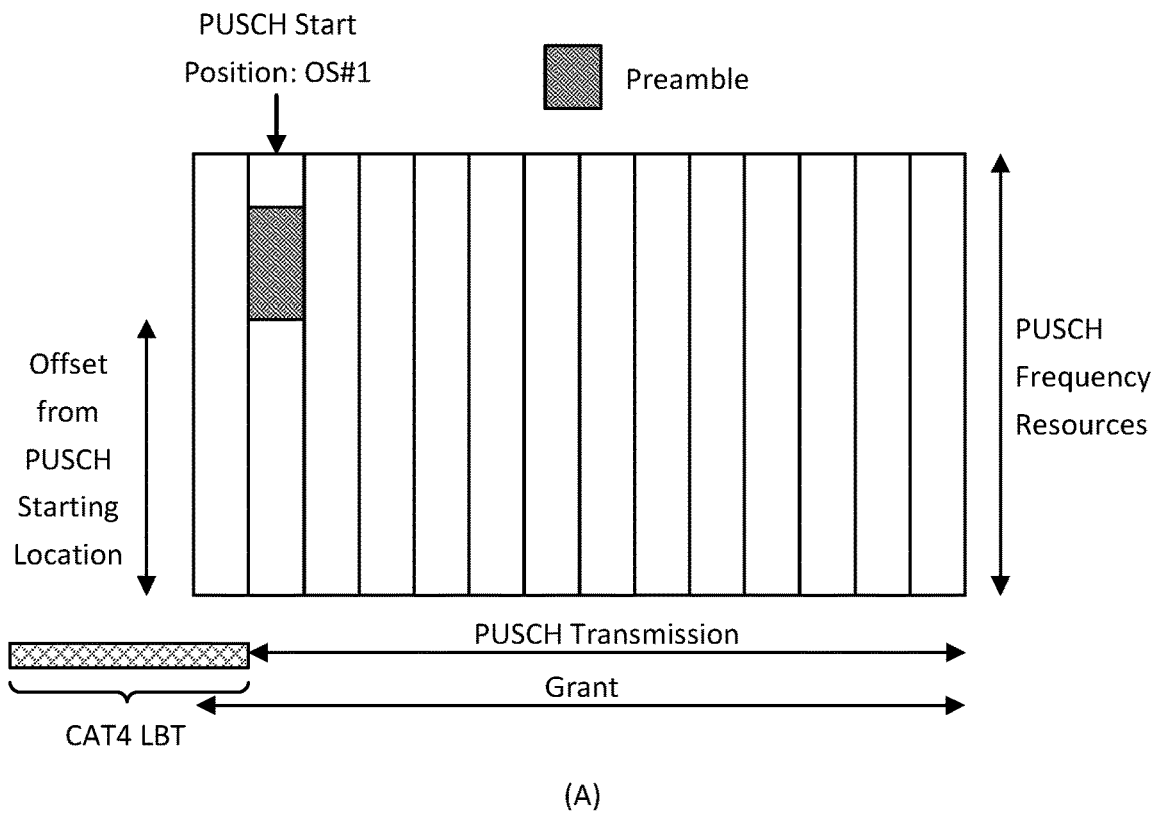
FIG. 40 shows preamble resources in PUSCH (A) Relative to PUSCH resources (B) Relative to carrier band.
Figure 40:
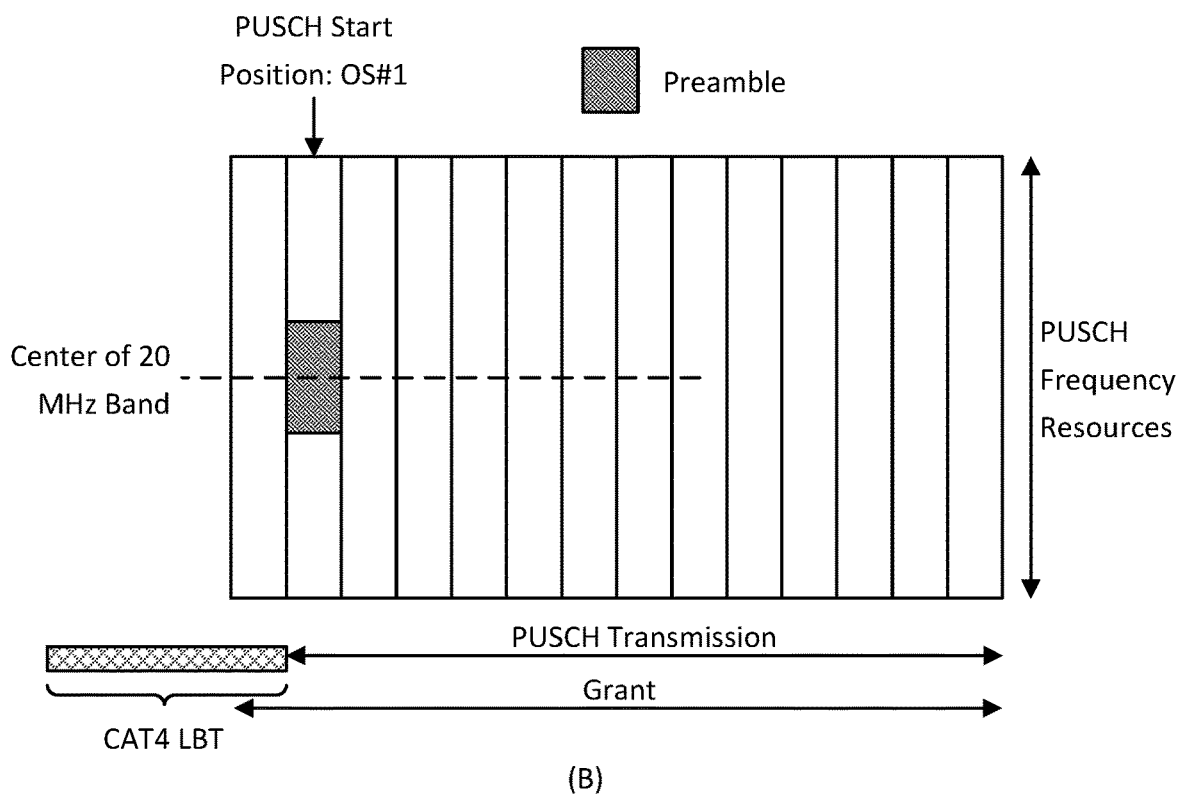

Furthermore, the preamble may be narrowband relative to the bandwidth of the PUSCH as shown in FIG. 40 so that the gNB can easily detect it. Its frequency resources may be configured relative to the PUSCH resources in the grant such as an offset from the lowest RB of the PUSCH shown in FIG. 40A or fixed relative to the center of the carrier as shown in FIG. 40B.

The preamble sequence is configured to the UE through RRC signaling. The sequence may be UE-specifically configured or configured commonly across UEs.

When the UE is specifically configured, the preamble may have the same sequence as the DMRS of the PUSCH. The preamble may apply only across the frequency resources of the PUSCH.

The preamble may be transmitted in correspondence to a DL RS such as SSB, or CSI-RS or DMRS. For example, the preamble may have the same correspondence as the DMRS of the PUSCH following the preamble. Alternatively, the correspondence may be configured through RRC signaling to the UE.

In addition to indicating the start of a PUSCH transmission, the preamble may be used to indicate the duration of the UE's COT. A set of preambles may be configured to a UE. Each preamble may denote a certain duration of COT. The UE may select the preamble to transmit depending on its intended channel occupancy duration. For example, in autonomous UL transmission using configured grants, the gNB may not know how may PUSCH transmissions are expected from a UE without higher layer information such as BSR. In order to reduce the latency, PHY signaling through the preamble can indicate the duration of configured grant resource usage. This can help the gNB to plan its resources following the UE's COT or enable efficient COT sharing between the UE and the gNB.

If the preamble sequence is common to multiple UEs, the preamble can provide improved power efficiency and coexistence as other nodes can recognize that the channel is occupied. If the preamble is common in the DL and UL, it facilitates coexistence. The location of the preamble resources may be common in the DL and UL. The PUSCH may be rate matched around the preamble or the preamble may puncture the PUSCH.

Figure 49:
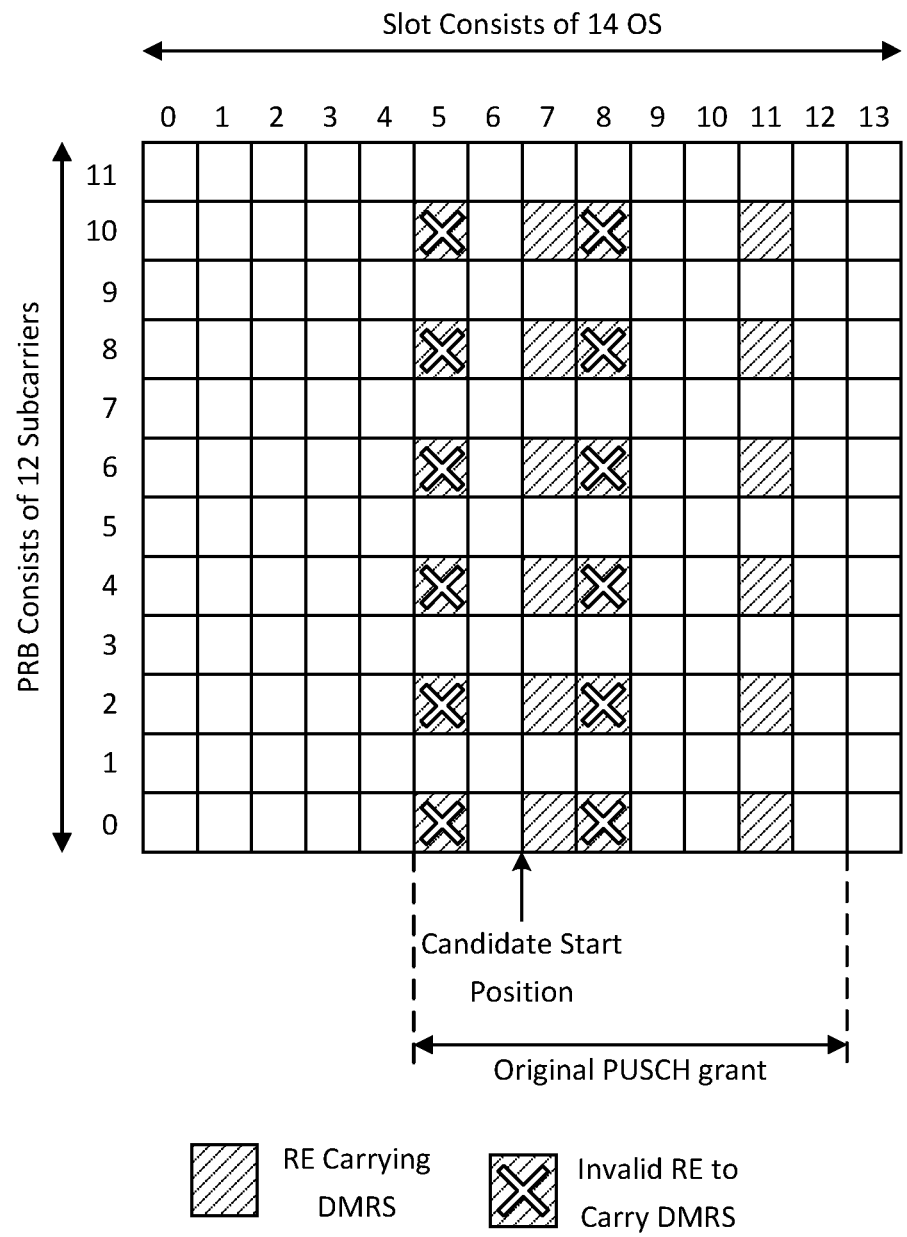
FIG. 49 shows DMRS mapped according to PUSCH mapping type B based on the duration of PUSCH with the UE selected start position instead of PUSCH mapping type B with the original grant.

For PUSCH mapping type B either for SU-MIMO or MU-MIMO, the position(s) of the DMRS symbol is defined relative to the PUSCH resources. Therefore, if the UE selects a different PUSCH start position than what is originally scheduled, the UE may transmit the UL DMRS symbol(s) according to PUSCH type B. In this case, the first DMRS symbol may occupy the first symbol of PUSCH with the UE selected start position. The location and number of additional DMRS symbols may be based on the duration of PUSCH with the UE selected position according to PUSCH type B DMRS mapping rules. For example, FIG. 49 shows an example for PUSCH that is scheduled for transmission over 8 OFDM symbols from OS 5 to OS 12 with two additional UL DMRS symbol, but UE fails in accessing the channel due to LBT failure. If the channel becomes available starting from the illustrated candidate position in the figure, i.e., OS 7, then duration of PUSCH with the UE selected start position is 6 OFDM symbols. In this case, the UE may map the UL DMRS according to the new PUSCH duration of 6 OSs following mapping type B in $l_0$ and 4 relative to the start of PUSCH as shown in the FIG. 49.

Transmitting PUSCH in the Available Symbols

Described above are several procedures to enable the gNB and UE to have the same understanding on which start positions the UE may attempt to access the channel, if the UE fails in accessing the channel at the beginning of UL grant. Also described are several methods on how DMRS will be affected by shifting the start position and how it may be used to indicate which PUSCH candidate position the UE select. Described hereinafter are procedures for puncturing, adapting MCS and how piggybacked UCI may be transmitted.

Puncturing

Figure 41:
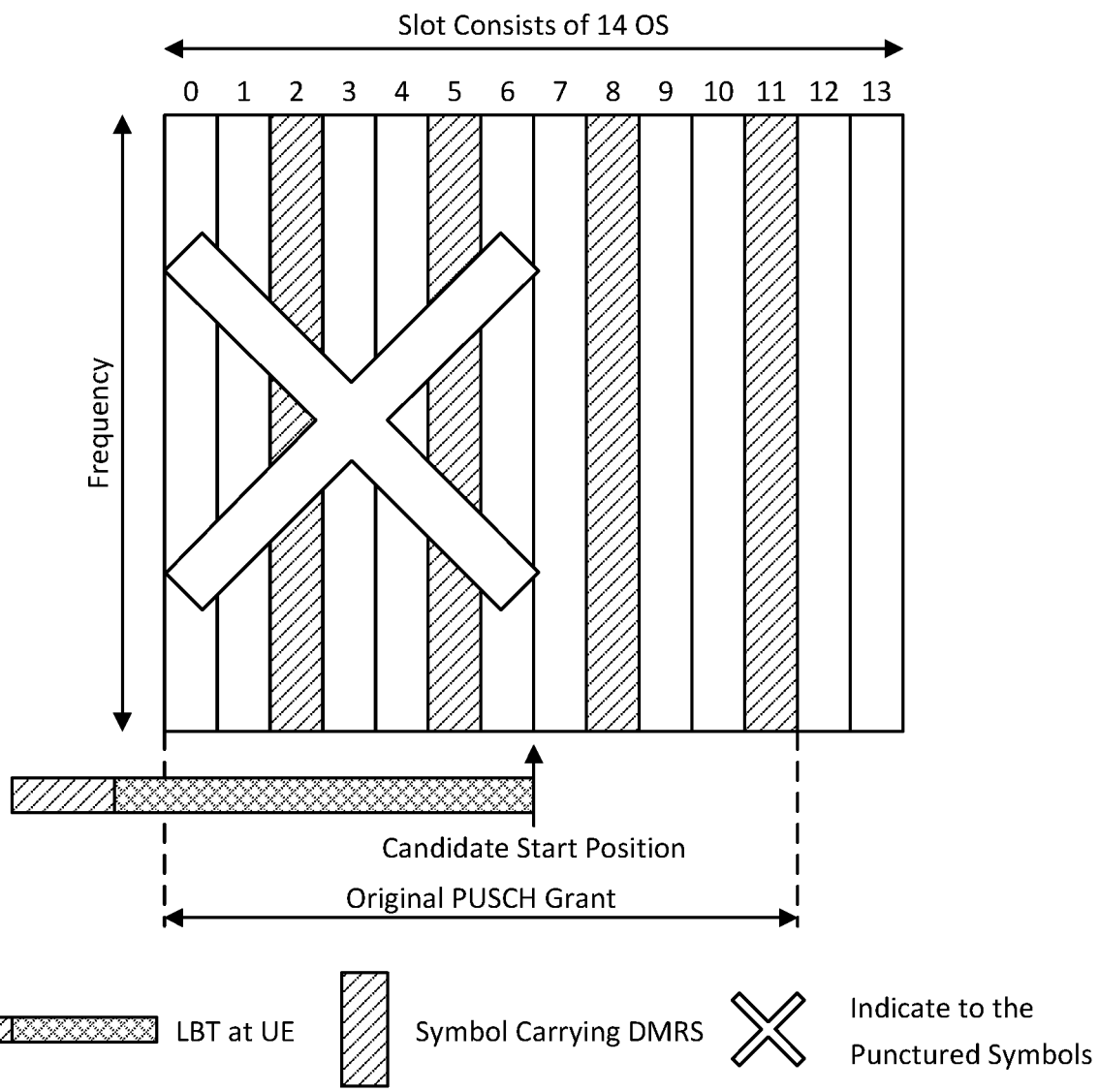
FIG. 41 shows puncturing OFDM symbols during channel unavailable and transmitting the remaining OFDM symbols upon channel availability.

As a simple procedure, after the UE generates PUSCH based on the grant provided by the gNB, the UE may puncture some of those symbols and transmit the others without adjusting the UL DMRS position. According to one aspect, a UE may puncture all the symbols from the beginning of PUSCH grant to the symbol from which the UE accesses the channel. FIG. 41 shows an example of PUSCH grant of duration equal to 12 symbols, from OS 0 to OS 11, with three additional DMRS are configured occupying $l_0$, 5, 8, 11. If the UE accesses the channel starting from OS7, then the UE may puncture OS0 to OS6.

In some situations, the remaining DMRS may not be enough to let the gNB obtain an accurate channel estimation, especially if all the DMRS symbols are punctured since the last two OFDM symbols in PUSCH may not carry DMRS at all. Therefore, according to another aspect, a minimum number of needed DMRS symbols may be transmitted to obtain a reliable decoding at gNB. If the remaining DMRS symbols are less than this minimum threshold, then the UE may abandon the UL transmission to reduce power consumption as it is less likely that gNB can decode the transmitted PUSCH.

This threshold may be configured by high-layer parameter such as RRC parameter called min_DMRS_num which may provide an absolute number of the minimum number of needed DMRS symbols or a fraction of already scheduled DMRS symbols. Moreover, the minimum number of needed DMRS symbols may depend on the scheduled PUSCH grant parameters such MCS and PUSCH duration. Table 6 shows an example of minimum number of needed DMRS symbols as a function of the scheduled MCS where $I_{MCS}$ is the MCS given the DCI providing the PUSCH grant. Moreover, $MCS_{th\_i}$ for $i \in \{1, \ldots, N\}$ may be provided by a high-layer parameter such as RRC parameter min_DMRS_num. If the high layer-parameter indicate that the MCS thresholds in any row are equal, i.e., $MCS_{th\_(i-1)} = MCS_{th\_i}$, then the minimum number of needed DMRS symbols of the associated row where both these MCS thresholds appear is disabled.

TABLE 6

Minimum number of needed DMRS symbols as function of MCS

| Scheduled MCS | minimum number of needed DMRS symbols |
|---|---|
| $I_{MCS} < MCS_{th\_1}$ | 0 |
| $MCS_{th\_1} \leq I_{MCS} < MCS_{th\_2}$ | 1 |
| . | . |
| . | . |
| . | . |
| $MCS_{th\_(N-1)} \leq I_{MCS} < MCS_{th\_N}$ | The number of scheduled DMRS of the original PUSCH |

Similarly, the minimum number of needed DMRS symbols may be a function of the PUSCH duration as in Table 7, for example, where L is the actual the number of OFDM symbols that can be transmitted and $D_{th\_i}$ for $i \in \{1, \ldots, N\}$ may be provided by a high-layer parameter such as RRC parameter min_DMRS_num. If the high layer-parameter indicate that the PUSCH duration thresholds in any row are equal, i.e., $D_{th\_(i-1)} = D_{th\_i}$, then the minimum number of needed DMRS symbols of the associated row where both these MCS thresholds appear is disabled.

TABLE 7

Minimum number of needed DMRS symbols as function of the actual number OFDM symbols that can be transmitted by the UE

| The number of available symbols that can be transmitted | minimum number of needed DMRS symbols |
|---|---|
| $L < D_{th\_1}$ | 0 |
| $D_{th\_1} \leq L < D_{th\_2}$ | 1 |
| . | . |
| . | . |
| . | . |
| $D_{th\_(N-1)} \leq L < D_{th\_N}$ | The number of scheduled DMRS of the original PUSCH |

Also, puncturing may be used in case of MU-MIMO scheduling to avoid losing orthogonality between the co-scheduled UE. The UE may only use any of scheduled DMRS symbols and may not attempt to adjust UL DMRS based on the duration of PUSCH with the new selected start position.

Adapting MCS

Assuming that the granted TBS size is fixed and does not depend on the LBT outcome, the MCS associated with scheduled PUSCH may not be a valid MCS to transmit the whole TBS in one transmission. Meanwhile, it would be a huge burden for gNB to detect the used the MCS, if the UE autonomously alters the MCS associated with scheduled PUSCH based on the LBT outcome without having a common understanding of the new MCS between the UE and gNB.

If the multiple PUSCH start positions are signal through multiple DCIs, as described earlier, then proper MCS associated with the new PUSCH start positions may be signaled in these DCIs.

If the multiple PUSCH start positions are configured through high layer parameter, then the new MCS may be determined as function of several parameters provided PUSCH grant. For example, the new MCS may depend on the PUSCH grant such as PUSCH duration, MCS, etc., and the duration of PUSCH with the UE selected start position based on the LBT outcome as in Table 8:

TABLE 8

The new MCS as function of the old MCS and outcome of the LBT

| Provided MCS in PUSCH grant | PUSCH new duration based LBT outcome | New MCS |
|---|---|---|
| $I_{MCS} < MCS_{th\_1}$ | 1 . . L − 1 | $I_{new,1}$ . . . |
| $MCS_{th\_1} \leq I_{MCS} < MCS_{th\_2}$ | 1 . . L − 1 | . . . . |
| . . . | . . . | . . . |
| $MCS_{th\_(N-1)} \leq I_{MCS} < MCS_{th\_N}$ | 1 . . L − 1 | . . . . $I_{new,N(L-1)}$ |

Where L is duration of PUSCH as provided in the UL grant in terms of symbols and $I_{MCS}$ is the given MCS in PUSCH grant. While $I_{new,N(L-1)}$ may a function of $I_{MCS}$, e.g., $I_{new,\,x}=\max\,\{2\,I_{MCS},\,MCS\_max\}$ meaning that the new MCS is twice the MCS given in PUSCH grant with a certain maximum MCS labeled as MCS_max.

Alternatively, the UE may autonomously alter MCS and indicate the selected MCS by transmitting a piggybacked UCI to the PUSCH. Also, the piggybacked UCI may be transmitted in a specified location in the new PUSCH duration. For example, the piggybacked UCI may be transmitted after first DMRS symbol such that gNB decodes the UCI first to know the MCS selected by the UE and then decodes data part in PUSCH.

Instead of transmitting UCI to carry the selected MCS, the UL DMRS may indicate to the selected MCS. For example, the UE may be provided with several initialization sequences and they have one-to-one mapping relationship with candidate MCS. Hence, gNB may figure out the selected MCS by knowing DMRS initialization sequence. This may be accomplished by signaling multiple values $N_{ID,MCS}^{nSCID}$ that is used to generate the DMRS initialization sequence by the equation below.

$$c_{init,MCS}=(2^{17}(N_{symb}^{slot}n_{s,f}^{\mu}+l+1)(2N_{ID,MCS}^{nSCID}+1)+2N_{ID}^{nSCID}+n_{SCID})\bmod 2^{31}$$

The additional values of $N_{ID,MCS}^{nSCID}$ may be given by a high-layer parameter such as RRC parameter scrambling to MCS mapping, for example, and the other parameters in the above equation are defined earlier. The gNB needs to blindly detect the DM-RS and corresponding initializations to detect the MCS.

Piggybacked UCI Transmission

If either PUSCH symbols are punctured or shifted based on the LBT outcome, the piggybacked UCI may be affected especially if UCI is mapped to the first few OFDM symbols at the beginning of the PUSCH grant. According to another aspect, UCI may have a higher priority than PUSCH and UCI may be transmitted in the first available symbol if it does not carry DMRS or immediately after the first single-symbol/double-symbol DMRS transmission.

As only a few OFDM symbols may be available for UL transmission based on LBT outcome, there may not be enough resources to carry UCI especially if its size is big. Therefore, according to another aspect, particular priority rules may be defined to define which content of UCI may be dropped. For example:
  Part 2 CSI reports may have lower priority than Part 1 CSI reports.
  Part 2 CSI reports may have lower priority than Ack/Nack feedback.
  Part 1 CSI reports may have lower priority than Ack/Nack feedback.

As the content of UCI may vary depending on the LBT outcome, it may be a burden for gNB to blindly decode different UCIs with different contents. Therefore, according to another aspect, the UL DMRS may indicate to the content of the piggybacked UCI. For example, if the UCI contents are divided into three categories, i.e., Part 2 CSI reports<Part 1CSI reports<Ack/Nack feedback, then, the possible DMRS initialization sequences may be divided into three groups where each group of initialization sequences correspond to a particular UCI category.

Signaling CAI

CAI may be signaled either entirely as a PHY signal especially if latency is important and if other general-nodes should be able to read it. It may also be sent through higher layer signaling in scenarios where latency is not an issue.

PHY Signaling of CAI

Signaling Through PDCCH in Common Search Space

In the DL, the NR DCI may carry the payload and the PDCCH may be used to signal the CAI in the physical layer.

The intent is to enable sibling-nodes and general-nodes (at least from other NR-U cells) to detect the CAI transmitted by a node in a cell. The PDCCH may be scrambled with DL-CAI-RNTI which may be provided by the spec so that it is common across NR-U cells; so a general-node knows the CAI-RNTI and does not need to obtain RMSI of a cell to get its CAI-RNTI.

Figure 14:
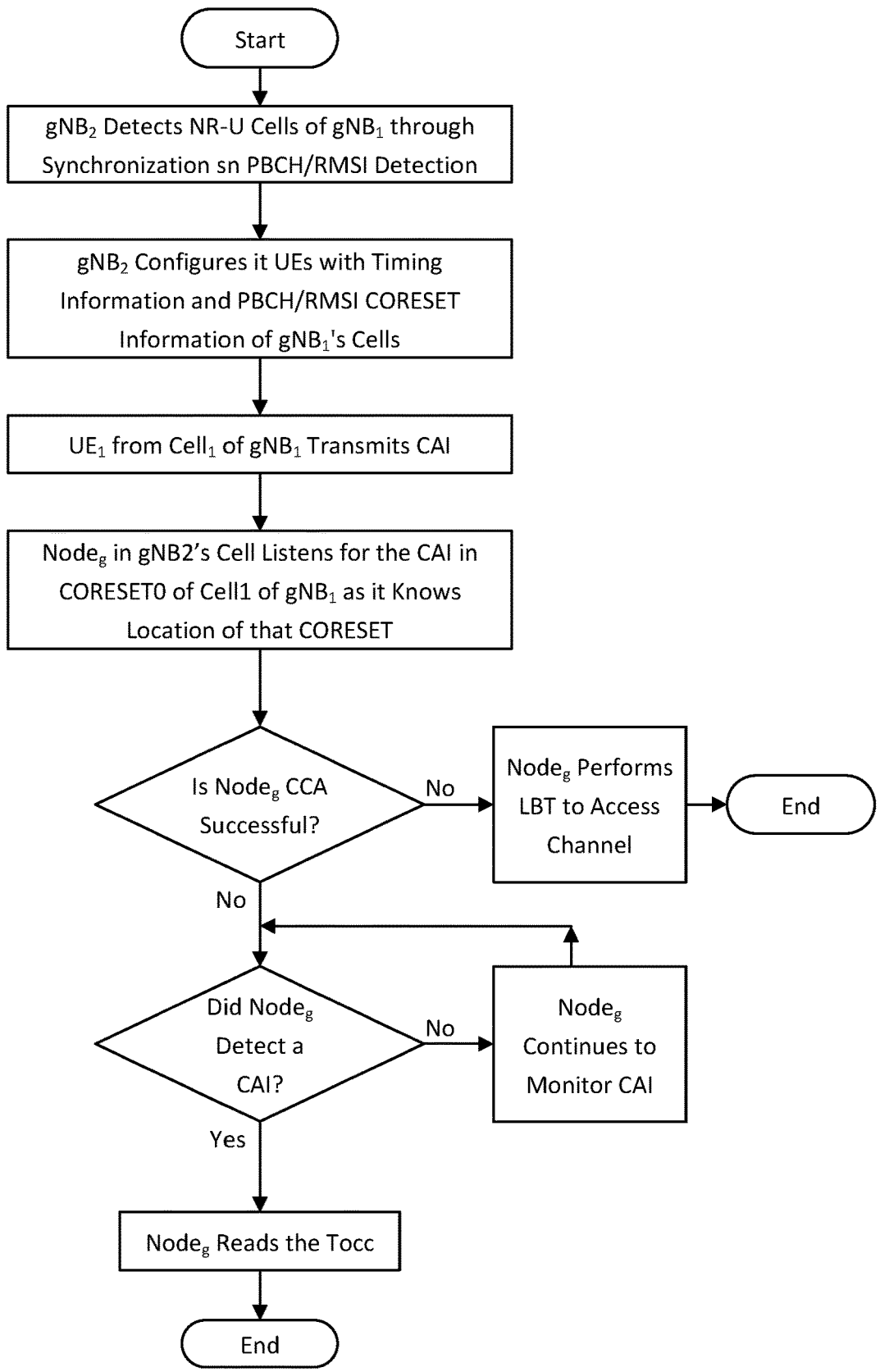
FIG. 14 illustrates a method to obtain CAI transmitted through DCI.

If NR-U cell is in DC or SA deployment, a cell may signal PBCH and RMSI. DL CAI may be transmitted in the CORESET with index 0 and in a common search space. Other gNBs in the NR-U band may periodically detect the presence of each other and signal to their UEs to monitor those cell IDs for CAI. The gNBs may also provide the synchronization information to its UEs so that general-nodes are not required to perform synchronization with other cells. Thus sibling-nodes and general-nodes may know of the presence and location of the PBCH of co-existing NR-U cells. The cell occupying the channel may transmit the CAI in the CORESET index 0. The sibling-nodes and general-nodes may know the CORESET to detect the CAI. The method to detect CAI is described in FIG. 14. Here $gNB_2$ and its UEs are general-nodes, $gNB_1$ transmits the CAI on $Cell_1$.

In an NR-U cell in carrier aggregation with licensed PCell, the PCell may configure the CORESET for sibling-nodes to monitor the DL-CAI-RNTI DCI on the NR-U cell.

Alternatively, the SSB/RMSI signals may be present in the SCell to allow general-nodes to monitor the CAI.

A Type0B-PDCCH common search may be introduced for a DCI format with CRC scrambled by a DL-CAI-RNTI for the CAI. The association between monitoring occasions for Type0B-PDCCH common search space and the SS/PBCH block index may be the same as the association of monitoring occasions for Type0-PDCCH common search space. The UE may assume that the DM-RS antenna port associated with PDCCH reception in the Type0B-PDCCH common search space and the DM-RS antenna port associated with SS/PBCH reception are quasi co-located with respect to delay spread, Doppler spread, Doppler shift, average delay, and spatial Rx parameters. The value for the DM-RS scrambling sequence initialization may be set as follows.

It may be set to a fixed spec-defined constant

It may be set to the cell ID.

The length of the DL-CAI-RNTI based DCI may be defined in the spec or configured in the RMSI. If the number of DCI lengths monitored within CORESET index 0 exceeds the maximum limit in NR in a monitoring occasion, NR-U UEs may drop monitoring this DCI.

A higher layer parameter diCAIPeriod may be defined to indicate the periodicity with which the CAI is signaled (the CAI may be signaled multiple times by a gNB within an MCOT as seen in FIG. 10 and FIG. 11 so that the listening nodes do not miss the signal).

Not all cells may support transmission of CAI. One bit in the PBCH may indicate whether the cell supports CAI transmission.

Alternatively, the CAI may be multicast to a group of UEs. For example, a group common PDCCH (such as PDCCH for DCI format 2_0) may be used to carry the CAI. This PDCCH can be decoded by UEs in the RRC connected state as they will have configuration for GC-CAI-RNTI for the CAI. The DCI may be scrambled with the group common RNTI 'GC-CAI-RNTI'.

It is advantageous for a node such as the gNB to indicate the start of a channel access to a UE. This enables the UE to identify the presence of valid CSI-RS, DRS, SSB/PBCH, PRACH occasions, and/or resources for COT sharing with the gNB, configured grant resources.

The DCI with DL-CAI-RNTI may be transmitted by the gNB to the UEs to provide the COT status. The DCI may carry up to C bits indicating the COT of the gNB. C may be configured to the UE through RRC signaling or predefined in the spec. For example, C=4 for MCOT up to 10 ms. The DCI may also carry the bandwidth over which the COT is valid, e.g., a bitmap of B bits corresponding to the B 20 MHz subbands in the spectrum. The bits corresponding to the set of 20 MHz subbands to which gNB has channel access are set to 1. In this case, if UE receives DCIs with both the DL-CAI-RNTI and SFI-RNTI, it may ignore the SFI for the slots for which CAI-RNTI indicates no channel access. Alternatively, a DCI may indicate the COT by specifying the slot format for N slots of the COT. The DL-CAI-RNTI may be the SFI-RNTI that provides the slot format indication to the UE. Alongside the 'D', 'X' and 'U' states that exist in the slot format to identify DL, flexible and UL states respectively, a 'null' format may be introduced to identify invalid channel access. For example, a slot format 'NNNNNNNNNNNNNN' implies that channel access is not available on any of the 14 symbols of the slot. Slot formats with partial channel access may also be defined such as 'XXXXXXXNNNNNNN' where channel access is not available on the last 7 symbols of the slot as it is outside the node's COT. Since the DCI may carry the slot format for a number of slots, when a null format is encountered for a symbol, the UE identifies that the gNB does not have channel access and may ignore the SFI for the symbols following the null. A second DCI with BW-RNTI (Bandwidth-RNTI) may carry information on the 20 MHz subbands over which the COT is valid. The BW-RNTI may be detected in the same CORESET and monitoring occasion as the SFI-RNTI; so the UE uses both the SFI-RNTI and BW-RNTI to determine the bandwidth and time for the gNB's channel access In case of directional LBT, the COT may be different in different spatial directions. In this case, a single DCI may provide the COT information for multiple spatial directions. So, the DCI may carry the TCI state for each COT that it indicates. Alternatively, the DCI may carry the COTs for D spatial directions configured to the UE. D may be provided through RMSI or OSI or configured in a UE-specific manner. Alternatively, a DCI received in a given spatial direction may indicate the COT in that spatial direction—this RS which determines the direction channel access is referred to as channel-access-RS (CA-RS). For example, the spatial direction of the DMRS of the DCI (carrying the COT) may indicate the COT in that spatial direction; here the CA-RS is the DMRS of the DCI carrying the COT information. Therefore, multiple DCIs may be transmitted by the gNB to indicate the COTs in different spatial directions using different CA-RS.

Figure 42:
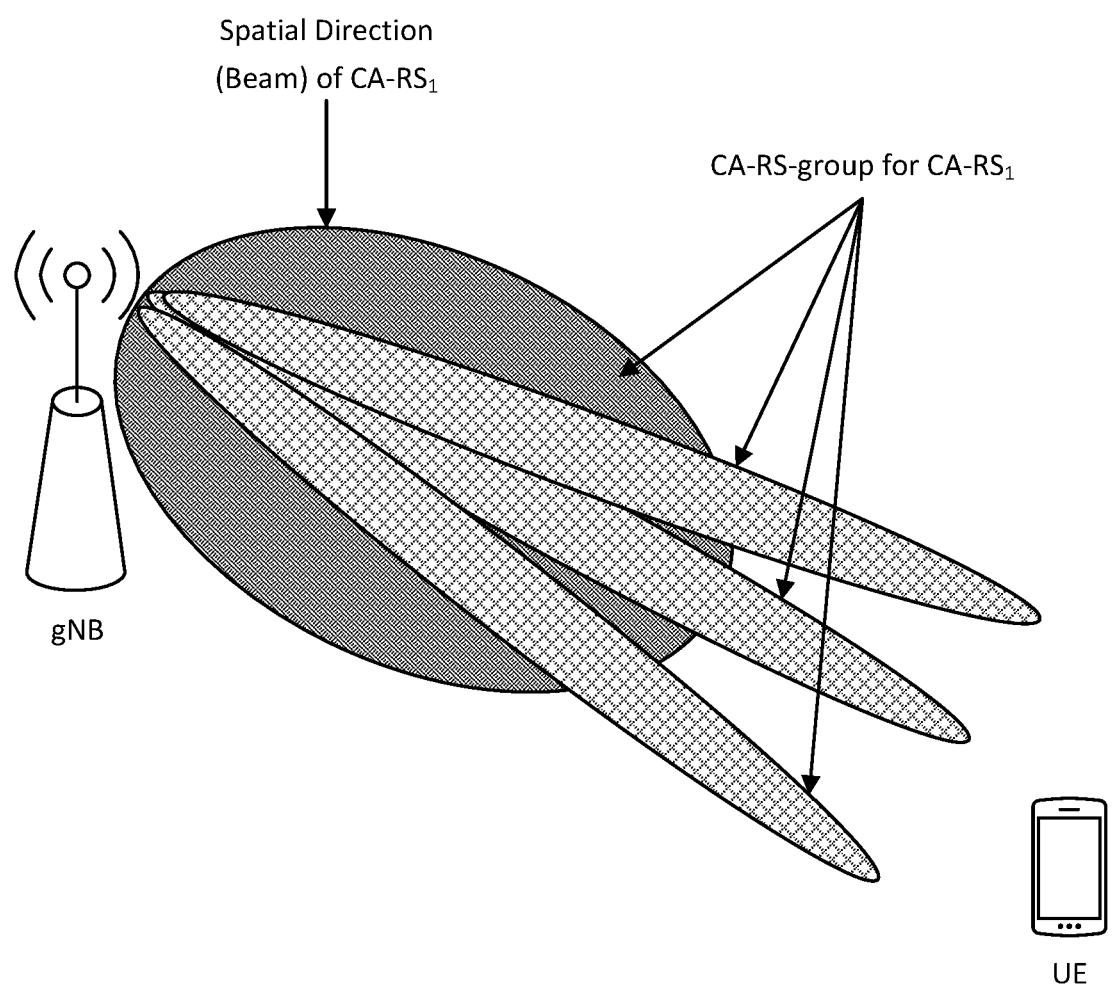
FIG. 42 shows CA-RS-Group for CA-RS1: if LBT is successful in the spatial direction denoted by CA-RS1, the gNB may transmit signals in the direction denoted by any of the RS in the corresponding CA-RS-Group.

A CA-RS-group may be defined to include the set of RSes that can be transmitted by the gNB if the gNB has channel access for a given CA-RS. For example, a CA-RS-group may be defined for the DMRS of the DCI carrying the COT and includes other RS such as CSI-RS that can be transmitted by the gNB in similar spatial direction as the DMRS. If a UE has a grant or RS belonging to the CA-RS-group to which the gNB has channel access, the UE processes the grant or the RS. The gNB may perform spatial LBT in the direction given by the CA-RS. If successful, the gNB may transmit signals that are in the CA-RS-Group of that CA-RS. The CA-RS-Group should contain RSes that have the same/similar spatial direction as the reference CA-RS in that CA-RS-group. As shown in FIG. 42, the gNB transmits the DCI carrying the COT information on CA-RS1. When the UE receives this, the UE identifies that it can receive only signals in the spatial direction given by the RSes in the CA-RS-group of CA-RS$_1$ in that COT.

Figure 43:
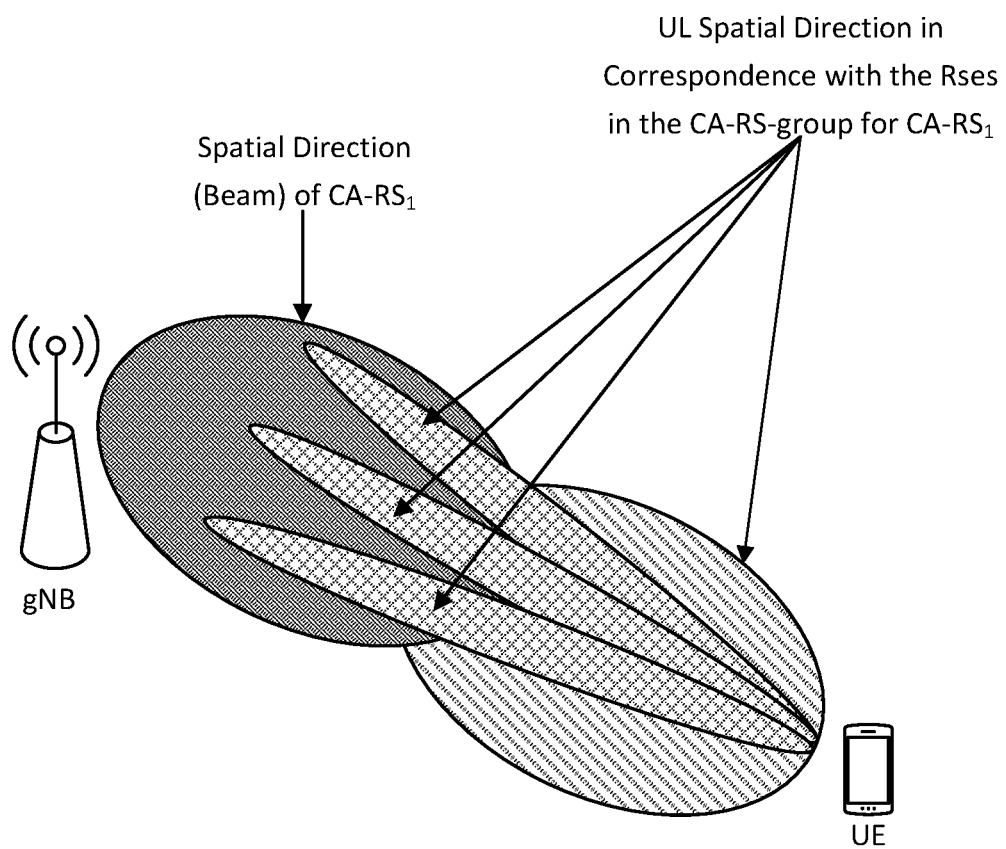
FIG. 43 shows UL transmissions in correspondence with the spatial direction of CA-RS-Group.

Furthermore, for directional LBT, if a gNB shares its COT with UEs, a UE may perform configured grant transmission on the shared COT only if the spatial direction of the configured grant is in correspondence to the DL spatial direction for the COT. The UE may also perform CAT2 LBT to access the channel in the shared COT in a direction in correspondence to the respective DL CA-RS. As shown in FIG. 43, the UE transmits in the gNB's COT using the spatial direction corresponding to the DL CA-RS-Group for CA-RS$_1$.

If the node such as the gNB acquires channel access from the start of a partial slot, it may have channel access only to a partial slot at the end of the COT. In this case, it may not indicate the format for the last partial slot as this requires additional bits for indicating COT at a finer granularity. Unless the UE has an explicit grant in the last partial slot, it may not have awareness of the COT of the gNB in the last partial slot. Therefore, for the last partial slot, even if the COT indication of valid channel access is not received, if the UE has a grant, the UE assumes that the channel access is valid and continues to process that slot. This can be used especially for scheduled grants if the grant is received during that COT. However, for configured grants, if the COT indication of valid channel access is not received for the partial slot, the UE assumes that the channel access is not valid and does not transmit in that slot.

The UE may monitor the CAI only on select resources to keep the power consumption low during the CAI-monitoring duration. For example, the UE may monitor the CAI on a CORESET in a narrow BWP in a search space with periodicity $S_{CAI}$. On reception of the CAI, the UE may switch to a pre-configured wider BWP and monitor the configured CORESETs for control information.

As an alternative, the UE may monitor its CAI and control information after receiving the CAI on a common BWP but different search spaces may be configured for monitoring CAI and other control information.

Alternatively, a search space configured for CAI is automatically disabled on detection of CAI for the remaining duration of the COT detected from that CAI.

Signaling Through PDCCH to Trigger a Handshake

In the DL, the NR DCI may carry the payload for CAI-I for triggering a handshake on the UL. This may happen in the following ways.

Figure 15:
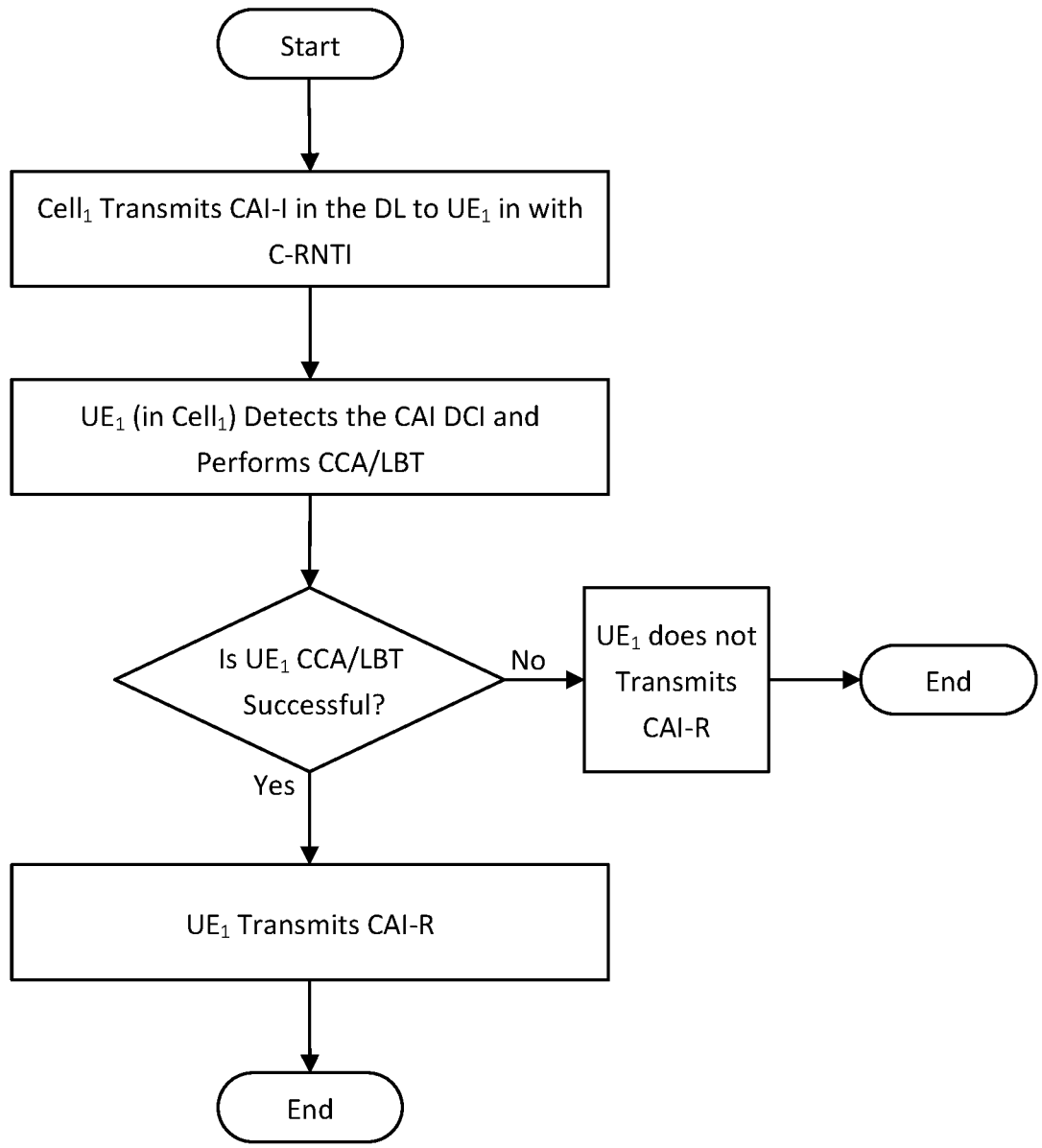
FIG. 15 illustrates a method to transmit the CAI-R.

The PDCCH for CAI-I may be signaled in using the C-RNTI or CS-RNTI. The UE blindly decodes the PDCCH and responds with the CAI-R if its LBT is successful. The CAI-I may also indicate the type of LBT the UE must perform prior to sending the CAI-R. The method is shown in FIG. 15. In this case, other UEs attached to the same cell and nodes outside the cell cannot receive the CAI-I.

The trigger may be sent as a part of a DL or UL grant in a UE specific search space or Type0-PDCCH common search space. New DCI formats 1_1C, 1_0C, 0_1C, 0_0C may be introduced with one or more of the following fields.

1 bit to indicate need for handshake

L bits to indicate the type of LBT to be performed by the UE, priority class

D bits for $T_{OCC}$ to indicate channel occupation time so that UE can signal its CAI-R within the $T_{OCC}$ of its gNB in that cell.

H bits to indicate the threshold to use for sensing prior to CAI-R transmission

The PDCCH for CAI-I may be signaled in a common search space with a CAI-RNTI in a search space like Type0-common PDCCH search space. CAII-RNTI may be configured through RMSI or a constant value given in the spec. Multiple sibling-nodes can receive the DCI and one or more UEs may send their CAI-R depending on how the CAI-I configures the trigger. General-nodes from other NR-U cells may also detect the CAI-I and obtain $T_{OCC}$ from it. The DCI may also have L bits to indicate the type of LBT to be performed by the triggered UEs. CAI-R will contain implicit or explicit identity of the receiver so that the receiver can identify the sender of the CAI-R. The CAI-R may also contain the identity of the node requesting the handshake—this may be useful in D2D or V2X applications where multiple nodes may access resources through frequency/time multiplexing; so multiple CAI-I and CAI-R may be transmitted and their senders and receiver should be identifiable. The trigger may be provided in the following ways.

Figure 16:
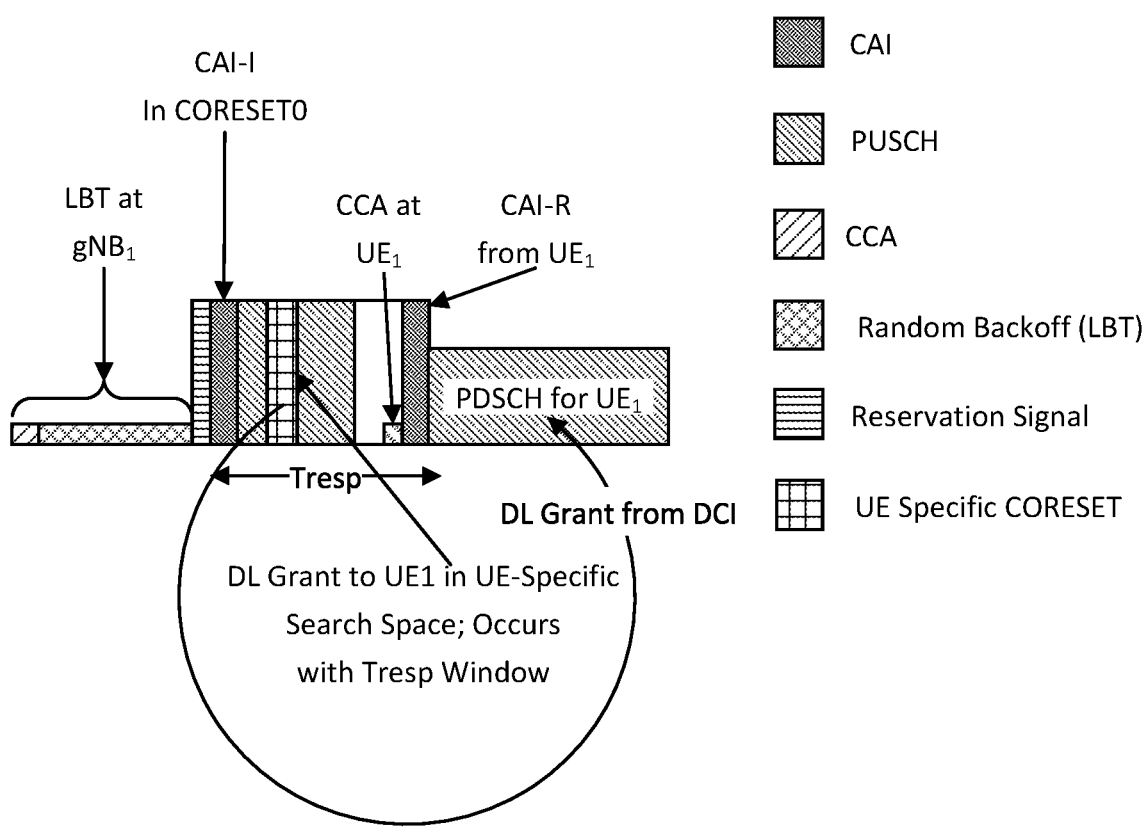
FIG. 16 illustrates CAI-R from UEs scheduled with $T_{Resp}$ duration from the CAI-I.

Reception of the CAII-RNTI implicitly triggers a handshake. UEs that receive DL or UL grants within time $T_{Resp}$ from the reception of the CAI-I are triggered to transmit the CAI-R. As shown in FIG. 16, $UE_1$ receives the CAI-I and a DL grant within $T_{Resp}$ time of the CAI-I. So $UE_1$ responds with CAI-R if its CCA/LBT is successful.

Similar to P-RNTI, the CAII-RNTI may provide a PDSCH grant carrying the IDs (such as C-RNTI) of UEs that must respond with a CAI-R. UEs that find their ID in the message, send the CAI-R. This method can cause some inherent latency as the message has to be processed by the higher layers.

The CAII-RNTI itself may carry the IDs of triggered UEs. Upon receiving its ID in CAI-I, a UE transmits the CAI-R. However, this method makes the payload in the DCI huge.

Signaling CAI-R Through RACH

The CAI-R response may not carry much information except for indicating that the node's channel is clear to receive. So PRACH preambles are a good candidate for CAI-R. The RACH preambles for CAI-R may be RRC configured to the UEs. Contention free RACH resources are preferred to ensure that all CAI-R signals are received at the gNB without collision. Due to the orthogonal nature of the PRACH preambles multiple CAI-Rs can be received simultaneously. Following the preamble reception, the handshake is complete and the gNB proceeds with DL/UL grants to the UE.

Signaling UL CAI-R on PUCCH

The short PUCCH format used for SR may be used for CAI-R. When the gNB detects energy in the CAI-R resource of the UE, it assumes that CAI-R is received and the handshake is completed.

The CAI-R may include additional information such as the detected energy levels during CCA/LBT at the UE. Furthermore, it may carry the energy levels for multiple beams (corresponding to DL RS or QCL with UL SRS). In this case the payload is too large to be indicated through RACH. Short PUCCH or long PUCCH may be used for the CAI-R.

CAI-R from multiple UEs may be multiplexed orthogonally or multiplexed with other PUCCH signals from other UEs.

Preamble-Assisted CAI

A preamble maybe used to indicate the CAI. It may carry some or all of the information required to indicate the $T_{OCC}$ or the cell using the channel. Additionally, it may indicate resources where more information on occupancy may be obtained. Such a design may make it simple for nodes from other cells and technologies to detect the preamble without having to acquire SI of the NR-U node occupying the channel. Nodes monitor the preamble in time and look for high correlation with a known preamble. When the correlation exceeds a threshold, the preamble is detected.

A common preamble may be used across all NR-U nodes to make the detection simple for general-nodes. The preamble may be a ZC sequence or based on m-sequence like the PSS or SSS or an RS sequence such as CQI-RS on DL. It may be a PRACH or SRS like sequence on UL.

Cell Coloring

Figure 17:
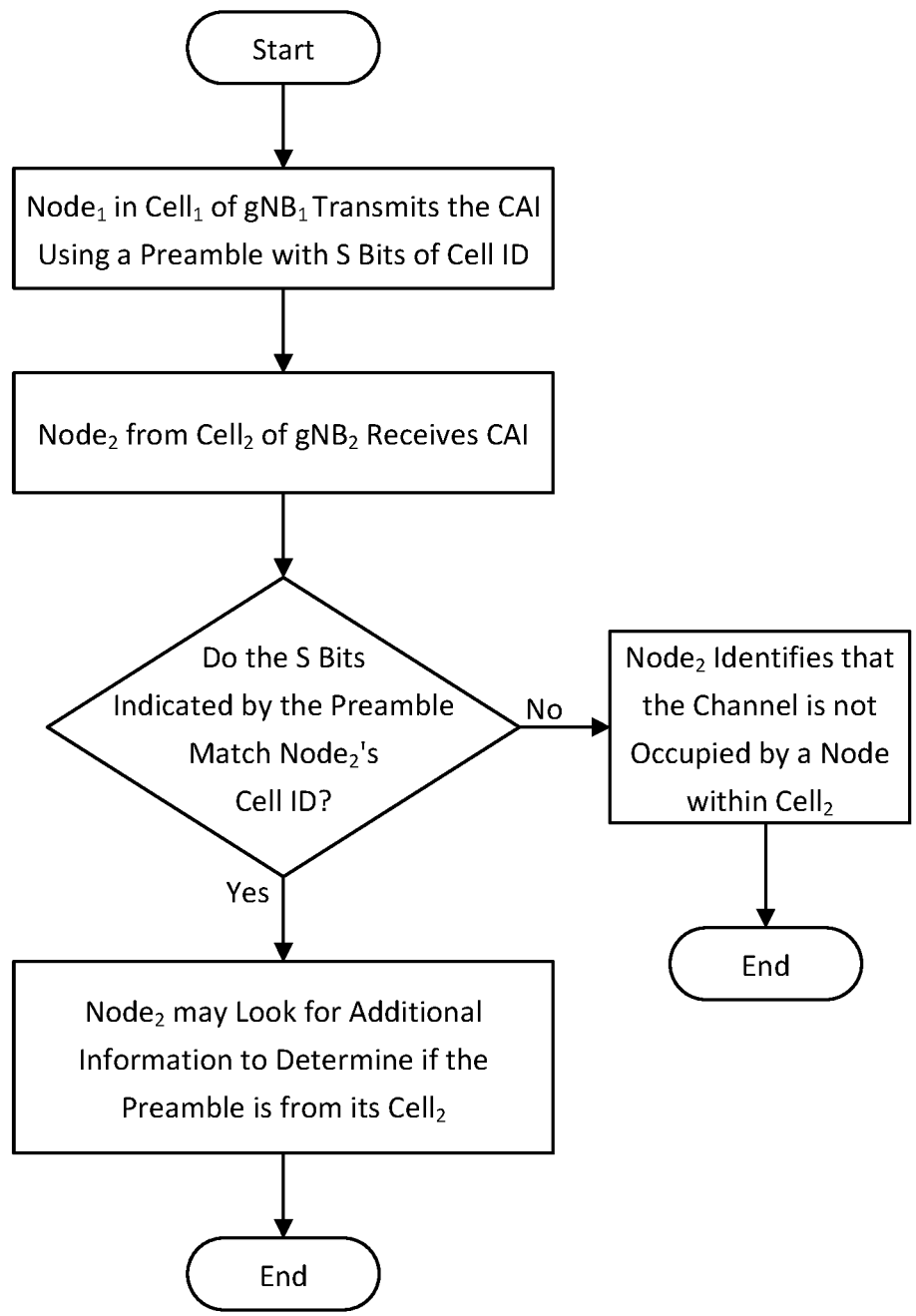
FIG. 17 illustrates a method for receiving the CAI by sibling-node and general-node in the context of Cell Coloring using S bits.

The preamble may carry S bits of information indicating the cell transmitting the CAI. The S bits may be derived from the cell ID of the gNB or UE connected to the cell ID. If S is small (example 2 or 3 bits), the listening nodes need to correlate with known sequences for a small set of possible preambles (4 or 8 for 2 or 3 bits). The S bits provide "cell-coloring" which enables the listening node to identify whether the transmission in within its cell or outside its cell. If the indicated number of bits is less than the number Cell ID, there is some ambiguity in identifying the cell in which the preamble is transmitted; so a general-node cannot know for certain if it is from its own cell but it can quickly identify CAI from many cells. To resolve the ambiguity additional information may accompany the preamble but nodes that identify the transmission as a different cell's transmission need not look for this information. The method of detecting the preamble is shown in FIG. 17. If the full information on cell ID could be obtained, then nodes within the cell may use a higher threshold for LBT failure and allow for spatial reuse.

Indicating $T_{OCC}$ on the Preamble

S bits of the preamble may be used to indicate the $T_{OCC}$. General-nodes will know the status of the channel and when they should begin sensing the channel.

Indicating S Bits on the Preamble

The S bits may be indicated in one of the following ways. In general if the preambles have the capacity to indicate S bits, it can be split between indicating $T_{OCC}$ and cell coloring.

- The S bits may be used as part of the root or cyclic shift for a ZC based preamble
- The S bits may be used as part of the initialization for an m-sequence based preamble.
- The preamble sequence $\underline{p}$ may be repeated S times in time; an OCC vector $\underline{w}$ of length S may be applied on the S repetitions to carry S bits of information. Here the preamble is repeated 4 times and $\underline{w}=[w_0 w_1 w_2 w_3]^T$.

Figure 18:
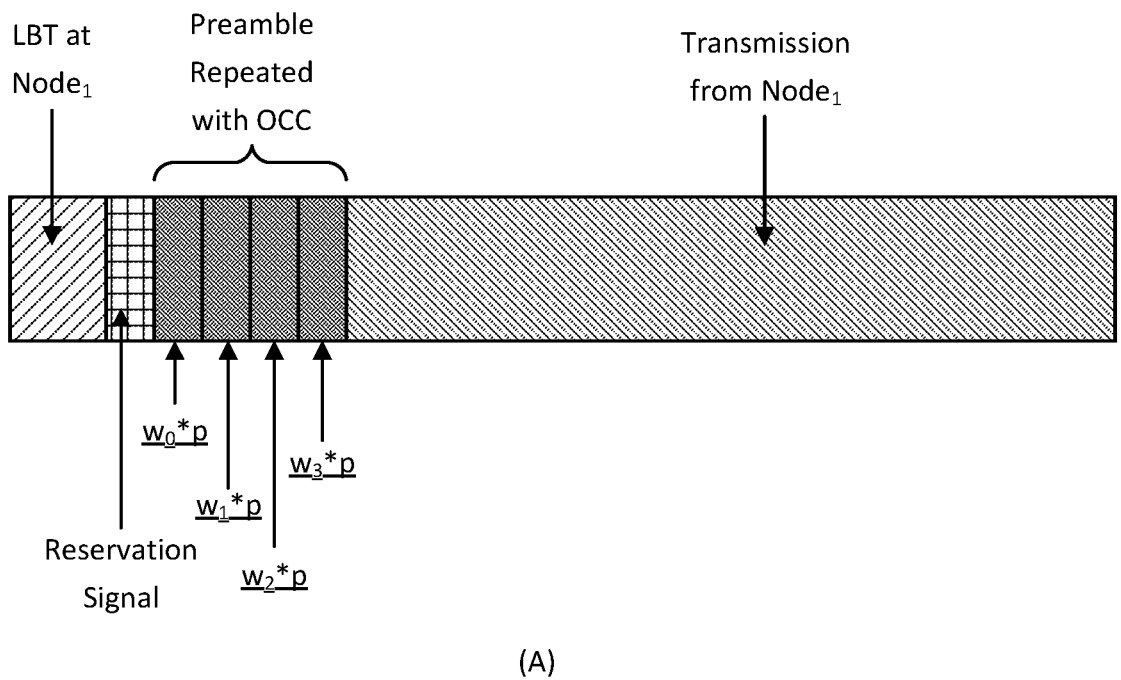
FIG. 18 illustrates transmission of CAI using preamble repetition with OCC codes, including (A) Synchronized to OFDM symbol boundary and (B) Asynchronous to symbol boundary.
Figure 18:
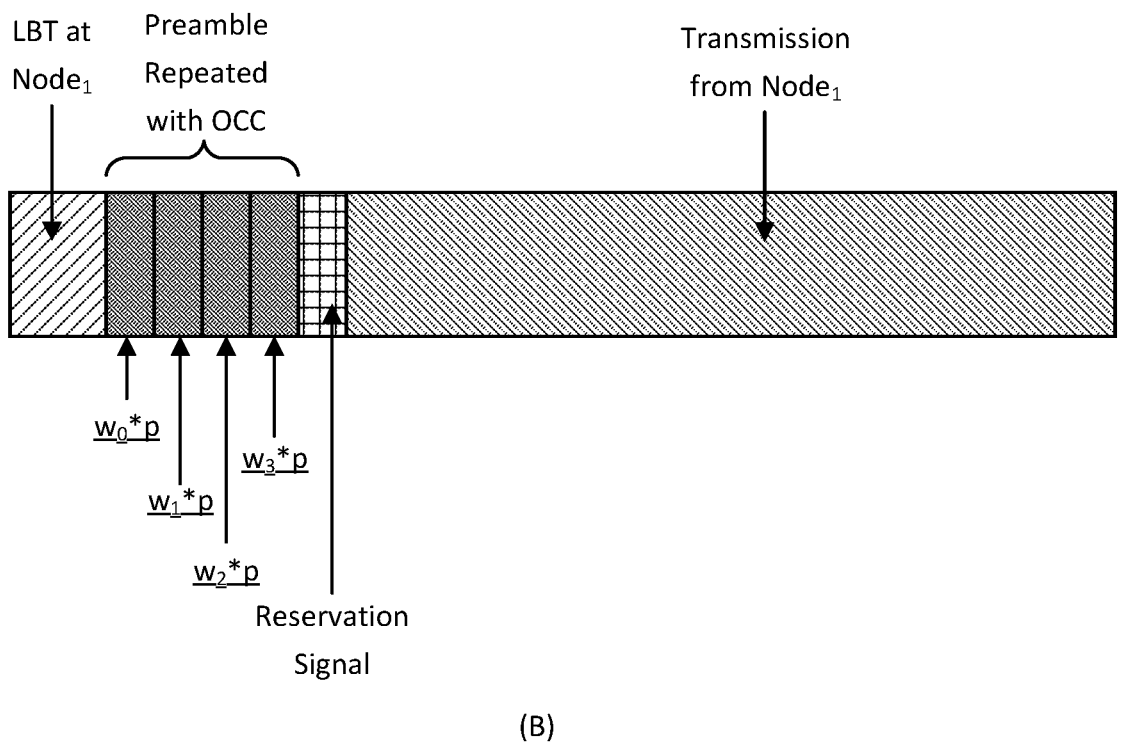

FIG. 18(A) shows an example of how the preamble may be transmitted with repetitions in time. The preamble may be transmitted asynchronously—so $Node_1$ transmits it immediately on completion of successful LBT. After transmitting the preamble, it may transmit some reservation signal to synchronize with the symbol boundary.

FIG. 18(B) shows an example where the preamble transmitted synchronous to the symbol boundary. A successful LBT is followed by reservation signal. Upon starting a symbol boundary. The preamble is transmitted.

Preamble Resources

The CAI preamble may be narrowband so that receiving nodes can detect it with minimal power consumption. Its bandwidth may be smaller than the smallest BWP supported in NR-U, for example 5 MHz for FR1. As the ETSI harmonized standard for 5 GHz calls for 20 MHz channels but also allows operation in bands smaller bands (as small as 5 MHz) centered at the center of the 20 MHz band, the choice of 5 MHz for CAI preamble may be good for co-existence with WiFi. If the preamble meets the minimum OCB requirement, i.e. 80% of 5 MHz, it may be sufficient.

Figure 19:
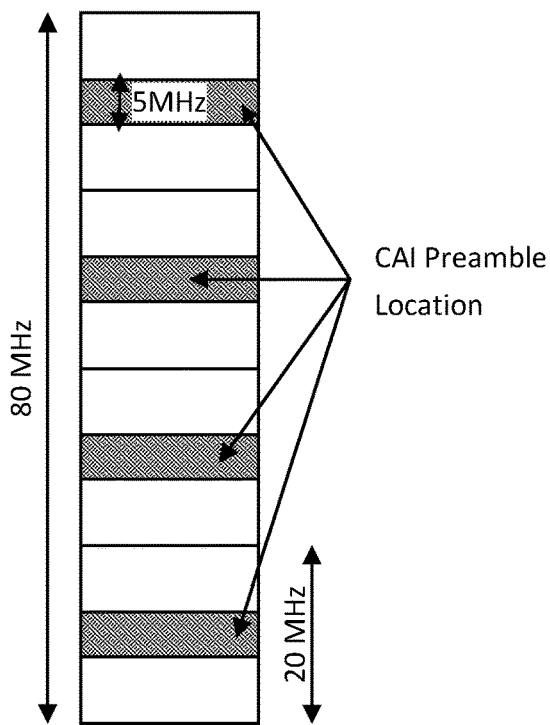
FIG. 19 illustrates examples of preamble resources in frequency.

The preamble may be transmitted in a predefined location such as the center of a 20 MHz band in an unlicensed band or in specific predefined locations such as raster locations so that a general-node can recognize its location. An example is shown in FIG. 19 where an 80 MHz band is channelized into 20 MHz bands and the CAI preamble may be transmitted in the center 5 MHz.

The CAI's resources may be configured through RRC and indicated through SI so all UEs can locate the CAI. In CA the information may be provided by the PCell. In DC, the information may be provided by the MCG or obtained from SI carried in DRS or SSB. In SA, again this information may be obtained from SI carried in DRS or SSB. The SI may provide the frequency resources as an offset from the lowest PRB of the CBW.

Figure 20:
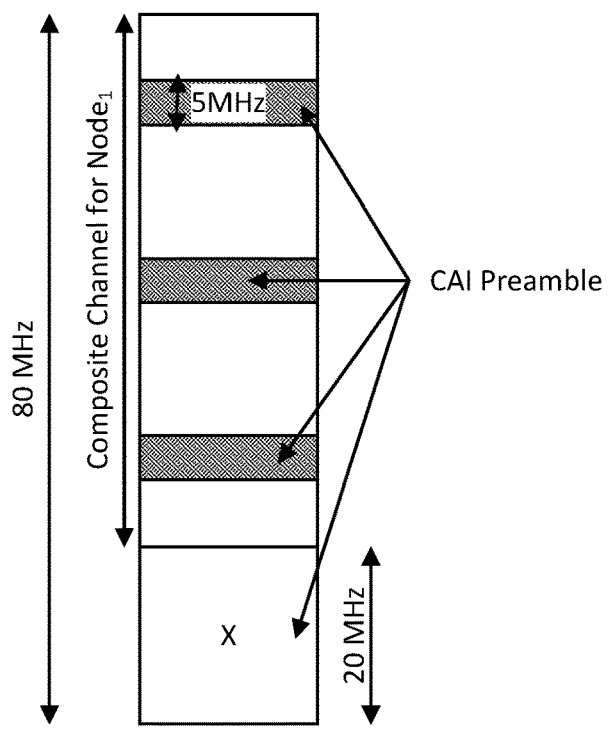
FIG. 20 illustrates CA resources in a Cell using a composite carrier (which is a multiple of 20 MHz).

As NR supports operation in wider bandwidths, an NR-U node may use multiple 20 MHz bands to create a composite carrier of a larger bandwidth in a single cell. (Instead of carrier aggregation where many SCells are aggregated, many chunks of bandwidth are combined into a cell). In this case also it is proposed herein that the preamble be transmitted at the center of every 20 MHz subband of the aggregated band. As shown in FIG. 20, an 80 MHz band which consists of four 20 MHz channel is used in the unlicensed spectrum. The NR-U node makes a composite 60 MHz channel using three 20 MHz channels. According to another aspect, the CAI preamble may be sent at the center of each of the 20 MHz channels so that general-nodes in each of the 20 MHz can detect the status of the channel without having to switch frequency.

Alternatively, the gNB may provide a bitmap in the SI or dynamically (through grants especially when triggering handshaking) to indicate which 20 MHz band carries the CAI.

The preamble's numerology may be determined as follows:

- The preamble uses a predefined numerology based on the frequency band. For example, 15 KHz for FR1 enables UEs with different processing capabilities to receive this signal. 30 KHz and 60 KHz may also be used as it keeps the latency due to CAI preamble small and allows for more repetition with covering codes.
- The preamble uses the same numerology as the SSB. In this case, the listening nodes are required to know the numerology for SSB or the NR-U cell either by performing initial access or through configuration from PCell or PSCell.

Figure 44:
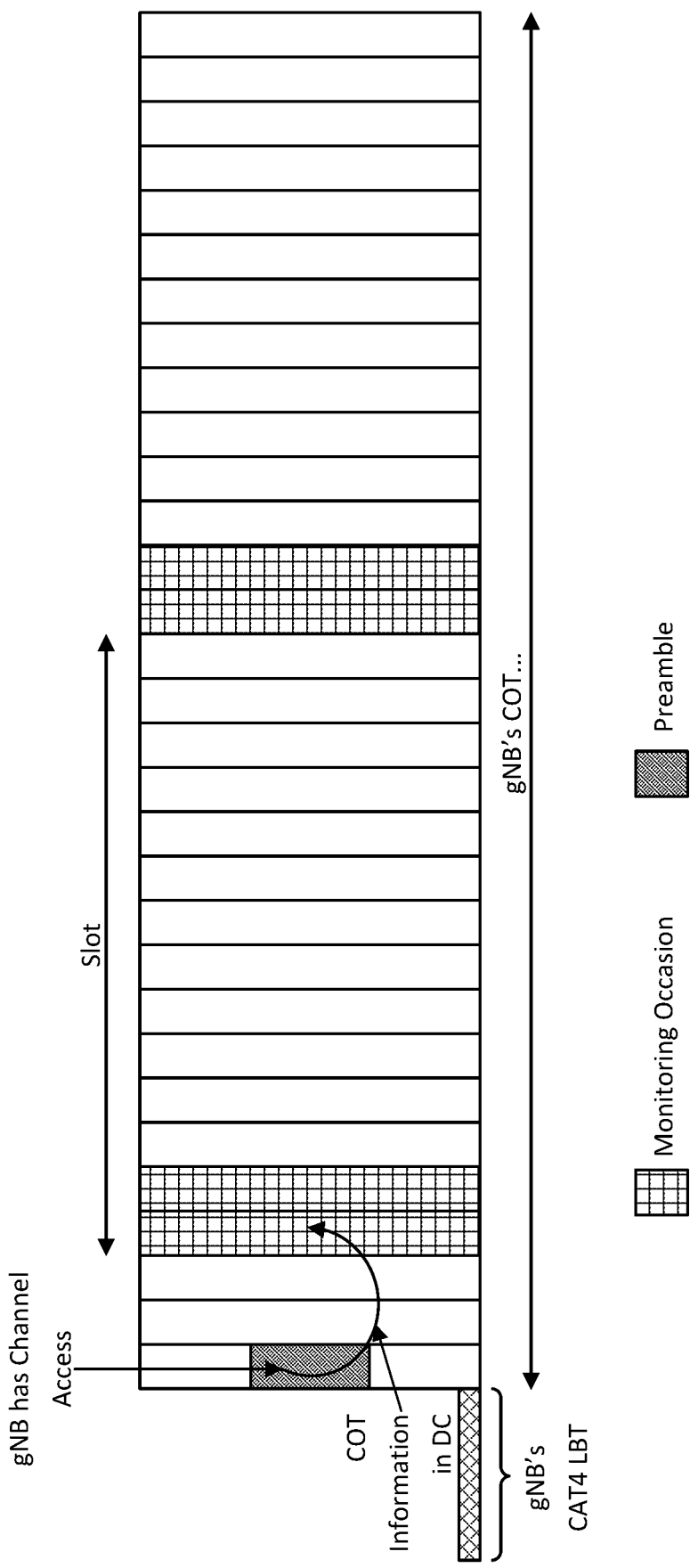
FIG. 44 shows a UE monitors DCI in its monitoring occasion following the detection of the preamble.

Generally, the information that can be sent on the preamble is limited. It is proposed herein, therefore, that the preamble be used in conjunction with other forms of transmitting the CAI (such as PDCCH, RACH, and RS). The preamble may indicate the occasion and resources when the remaining information of CAI can be received. In other words, if the preamble's information is relevant to a node, the node wakes up to find the remaining CAI information as seen in FIG. 17. The remaining information of CAI may occur in the first occasion (of the signal type) after the preamble or within the first N occasions after the preamble. For example, if the remaining information is transmitted on PDCCH, the node may look for this information in the first monitoring occasion following the preamble. This concept is shown in FIG. 44 where the UE monitors the DL signal for a preamble. On finding the preamble, it decodes for the DCI carrying the COT information in its PDCCH monitoring occasion.

Figure 45:
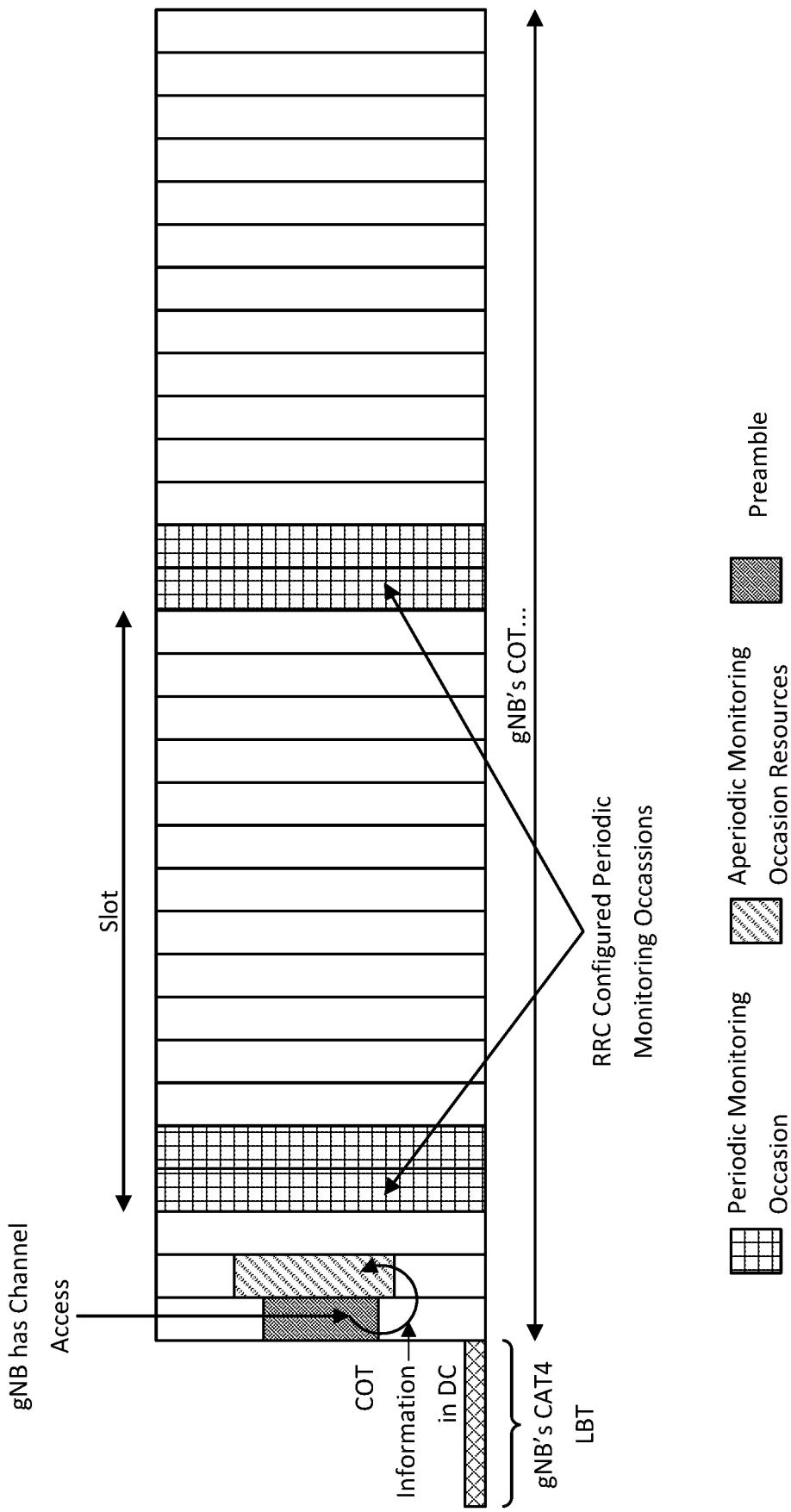
FIG. 45 shows a preamble indicates an aperiodic CORESET/search space monitoring occasion.

Another example is shown in FIG. 45, where a CORESET and monitoring occasion is provisioned immediately following the preamble to save resources. If multiple symbols are present between the preamble and the next monitoring occasion, the gNB cannot indicate the COT information or perform scheduling for the UE immediately and resources may be wasted. Instead, a CORESET and search space monitoring occasion may be provided with minimal latency following the preamble. This control resource may be aperiodic, i.e., its presence is defined by the location of the preamble.

Figure 46:
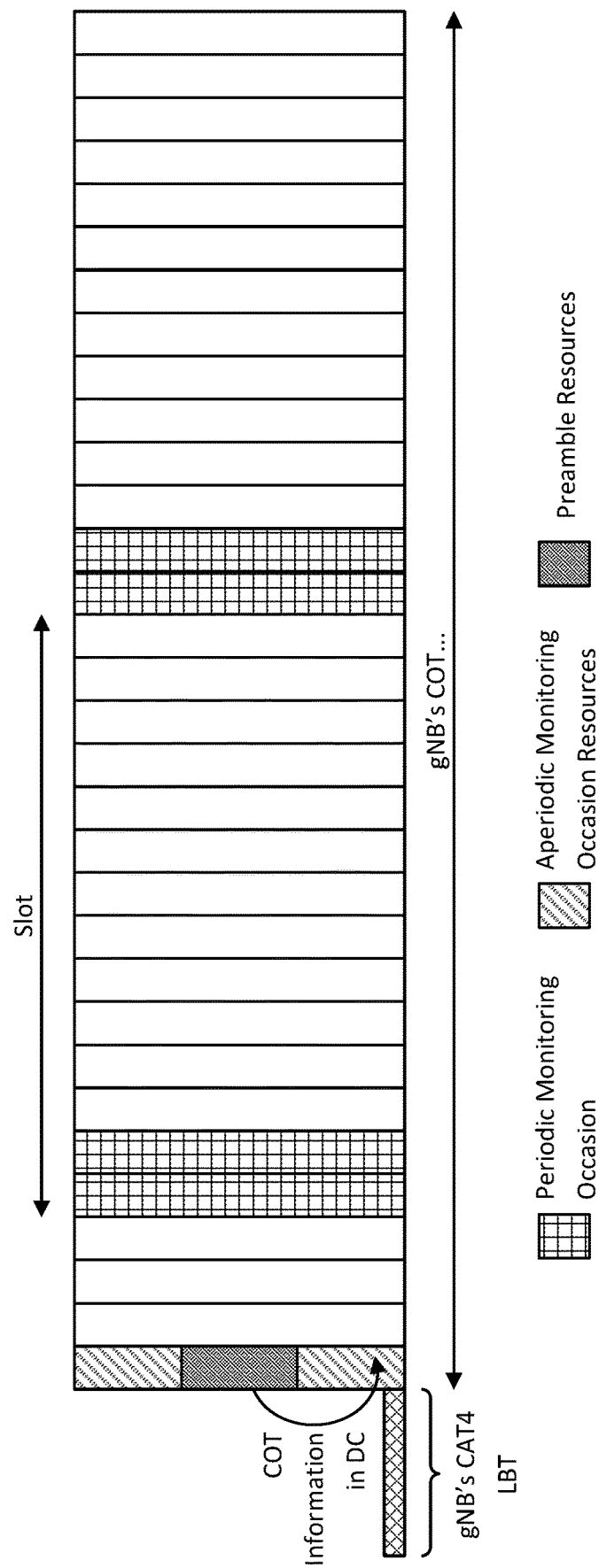
FIG. 46 shows a preamble and CORESET resources share the same OS.

The aperiodic CORESET/search space monitoring occasion may be in the same OS as the preamble as shown in FIG. 46. This allows for better resource utilization as it reduces the latency between the preamble and the DCI.

Figure 47:
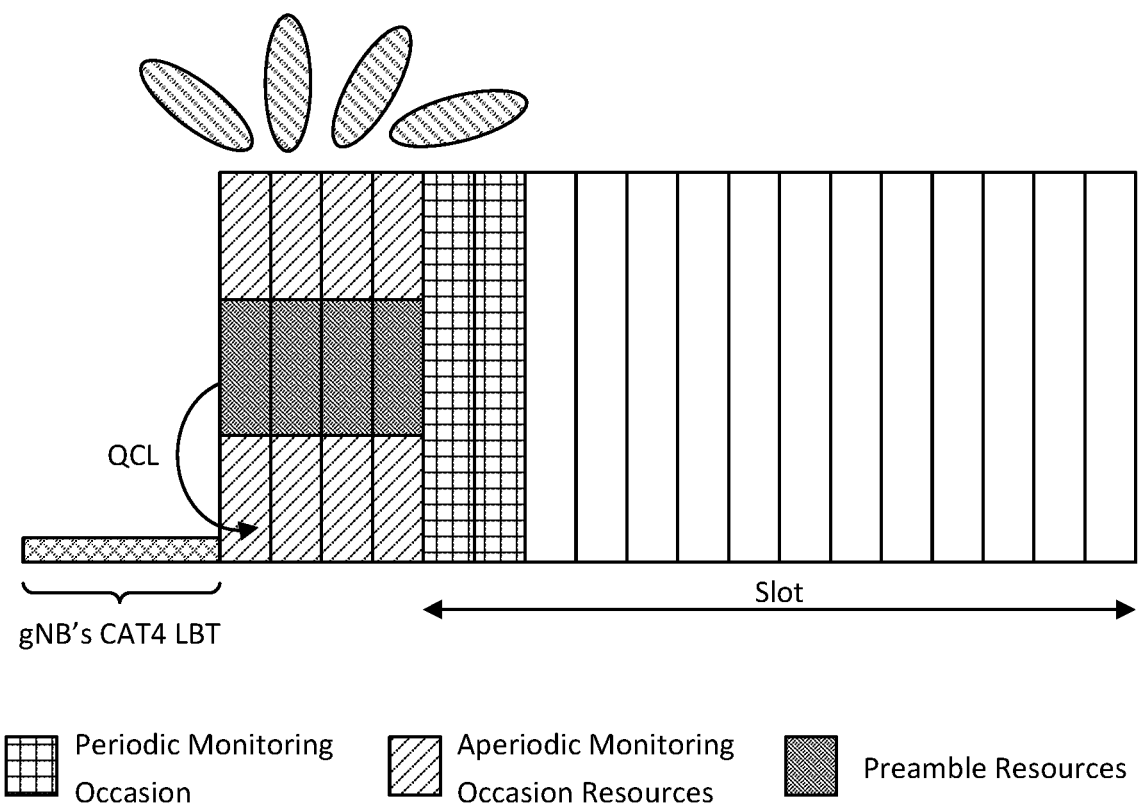
FIG. 47 shows a gNB transmits the preamble in multiple spatial directions to cover all the UEs; the UE assumes that the corresponding CORESET's DMRS is QCL with the preamble.

The preamble and DMRS of the DCI carrying the COT information may be QCL signals. Therefore, when a UE receives a preamble in a certain spatial direction, it expects to also receive the aperiodic CORESET in that direction, i.e., the aperiodic CORESET has the same QCL as the preamble. The gNB transmits the preamble multiple times in different spatial directions as shown in FIG. 47 to cover all the UEs. The aperiodic CORESET is configured through RRC signaling. The monitoring occasion associated with this CORESET is defined to be aperiodic, e.g., the search space monitoring occasion occurs only once in association with the detected preamble. This search space is configured to the UE through RRC signaling and may not have the parameter monitoringSlotPeriodicityAndOffset set as the offset is determined by the occurrence of the preamble and it is not periodic.

Furthermore, the preamble may be in the form of the DMRS of the PDCCH in the CORESET. The gNB may schedule the preamble to be in the form of a wideband DMRS so that it provides sufficient reliability.

It is understood that any or all of the apparatuses, systems, methods and processes described herein may be embodied in the form of computer executable instructions (e.g., program code) stored on a computer-readable storage medium which instructions, when executed by a processor, such as processors 118 or 91 of FIGS. 21B and 21F, cause the processor to perform and/or implement the systems, methods and processes described herein. Specifically, any of the steps, operations, or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computing system.

In describing preferred embodiments of the subject matter of the present disclosure, as illustrated in the FIG.s, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed is:

1. An apparatus, comprising a processor, a memory, and communication circuitry, wherein the processor, memory, and communication circuitry are configured to:
   receive a radio resource control (RRC) message, the RRC message comprising an indication of a number of bits used to indicate a channel occupancy time (COT) in a downlink control information (DCI) transmission;
   perform a first type of channel access procedure;
   receive a first DCI, wherein the first DCI is associated with a slot format indicator radio network temporary identifier (SFI-RNTI), and the first DCI comprises a slot format indication, an indication of the COT using the number of bits indicated in the RRC message, and a bitmap, the bitmap indicating one or more available subbands;
   determine the COT from the first DCI;
   switch from the first type of channel access procedure to a second type of channel access procedure at least based on the indication of the COT received in the first DCI;
   receive a second DCI, wherein the second DCI is associated with a cell radio network temporary identifier (C-RNTI), wherein the second DCI comprises an uplink grant, and wherein the uplink grant indicates a plurality of time domain resource assignments; and
   perform a physical uplink shared channel transmission in accordance with at least one of the plurality of time domain resource assignments during at least part of the COT.

2. The apparatus of the claim 1, wherein the slot format indication indicates that channel access is partially available for a first slot, wherein the first slot is associated with the SFI.

3. The apparatus of the claim 2, wherein the slot format indication comprises an indication that the channel access is available on one or more first symbols of the first slot.

4. The apparatus of the claim 3, wherein the slot format indication comprises an indication that the channel access is not available on one or more second symbols of the first slot.

5. The apparatus of claim 1, wherein the first DCI is a multicast DCI.

6. The apparatus of claim 1, wherein the second DCI is a UE-specific DCI.

7. An apparatus, comprising a processor, a memory, and communication circuitry, wherein the processor, memory, and communication circuitry are configured to:
   send a radio resource control (RRC) message, the RRC message comprising an indication of a number of bits used to indicate a channel occupancy time (COT) in a downlink control information (DCI) transmission;
   send a first DCI to a wireless transmit/receive unit (WTRU), wherein the first DCI is associated with a slot format indicator radio network temporary identifier (SFI-RNTI), and the first DCI comprises a slot format indication, an indication of the COT using the number of bits indicated in the RRC message, and a bitmap, the bitmap indicating one or more available subbands;
   send a second DCI, wherein the second DCI is associated with a cell radio network temporary identifier (C-RNTI), wherein the second DCI comprises an uplink grant, and wherein the uplink grant indicates a plurality of time domain resource assignments; and
   receive, from the WTRU, a physical uplink shared channel transmission in accordance with at least one of the plurality of time domain resource assignments during at least part of the COT.

8. The apparatus of the claim 7, wherein the slot format indication indicates that channel access is partially available for a first slot, wherein the first slot is associated with the SFI.

9. The apparatus of the claim 8, wherein the slot format indication comprises an indication that the channel access is available on one or more first symbols of the first slot.

10. The apparatus of the claim 9, wherein the slot format indication comprises an indication that the channel access is not available on one or more second symbols of the first slot.

11. The apparatus of claim 7, wherein the first DCI is a multicast DCI.

12. The apparatus of claim 7, wherein the second DCI is a UE-specific DCI.

13. A method for channel occupancy time (COT) indication comprising:
   receiving a radio resource control (RRC) message, the RRC message comprising an indication of a number of bits used to indicate a channel occupancy time (COT) in a downlink control information (DCI) transmission;
   performing a first type of channel access procedure;
   receiving a first DCI, wherein the first DCI is associated with a slot format indicator radio network temporary identifier (SFI-RNTI), and the first DCI comprises a slot format indication, an indication of the COT using the number of bits indicated in the RRC message, and a bitmap, the bitmap indicating one or more available subbands;
   determining the COT from the first DCI;
   switching from the first type of channel access procedure to a second type of channel access procedure at least based on the indication of the COT received in the first DCI;
   receiving a second DCI, wherein the second DCI is associated with a cell radio network temporary identifier (C-RNTI), wherein the second DCI comprises an uplink grant, and wherein the uplink grant indicates a plurality of time domain resource assignments; and
   performing a physical uplink shared channel transmission in accordance with at least one of the plurality of time domain resource assignments during at least part of the COT.

14. The method of the claim 13, wherein the slot format indication indicates that channel access is partially available for a first slot, wherein the first slot is associated with the SFI.

15. The method of the claim 14, wherein the slot format indication comprises an indication that the channel access is available on one or more first symbols of the first slot and an indication that the channel access is not available on one or more second symbols of the first slot.

16. The method of claim 13, wherein the first DCI is a multicast DCI.

17. The method of claim 13, wherein the second DCI is a UE-specific DCI.

18. A wireless transmit/receive unit (WTRU) comprising a processor, a memory, and communication circuitry, wherein the processor, memory, and communication circuitry are configured to:
   receive a radio resource control (RRC) message, the RRC message comprising an indication of a number of bits used to indicate a channel occupancy time (COT) in a downlink control information (DCI) transmission;
   perform a first type of channel access procedure;
   receive a first DCI, wherein the first DCI is associated with a slot format indicator radio network temporary identifier (SFI-RNTI), and the first DCI comprises a slot format indication, an indication of the COT using the number of bits indicated in the RRC message, and a bitmap, the bitmap indicating one or more available subbands, wherein the first DCI indicates that the apparatus can switch from the first type of channel access procedure to a second type of channel access procedure;
   determine the COT from the first DCI;
   receive a second DCI, wherein the second DCI is associated with a cell radio network temporary identifier (C-RNTI), wherein the second DCI comprises an uplink grant, and wherein the uplink grant indicates a plurality of time domain resource assignments; and
   perform a physical uplink shared channel transmission in accordance with at least one of the plurality of time domain resource assignments during at least part of the COT.

19. The WTRU of the claim 18, wherein the slot format indication indicates that channel access is partially available for a first slot, wherein the first slot is associated with the SFI.

20. The WTRU of claim 19, wherein the slot format indication comprises an indication that the channel access is available on one or more first symbols of the first slot.

* * * * *